(12) United States Patent
Kobayashi et al.

(10) Patent No.: US 7,432,914 B2
(45) Date of Patent: Oct. 7, 2008

(54) COORDINATE INPUT APPARATUS, ITS CONTROL METHOD, AND PROGRAM

(75) Inventors: Katsuyuki Kobayashi, Yokohama (JP); Yuichiro Yoshimura, Yokohama (JP); Atsushi Tanaka, Fuchu (JP); Kiwamu Kobayashi, Yokohama (JP); Hajime Sato, Yokohama (JP); Masahide Hasegawa, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 665 days.

(21) Appl. No.: 11/076,380

(22) Filed: Mar. 9, 2005

(65) Prior Publication Data

US 2005/0200613 A1    Sep. 15, 2005

(30) Foreign Application Priority Data

Mar. 11, 2004 (JP) .............................. 2004-069482

(51) Int. Cl.
*G09F 3/041* (2006.01)
(52) U.S. Cl. ........................ 345/173; 345/175; 345/176; 178/18.01; 178/18.04
(58) Field of Classification Search ......... 345/173–179; 178/18.01–18.07, 19.01–19.06
See application file for complete search history.

(56) References Cited

U.S. PATENT DOCUMENTS

| 4,144,449 | A |   | 3/1979 | Funk et al. |
|---|---|---|---|---|
| 4,507,557 | A |   | 3/1985 | Tsikos |
| 6,362,468 | B1 |   | 3/2002 | Murakami et al. .......... 250/221 |
| 6,563,491 | B1 |   | 5/2003 | Omura ........................ 345/173 |
| 7,015,894 | B2 |   | 3/2006 | Morohoshi |
| 7,283,128 | B2 | * | 10/2007 | Sato ............................ 345/173 |

FOREIGN PATENT DOCUMENTS

| EP | 0 279 652 | 8/1988 |
|---|---|---|
| EP | 1 128 318 | 8/2001 |
| EP | 1128318 A2 | 8/2001 |
| JP | 2896183 | 3/1999 |
| JP | 2000-105671 | 4/2000 |
| JP | H12-353048 | 12/2000 |
| JP | 2001-142642 | 5/2001 |
| JP | 2002-055770 | 2/2002 |
| JP | 2003-303046 | 10/2003 |
| KR | 1998-703542 | 11/1998 |
| KR | 2002-079847 | 10/2002 |
| WO | WO 96/31836 | 10/1996 |
| WO | WO 01/59975 A2 | 8/2001 |

* cited by examiner

*Primary Examiner*—Vijay Shankar
(74) *Attorney, Agent, or Firm*—Cowan, Liebowitz & Latman, P.C.

(57) ABSTRACT

Angle information corresponding to a specified point is calculated on the basis of a change in light amount distribution obtained from at least two sensor units which are arranged on the corner portions of a coordinate input region and receive incoming light. The coordinates of a pointed position on the coordinate input region are calculated on the basis of the calculated angle information. Each of the at least two sensor units includes two light-receiving units being first and second light-receiving units.

12 Claims, 41 Drawing Sheets

SIGNAL WAVEFORM OF LIGHT-RECEIVING UNIT B

F I G. 6
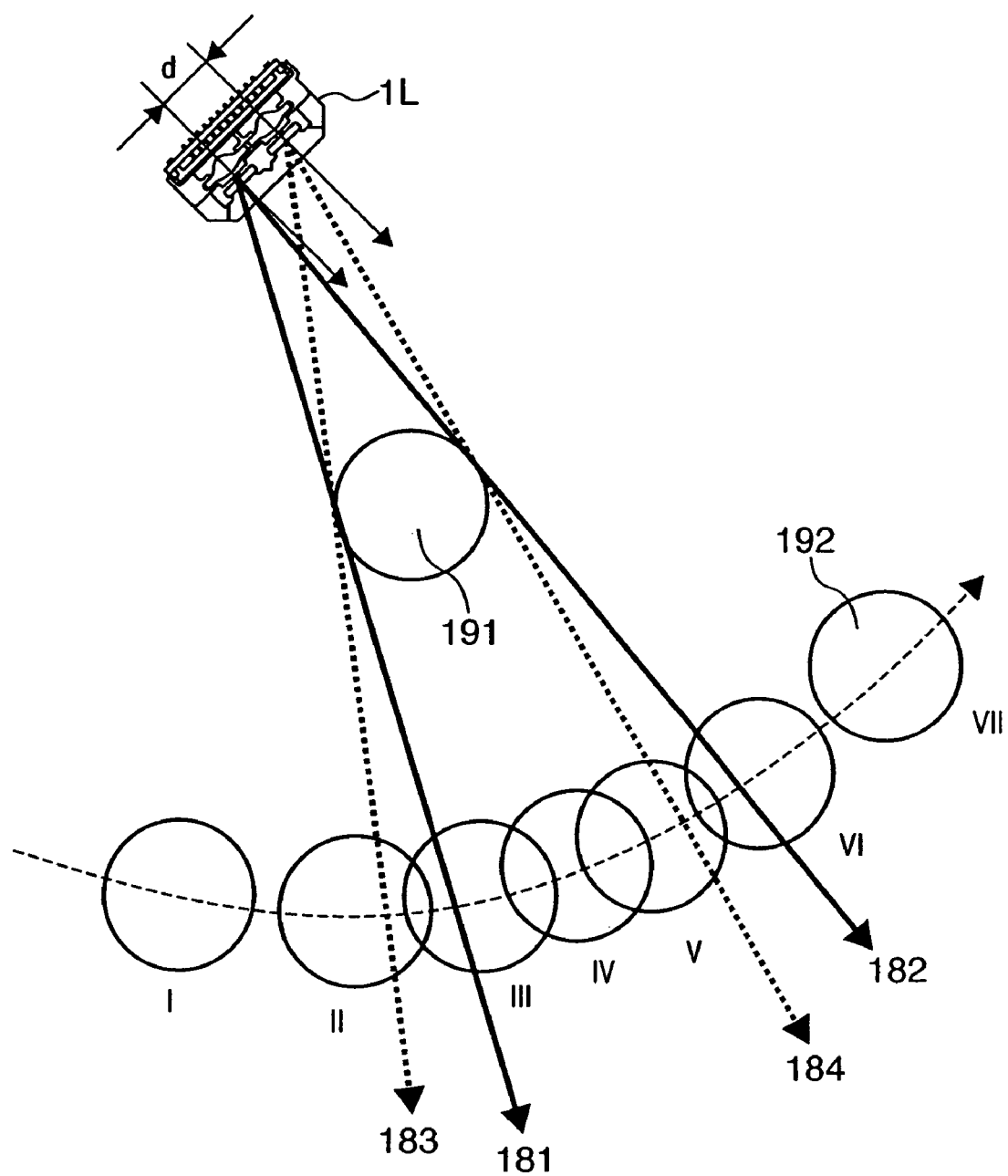

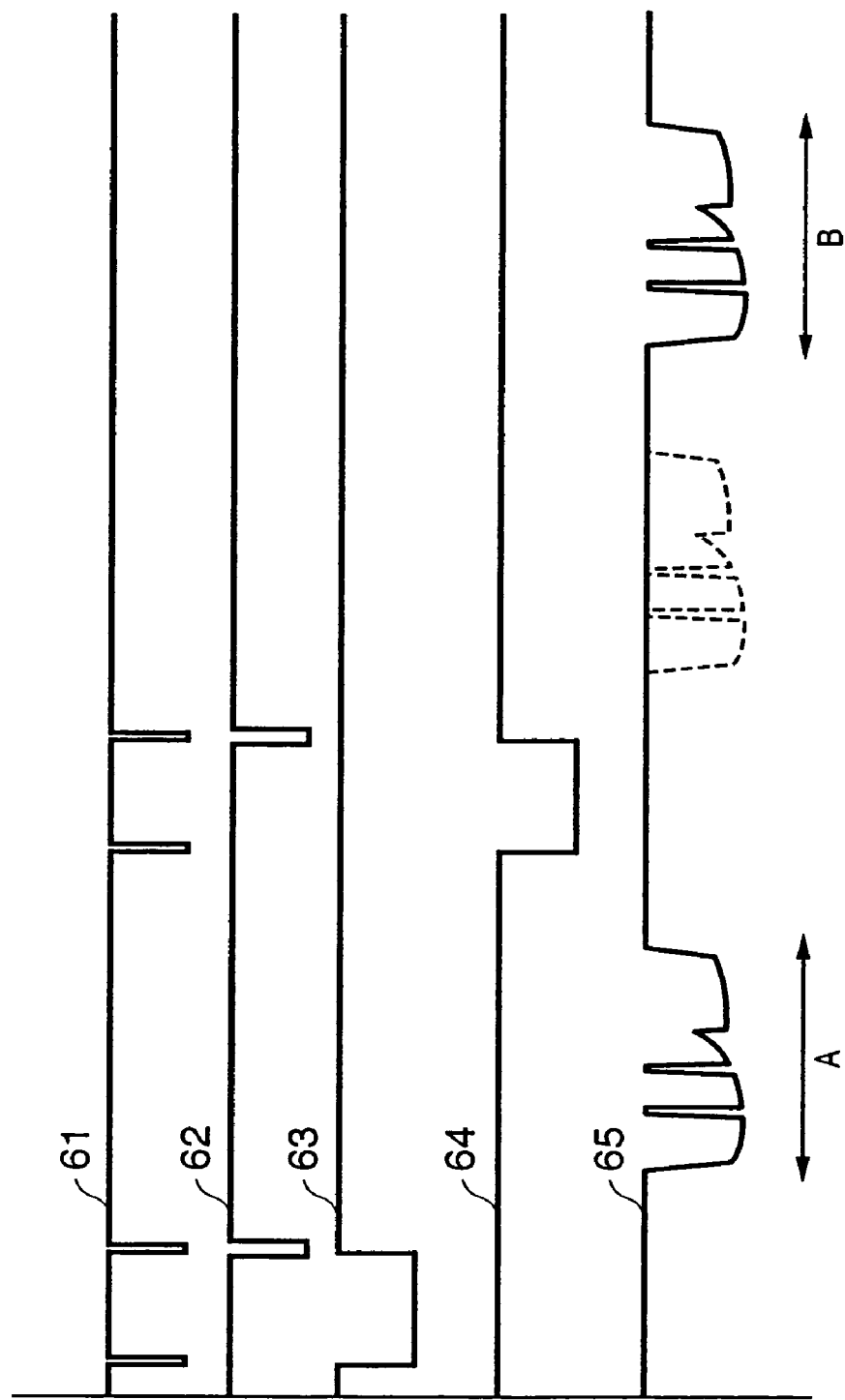

FIG. 20

|  | L1 | L2 | R1 | R2 |
|---|---|---|---|---|
| NO INPUT | 0 | 0 | 0 | 0 |
| SINGLE-POINT INPUT | 1 | 1 | 1 | 1 |
| PLURAL-POINT INPUTS | 1 | 1 | 1 | 2 |
|  | 1 | 1 | 2 | 1 |
|  | 1 | 1 | 2 | 2 |
|  | 1 | 2 | 1 | 1 |
|  | 1 | 2 | 1 | 2 |
|  | 1 | 2 | 2 | 1 |
|  | 1 | 2 | 2 | 2 |
|  | 2 | 1 | 1 | 1 |
|  | 2 | 1 | 1 | 2 |
|  | 2 | 1 | 2 | 1 |
|  | 2 | 1 | 2 | 2 |
|  | 2 | 2 | 1 | 1 |
|  | 2 | 2 | 1 | 2 |
|  | 2 | 2 | 2 | 1 |
|  | 2 | 2 | 2 | 2 |

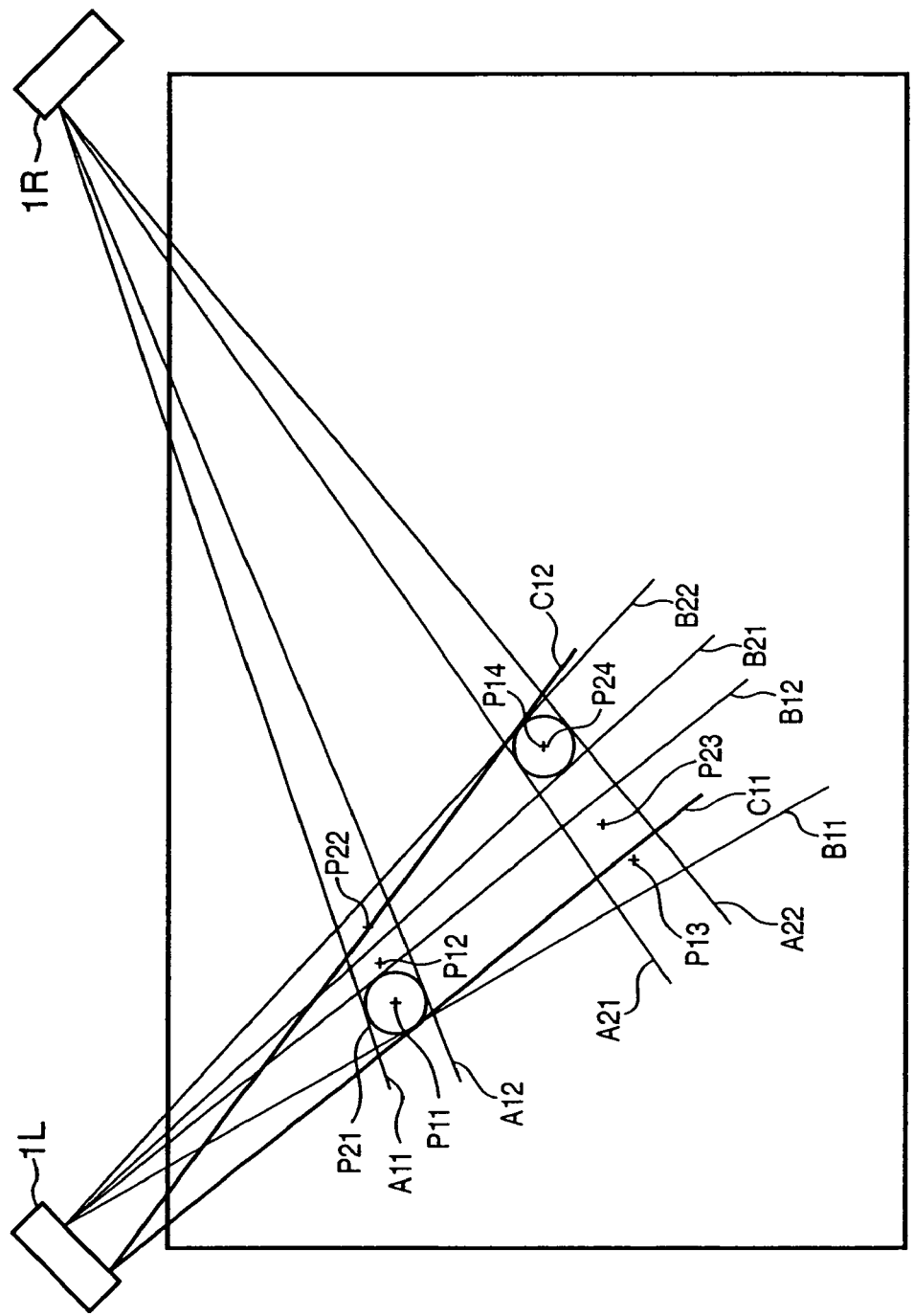

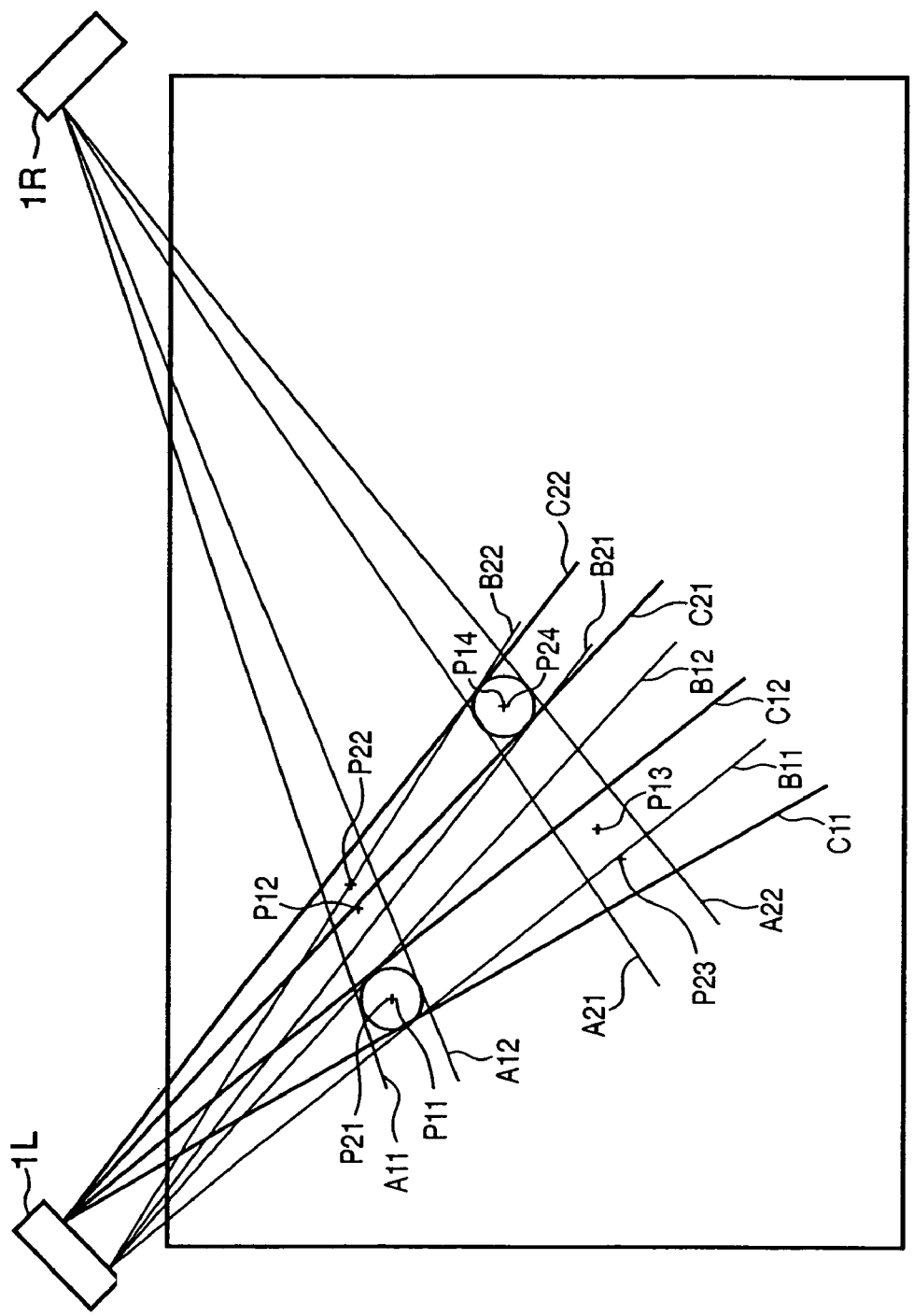

FIG. 22

| | L1 | L2 | R1 | R2 | COORDINATE CALCULATION FIRST DATA | COORDINATE CALCULATION SECOND DATA | TRUE/FALSE DETERMI-NATION DATA | NECESSITY /UNNECESSITY TOTAL ECLIPSE DETERMINATION |
|---|---|---|---|---|---|---|---|---|
| NO INPUT | 0 | 0 | 0 | 0 | – | – | – | – |
| SINGLE-POINT INPUT | 1 | 1 | 1 | 1 | L1(L2) | R1(R2) | – | – |
| PLURAL-POINT INPUTS | 1 | 1 | 1 | 2 | R2 | L2 | L1 | NECESSARY |
| | 1 | 1 | 2 | 1 | R1 | L1 | L2 | NECESSARY |
| | 1 | 1 | 2 | 2 | R1 | L1 | L2 | NECESSARY |
| | 1 | 2 | 1 | 1 | L2 | R2 | R1 | NECESSARY |
| | 1 | 2 | 1 | 2 | L2 | R2 | R1 | – |
| | 1 | 2 | 2 | 1 | L2 | R1 | R2 | – |
| | 1 | 2 | 2 | 2 | L2 | R2 | R1 | – |
| | 2 | 1 | 1 | 1 | L1 | R1 | R2 | NECESSARY |
| | 2 | 1 | 1 | 2 | L1 | R2 | R1 | – |
| | 2 | 1 | 2 | 1 | L1 | R1 | R2 | – |
| | 2 | 1 | 2 | 2 | L1 | R1 | R2 | – |
| | 2 | 2 | 1 | 1 | L1 | R1 | R2 | NECESSARY |
| | 2 | 2 | 1 | 2 | L1 | R2 | R2 | – |
| | 2 | 2 | 2 | 1 | L1 | R1 | R2 | – |
| | 2 | 2 | 2 | 2 | L1 | R1 | R2 | – |

F I G. 25B

| | L1 | L2 | R1 | R2 | COORDINATE CALCULATION FIRST DATA | COORDINATE CALCULATION SECOND DATA | TRUE/FALSE DETERMI-NATION DATA | NECESSITY/ UNNECESSITY TOTAL ECLIPSE DETERMI-NATION |
|---|---|---|---|---|---|---|---|---|
| NO INPUT | 0 | – | 0 | – | – | – | – | – |
| SINGLE-POINT INPUT | 1 | – | 1 | – | – | – | – | – |
| PLURAL-POINT INPUTS | 1 | 1 | 2 | – | R1 | L1 | L2 | NECESSARY |
| | 1 | 2 | 2 | – | R1 | L2 | L1 | – |
| | 2 | – | 1 | 1 | L1 | R1 | R2 | NECESSARY |
| | 2 | – | 1 | 2 | L1 | R2 | R1 | – |
| | 2 | 1 | 2 | 1 | L1 | R1 | R2 | – |
| | 2 | 1 | 2 | 2 | L1 | R1 | R2 | – |
| | 2 | 2 | 2 | 1 | L1 | R1 | R2 | – |
| | 2 | 2 | 2 | 2 | L1 | R1 | R2 | – |

FIG. 27A *(Prior Art)*
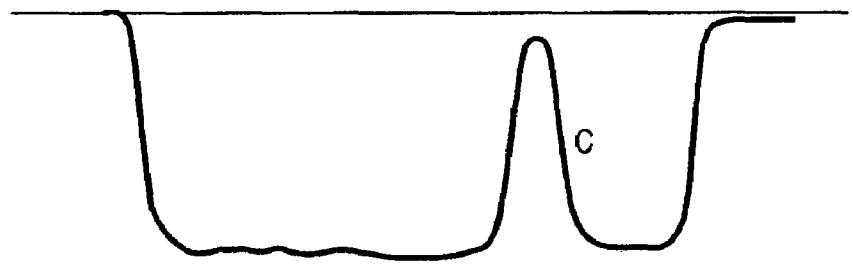
FIG. 27B *(Prior Art)*
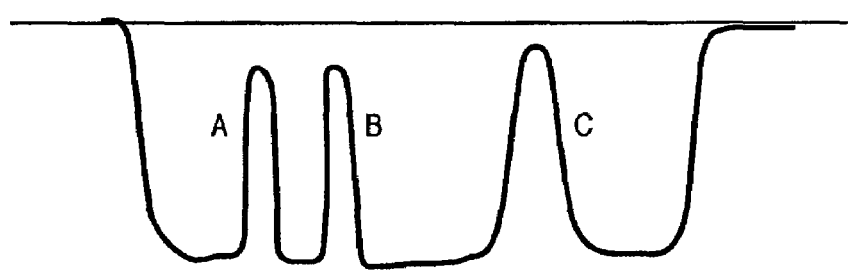
FIG. 27C *(Prior Art)*
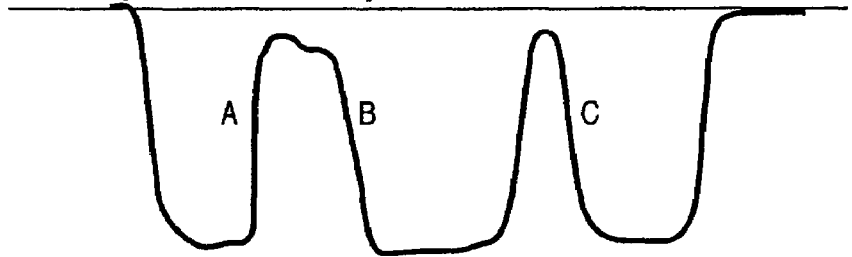

COORDINATE INPUT APPARATUS, ITS CONTROL METHOD, AND PROGRAM

FIELD OF THE INVENTION

The present invention relates to a coordinate input apparatus and its control method, and a program for detecting a pointed position on a coordinate input region.

BACKGROUND OF THE INVENTION

A coordinate input apparatus is available. This coordinate input apparatus is used to input a coordinate point designated by a pointer (e.g., a dedicated input pen, finger, or the like) so as to control a connected computer or to write characters, graphics, and the like.

Conventionally, as a coordinate input apparatus of this type, touch panels of various methods have been proposed or become commercially available. These touch panels are prevalently used since they allow easy operations of a terminal such as a personal computer or the like on the screen without using any special tools and the like.

Various coordinate input methods such as a method using a resistive film or an ultrasonic wave, and the like are available. A coordinate input method using light is also available, as disclosed in U.S. Pat. No. 4,507,557. This U.S. Pat. No. 4,507,557 discloses the following arrangement. That is, a retroreflecting sheet is formed outside a coordinate input region. Illumination units for illuminating an object with light and light-receiving units for receiving light, which are arranged at the corners of the coordinate input region, are used to detect the angles between the light-receiving units and a shielding material such as a finger or the like that shields light in the coordinate input region. Based on the detection results, the position pointed by that shielding material is determined.

Also, Japanese Patent Laid-Open No. 2000-105671, 2001-142642, or the like discloses a coordinate input apparatus which includes a retroreflecting member formed around the coordinate input region, and detects the coordinate position of a portion (light-shielded portion) where retroreflected light is shielded.

In the apparatus disclosed in, for example, Japanese Patent Laid-Open No. 2000-105671, the peak of a light-shielded portion by a shielding material, which is received by the light-receiving unit, is detected by a waveform process arithmetic operation such as differentiation. With this process, the angle of the light-shielded portion with respect to the light-receiving unit is detected, and the coordinate position of the shielding material is calculated based on that detection result. Also, Japanese Patent Laid-Open No. 2001-142642 discloses an arrangement in which one end and the other end of a light-shielded portion are detected by comparison with a specific level pattern, and the center of these coordinate positions is detected.

Note that the method of detecting a light-shielded position and calculating the coordinate position like as disclosed in Japanese Patent Laid-Open Nos. 2000-105671 and 2001-142642 will be referred to as a light shielding method hereinafter.

Furthermore, in such coordinate input apparatus based on the light shielding method, especially, when the coordinate input region has a large size, a demand is arisen for an application that allows a plurality of operators to input simultaneously so as to attain a more convenient and efficient meeting or the like. For this purpose, a coordinate input apparatus that supports a plurality of simultaneous inputs has been proposed.

In order to simultaneously input a plurality of coordinate positions, Japanese Patent Laid-Open No. 2002-055770 or 2003-303046, or Patent Registration No. 2896183 discloses a technique for detecting the angles of a plurality of light-shielded portions by one light-receiving sensor, calculating several input coordinate candidates from a combination of the angles of each sensor, and detecting an actually input coordinate position from these input coordinate candidates.

For example, when two coordinate points are input, a maximum of four coordinate points are calculated as input coordinate candidates, and actually input two coordinate points are determined and output from these four points. That is, in this determination, actual input coordinate points and false input coordinate points are selected from a plurality of input coordinate candidates, thus determining final input coordinate points. This determination will be referred to as true/false determination hereinafter.

As a practical method of this true/false determination, Japanese Patent Laid-Open No. 2003-303046 or Japanese Registration Patent No. 2896183 discloses the following technique. That is, first and second sensors are arranged on the two ends of one side of a conventional coordinate input region, so as to be spaced apart by a distance large enough to precisely calculate a coordinate position pointed within the coordinate input region. Furthermore, a third sensor is arranged at a position between the first and second sensors, so as to also be spaced apart from the first and second sensors by a distance large enough to precisely calculate a coordinate position pointed within the coordinate input region. On the basis of angle information of the third sensor, which is different from those of the first and second sensors, the true/false determination is made for a plurality of pieces of angle information detected by the first and second sensors.

However, in the technique for detecting an angle from the peak of the light amount distribution of a light-shielded portion or from the center of the light amount distribution specified by the two ends of the light amount distribution associated with a light-shielded shadow, and calculating the pointed coordinate position based on a combination of angles detected from respective light-receiving units like the conventional light shielding method, when a plurality of coordinate positions, e.g., at least two coordinate positions are to be simultaneously input, these two input points often overlap each other to nearly line up when viewed from a given light-receiving unit.

Hence, when light-shielded shadows for the two input points overlap each other from the perspective of the light-receiving unit, these light-shielded shadows cannot be separated to detect the angles of the respective input points, thus disabling coordinate inputs.

A practical example of such case will be explained below using FIG. 26A.

For example, when positions on a coordinate input region shown in FIG. 26A are respectively pointed using pointers A and B, the light amount distributions corresponding to the pointers A and B at the position of a light-receiving unit S2 in FIG. 26A are as indicated by A and B in FIG. 27B, and light-shielded shadows corresponding to two light-shielded positions of the pointers A and B are separately detected.

Note that, as reference data, the light amount distribution when no designation input is made is as shown in FIG. 27A. A valley of the light amount distribution at a position C corresponds to the light amount distribution generated due to factors such as the angle characteristics of the retroreflecting member formed around the coordinate input region, attenuation due to a distance, and the like.

On the other hand, the light amount distributions corresponding to the pointers A and B in case of a light-receiving unit S1 shown in FIG. 26A are as shown in FIG. 27C, and light-shielded shadows corresponding to the two point positions of the pointers A and B are detected to overlap each other. In the information of the light amount distribution (shielded light amount distributions) having such overlapping light-shielded shadows (shade overlapping), when A and B in FIG. 27B partially overlap each other (when a so-called partial eclipse has occurred), one end information of the light-shielded range of each pointer is obtained, as shown in FIG. 27C. For this reason, for the conventional method of calculating the position (angle) on the basis of the center or the central pixel number from information of the two ends of the light-shielded range, it is impossible to calculate the coordinate points of the pointers A and B.

Although not shown, when the shadow of the first pointer on the front side completely includes that of the second pointer farther from the light-receiving unit with respect to the target light-receiving unit (when a so-called total eclipse has occurred), the central position (angle) of the first pointer on the front side can be calculated based on the two ends of its light-shielded shadow, but information associated with the farther second pointer cannot be obtained.

Therefore, in the above prior art, the number of light-shielded shadows generated by simultaneous inputs of a plurality of pointers is detected in advance. For example, when the number of shadows detected by the second light-receiving unit is "2" and that detected by the first light-receiving unit is "1", it is determined that the light-shielded shadows corresponding to the pointers overlap each other in the light amount distribution to be detected by the first light-receiving unit.

In such case, Patent Registration No. 2896183 adopts an arrangement which calls user's attention by generating an alarm indicating occurrence of such state, and avoids that state. In Japanese Patent Laid-Open No. 2002-055770 or 2003-303046, the first light-receiving unit must be switched to another third light-receiving unit that can detect two separated light-shielded shadows free from any overlapping, and the angles are detected using the light-receiving units (in this case, the first and third light-receiving units) that can detect these two light-shielded shadows. The aforementioned true/false determination must then be applied to the input coordinate candidates input from the respective light-receiving units to determine the two final real input coordinate positions.

In this case, since the true/false determination can be sufficiently done based on angle information of the light-receiving unit that detects shade overlapping, Japanese Patent Laid-Open No. 2003-303046 or Patent Registration No. 2896183 performs true/false determination using the angle information of this light-receiving unit that detects shade overlapping. In this case, as can be seen from the relationship of shade overlapping in the first and third light-receiving units, two light-receiving units that can be switched each other require the precondition that at least one light-receiving unit can separately detect two light-shielded shadows on the coordinate input region.

That is, when both the two light-receiving units that can be switched each other suffer shade overlapping, it is nonsense to switch them, and coordinate calculations are disabled. Such relationship includes the precondition that the two light-receiving units that can be switched each other must be spaced apart by a given distance or more so that at least light-receiving unit separately detects the two light-shielded shadows, i.e., such limitation on layout is required.

In fact, Japanese Patent Laid-Open Nos. 2002-055770 and 2003-303046 and Patent Registration No. 2896183 do not clearly touch such limitation. However, in order to effectively operate a means for avoiding the light-receiving unit that detects shade overlapping and selecting another light-receiving means, at least one light-receiving unit must separately detect two light-shielded shadows in either pair of two light-receiving units in practice in distances among the first to third light-receiving units. For this reason, the limitation in which a given light-receiving unit is arranged to be spaced apart always by a predetermined distance or more from another light-receiving unit becomes a minimum precondition together with assurance of the distance between the light-receiving units required to precisely calculate the coordinate position.

Strictly speaking, a condition for separately detecting two light-shielded shadows on the entire coordinate input region by at least one of two arbitrary light-receiving units of the first to third light-receiving units must be satisfied by the distance between each light-receiving unit and the coordinate input region, the size of the coordinate input region, the distance between two input points, and the like in addition to the distance between the light-receiving units that can be selected.

This point will be further explained using FIGS. 26A to 26E.

When two positions on the coordinate input region are pointed by the pointers A and B, as shown in FIG. 26A, the light-receiving unit S1 detects shade overlapping in a partial eclipse state. Since the light-shielded distribution corresponding to the pointers in the light amount distribution is not separated into two points, as shown in FIG. 27C, the two positions cannot be calculated.

To solve this problem, assume that light-receiving units S3-1 and S3-2, which can detect light-shielding states of the pointers A and B from different directions in place of the light-receiving unit S1, are arranged, as shown in FIG. 26B. The light-receiving unit S3-1 detects the pointers A and B as separate light-shielded shadows, as shown in FIG. 26C. This is because the light-receiving unit S3-1 is arranged to be spaced apart by a sufficient distance D2 from the light-receiving unit S1.

On the other hand, the light amount distribution of light-shielded shadows detected by the light-receiving unit S3-2 which is arranged at a position (distance D3) relatively close to the light-receiving unit S1 causes a partial eclipse, as shown in FIG. 26D, and only one side of the end portions of the light-shielded range of each of the pointers A and B is detected. As a result, it is nonsense to switch the light-receiving unit S1 to the light-receiving unit S3-2 to use its detection result.

Furthermore, a generalized case will be examined.

Assume that light-receiving units S1 and S2 basically detect coordinate positions, and the light-receiving unit S1 detects shade overlapping, as shown in FIG. 26E. In this case, where a light-receiving unit S3 used by switching the light-receiving unit S1 is to be arranged will be examined as an optimal condition that does not detect any shade overlapping. In this optimal condition, a case wherein the pointers A and B line up along a line indicated by the broken line shown in FIG. 26E is a basic case wherein shade overlapping is detected.

Assume that two points of the pointed positions of the pointers A and B are pointed at positions 1 to 4 in FIG. 26E. In this case, a light-receiving unit S3-1 which is arranged at the central portion in the right-and-left direction of the coordinate input region between the light-receiving units S1 and S2, which are arranged near the left and right ends of the coordinate input region, separately detects light-shielded shadows from the pointers A and B on all coordinate input regions at positions 1 to 4. By contrast, a light-receiving unit S3-2 which is arranged relatively closer to the light-receiving unit S1 than the light-receiving unit S3-1 detects light-shielded shadows of the pointers A and B that point the coordinate input regions at positions 3 and 4 as shade overlapping.

The position of the light-receiving unit, which is most suited to separately detect the light-shielded shadows of the pointers A and B, is a position located perpendicularly from that pointed position with respect to a line (broken line in FIG. 26E) that connects the light-receiving unit which detects shade overlapping, and the pointers A and B. However, as can be seen from the above description, the position of the light-receiving unit, which is guaranteed to separately detect light-shielded shadows on a broader coordinate input region is nearly the central portion between the two light-receiving units arranged at the two ends of the coordinate input regions.

In other words, as can also be seen from the above description, as the position of the third light-receiving unit (light-receiving unit S3-1 or S3-2) becomes closer to one of the left and right light-receiving units (light-receiving units S1 and S2) from nearly the central portion of this third light-receiving unit, the frequency of occurrence of shade overlapping increases.

That is, in the aforementioned prior art, when the third light-receiving unit is added to avoid detection of shade overlapping by one of the light-receiving units arranged near the two ends (left and right ends) of one side of the coordinate input region, the third light-receiving unit is arranged, e.g., near the intermediate position between the light-receiving units arranged near the two ends (left and right ends) of one side of the coordinate input region, i.e., at a position sufficiently spaced apart from these light-receiving units arranged near the two ends (left and right ends).

When angle information of the light-receiving unit that detects shade overlapping is not used, and the light-receiving unit that detects shade overlapping is switched to another third light-receiving unit spaced apart by a predetermined distance from that unit so as to calculate the coordinate position, the following problem is posed.

Upon switching the light-receiving unit, discontinuity of the calculated coordinate positions occurs. In practice, since the respective light-receiving units have different characteristics, coordinate positions may become discontinuous on a region before and after the light-receiving units are switched.

The discontinuity due to the light-receiving units can be adjusted by correction to some extent if it is caused by variations of the light-receiving unit itself as a device.

However, in the aforementioned prior art, since the distance itself between the light-receiving units is used in coordinate calculations, a predetermined distance or more must be assured as that distance so as to precisely calculate the coordinate position. Furthermore, in order to allow at least one light-receiving unit to separately detect two light-shielded shadows on the coordinate input region, the light-receiving units must be arranged to be spaced apart by the predetermined distance or more. For this reason, such layout causes variations of detected light amount distributions, which are more likely to influence the discontinuity of the calculated coordinate positions upon switching the light-receiving units.

Another problem posed when angle information of the light-receiving unit that detects shade overlapping is not used, and the light-receiving unit that detects shade overlapping is switched to another third light-receiving unit spaced apart by a predetermined distance from that unit so as to calculate the coordinate position is deterioration of the coordinate detection precision resulting from the relationship between the light-receiving unit positions and the coordinate input region.

For example, as shown in FIG. 28, when coordinates are input at positions 1 and 2 of the coordinate input region as a combination of angle information of light-receiving units 1 and 2, which are arranged near the two, i.e., left and right ends of one side of the coordinate input region by normal single pointing, a given error associated with an angle of each light-receiving unit is not so expanded, and the degree of the influence on the calculated coordinate position is small.

Furthermore, in case of a plurality of simultaneous inputs, when the light-receiving unit S1 farther from the pointed position detects shade overlapping, as shown in FIG. 26A, the light-receiving unit S1 that detects shade overlap is switched to the light-receiving unit S3-1 shown in FIG. 26B, thus avoiding the problem of deterioration of the coordinate detection precision resulting from the relationship between the light-receiving unit positions and the coordinate input region as in the case of FIG. 28.

However, when the light-receiving unit S2 closer to the pointed position detects shade overlapping, as shown in FIG. 29A, the light-receiving unit S2 is switched to the light-receiving unit S3, as shown in FIG. 29B. However, in this case, especially, as for pointing at the position of the pointer A, the angle defined by the light-receiving unit S1, pointer A, and light-receiving unit S3, indicated by the bold lines that pass the center of the pointed position, becomes extremely small, and the influence of an error increases, as is geometrically apparent. This is more likely to considerably deteriorate the coordinate calculation precision.

Furthermore, depending on the structure and specification of a display integrated with the coordinate input device, it is often difficult to assure a space for arranging the light-receiving unit, which is selectively used upon detection of shade overlapping, at the central portion between the light-receiving units at the left and right ends of the upper or lower side of the conventional coordinate input region.

The light-receiving unit which is arranged at the central portion must have a broader detection range than those of the light-receiving units arranged at the corner portions. For this reason, in order to optically assure a field angle approximate to 180° by a single light-receiving unit, a substantial optical path length with the coordinate input region is prolonged by, e.g., a mirror arrangement, or a plurality of light-receiving units must be adopted to share the visual field range. In case of this mirror arrangement or the plurality of light-receiving units, a broader installation space around the display is required, and a so-called picture frame size increases.

SUMMARY OF THE INVENTION

The present invention has been made to solve the aforementioned problems, and has as its object to provide a coordinate input apparatus and its control method, and a program, which can detect a plurality of pointing inputs and precisely calculate coordinate positions of these pointing inputs.

According to the present invention, the foregoing object is attained by providing a coordinate input apparatus for detecting a pointed position on a coordinate input region, comprising:

at least two sensor means, arranged on corner portions of the coordinate input region, for receiving incoming light;

angle calculation means for calculating angle information corresponding to the pointed position on the coordinate input region on the basis of a change in light amount distribution obtained from the sensor means; and calculation means for calculating coordinates of the pointed position on the basis of the angle information calculated by the angle calculation means, and each of the at least two sensor means comprising two light-receiving units being first and second light-receiving units.

In a preferred embodiment, the apparatus further comprises:

reflection means, arranged on a surrounding portion of the coordinate input region, for retroreflecting incident light, wherein each of the sensor means further comprises light-projecting units for projecting light toward the coordinate input region.

In a preferred embodiment, when a horizontal direction of the coordinate input region is defined as an X-axis, a vertical direction of the coordinate input region is defined as a Y-axis, and a distance between symmetric axes of the two light-receiving units is defined by d, an X-axis projected distance dx obtained by projecting the distance d on the X-axis or a Y-axis projected distance dy obtained by projecting the distance d on the Y-axis is set to be substantially equal to a diameter of a pointer used to input on the coordinate input region.

In a preferred embodiment, an effective visual field of at least the first light-receiving unit of the first and second light-receiving units covers the full coordinate input region.

In a preferred embodiment, the apparatus further comprises:

determination means for determining, on the basis of the light amount distribution output from the first light-receiving unit of the first and second light-receiving units, if a plurality of pointed positions are present in the coordinate input region; and control means for controlling an operation of the second light-receiving unit on the basis of the determination result of the determination means.

In a preferred embodiment, the apparatus further comprises:

detection means for detecting a state in which a plurality of pointed positions are present outside the effective visual field of the first light-receiving unit and an effective visual field of the second light-receiving unit.

In a preferred embodiment, the angle calculation means comprises:

end portion information detection means for detecting end portion information as angle information corresponding to end portions of a range of a change in light amount distribution output from the light-receiving unit before and after coordinate input sampling, and the calculation means calculates coordinates of the pointed position on the coordinate input region on the basis of one end portion information corresponding to two pieces of end portion information for the first and second light-receiving units of the first sensor means, and two pieces of end portion information for the first and second light-receiving units of the second sensor means.

In a preferred embodiment, the apparatus further comprises:

a light-projecting unit which is arranged on a surrounding portion of the coordinate input region, and projects light toward the coordinate input region.

In a preferred embodiment, the apparatus further comprises:

reflection means, arranged on a surrounding portion of the coordinate input region, for retroreflecting incident light; and a pointer having a light-emitting unit.

In a preferred embodiment, the coordinate input region is used as a display surface of a display apparatus or is overlaid on the display surface of the display apparatus.

In a preferred embodiment, the apparatus, further comprises:

a display apparatus, wherein the coordinate input apparatus is overlaid on the display apparatus.

According to the present invention, the foregoing object is attained by providing a method of controlling a coordinate input apparatus which comprises at least two sensor units which are arranged on corner portions of a coordinate input region and receive incoming light, and detects a pointed position on the coordinate input region, comprising:

an angle calculation step of calculating angle information corresponding to the pointed position on the coordinate input region on the basis of a change in light amount distribution obtained from the at least two sensor units; and a calculation step of calculating coordinates of the pointed position on the basis of the angle information calculated in the angle calculation step, wherein each of the at least two sensor units comprises two light-receiving units being first and second light-receiving units.

According to the present invention, the foregoing object is attained by providing a program that implements control of a coordinate input apparatus which comprises at least two sensor units which are arranged on corner portions of a coordinate input region and receive incoming light, and detects a pointed position on the coordinate input region, comprising:

a program code of an angle calculation step of calculating angle information corresponding to the pointed position on the coordinate input region on the basis of a change in light amount distribution obtained from the at least two sensor units; and a program code of a calculation step of calculating coordinates of the pointed position on the basis of the angle information calculated in the angle calculation step, wherein each of the at least two sensor units comprises two light-receiving units being first and second light-receiving units.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 6 is a view for explaining the input operations of a plurality of pointers according to the embodiment of the present invention;

FIG. 13 is a signal read timing chart according to the embodiment of the present invention;

FIG. 20 shows combinations of the numbers of light-shielded ranges to be detected by the embodiment of the present invention;

FIG. 21B shows an input example to explain the combinations of the numbers of light-shielded ranges to be detected by the embodiment of the present invention;

FIG. 21C shows an input example to explain the combinations of the numbers of light-shielded ranges to be detected by the embodiment of the present invention;

FIG. 22 shows data assignment based on the numbers of light-shielded ranges according to the embodiment of the present invention;

FIG. 25B shows data assignment based on the numbers of light-shielded ranges according to the embodiment of the present invention;

FIG. 27A is a chart for explaining the light amount distribution received by the sensor unit in the prior art;

FIG. 27B is a chart for explaining the light amount distribution received by the sensor unit in the prior art;

FIG. 27C is a chart for explaining the light amount distribution received by the sensor unit in the prior art;

DESCRIPTION OF THE PREFERRED EMBODIMENTS

Preferred embodiments of the present invention will be described in detail in accordance with the accompanying drawings.

<Brief Explanation of Apparatus Arrangement>

The schematic arrangement of an overall coordinate input apparatus will be described first with reference to FIG. 1.

Figure 1:
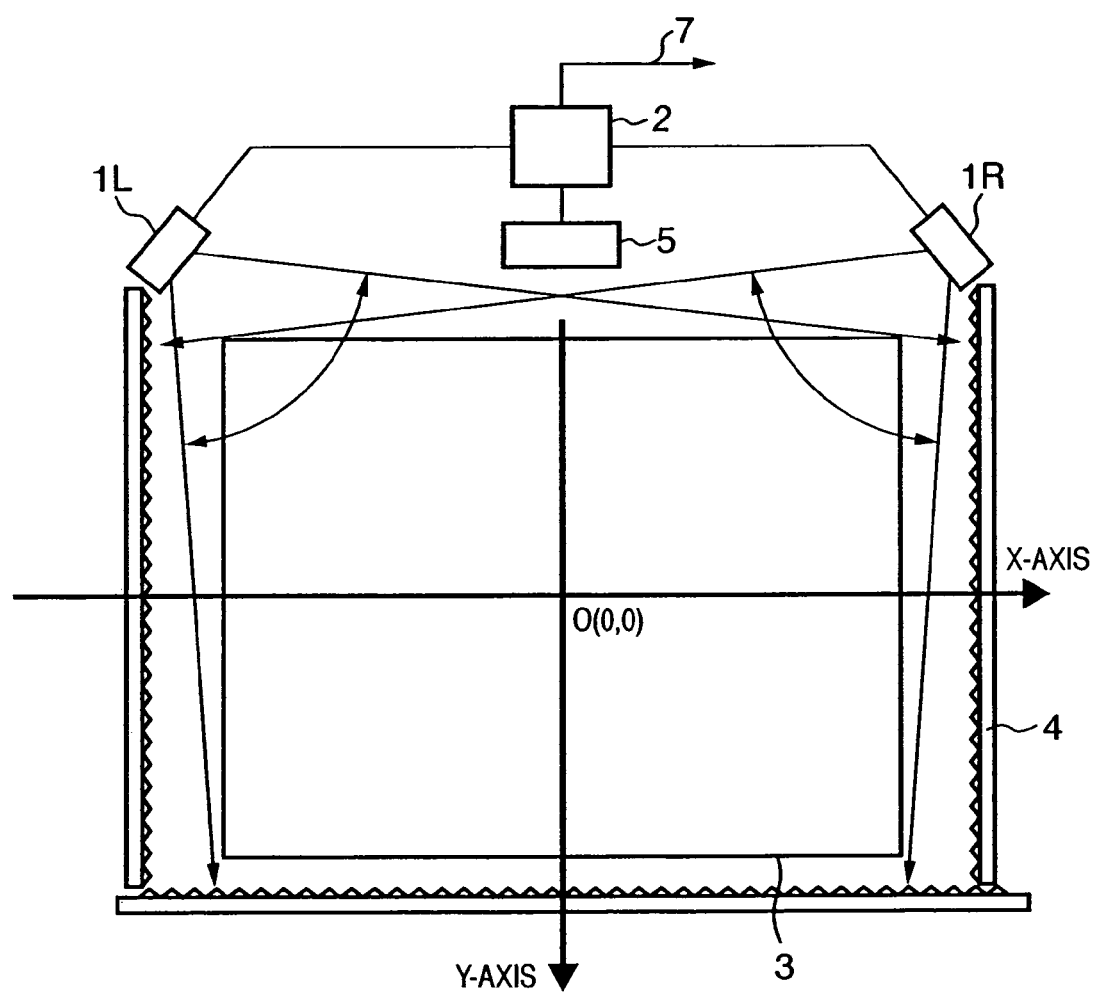
FIG. 1 is a schematic view showing the arrangement of a coordinate input apparatus of the light shielding method according to an embodiment of the present invention.

FIG. 1 is a schematic view showing the arrangement of a coordinate input apparatus of the light shielding method according to an embodiment of the present invention.

Referring to FIG. 1, reference numerals 1L and 1R denote sensor units each having a light-projecting unit and light-receiving unit. In this embodiment, as shown in FIG. 1, the sensor units 1L and 1R are arranged at positions parallel to the X-axis of a coordinate input effective region 3 as a coordinate input surface and symmetrical about the Y-axis to be spaced apart by a predetermined distance. The sensor units 1L and 1R are connected to a control/arithmetic unit 2, receive control signals from the control/arithmetic unit 2, and transmit detected signals to the control/arithmetic unit 2.

Reference numeral 4 denotes a retroreflecting member having a retroreflecting surface which reflects incoming light to the arrival direction. This retroreflecting member 4 is arranged on three outer sides of the coordinate input effective region 3, as shown in FIG. 1. Each retroreflecting member 4 retroreflects light projected from the left and right sensor units 1L and 1R within a range of about 90° toward the sensor units 1L and 1R.

Note that each retroreflecting member 4 microscopically has a three-dimensional structure. As the retroreflecting member 4, a retroreflecting tape of bead type, or a retroreflecting tape that causes retroreflection by regularly arranging corner cubes by, e.g., mechanical work or the like is mainly known nowadays.

Light retroreflected by the retroreflecting members 4 is one-dimensionally detected by the sensor units 1L and 1R, and its light amount distribution is transmitted to the control/arithmetic unit 2.

The coordinate input effective region 3 can be used as an interactive input device when it is formed as a display screen of a display device such as a PDP, rear projector, LCD panel, or the like.

With this arrangement, when a pointing input is made on the coordinate input effective region 3 by a pointing means such as a pointer (e.g., a finger, a pointer, or the like), light projected from the light-projecting units is shielded (generation of a light-shielded portion). In this case, since the light-receiving units of the sensor units 1L and 1R cannot detect light of that light-shielded portion (reflected light by retroreflection), from which direction the light cannot be detected can be consequently determined.

Then, the control/arithmetic unit 2 detects the light-shielded range of the portion input by the pointer on the basis of light amount changes detected by the left and right sensor units 1L and 1R. Furthermore, the control/arithmetic unit 2 calculates directions (pointer angles) of the light-shielded position with respect to the sensor units 1L and 1R on the basis of the information of the light-shielded range.

The control/arithmetic unit 2 geometrically calculates a coordinate value indicating the light-shielded position of the pointer on the coordinate input effective region 3 on the basis of the calculated directions (angles), distance information between the sensor units 1L and 1R, and the like. The control/arithmetic unit 2 outputs that coordinate value to an external terminal such as a host computer or the like connected to the display device via an interface 7 (e.g., USB, IEEE1394, or the like).

In this way, the operations of the external terminal (e.g., drawing a line on the screen, operating an icon displayed on the display device, and the like) can be made by the pointer.

<Detailed Description of Sensor Unit 1>

The arrangement in the sensor units 1L and 1R will be described below using FIG. 2. Note that each of the sensor units 1L and 1R roughly comprises the light-projecting unit and light-receiving unit.

Figure 2:
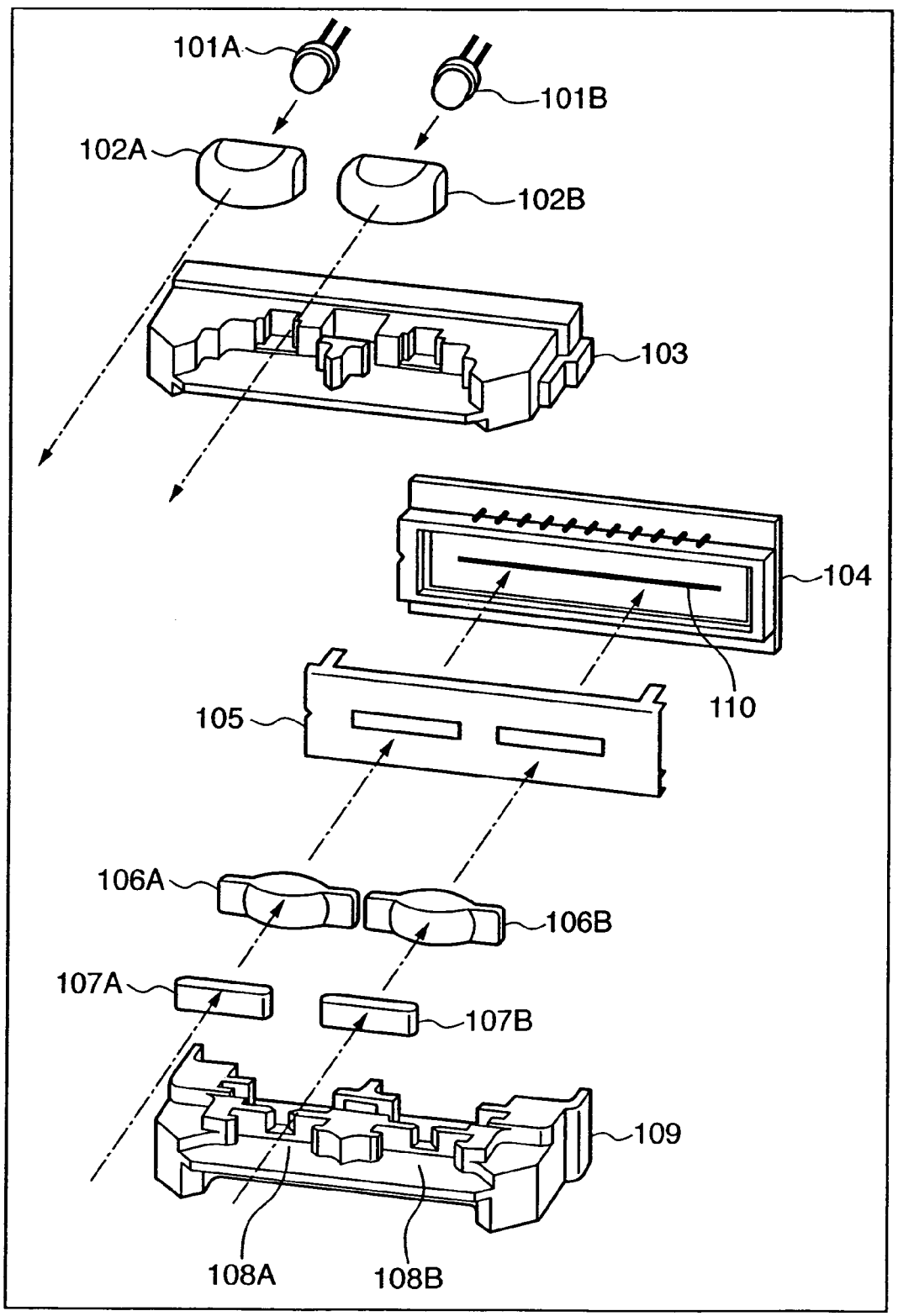
FIG. 2 is a view showing the detailed arrangement of a sensor unit according to the embodiment of the present invention.

FIG. 2 shows the detailed arrangement of the sensor unit according to the embodiment of the present invention.

Referring to FIG. 2, reference numerals 101A and 101B denote infrared LEDs for emitting infrared light. The infrared LEDs 101A and 101B project light toward the retroreflecting members 4 by light-projecting lenses 102A and 102B within a range of about 90°. The light-projecting unit in each of the sensor units 1L and 1R is realized by the infrared LEDs 101A and 101B and the light-projecting lenses 102A and 102B. Hence, each of the sensor units 1L and 1R comprises two light-projecting units.

The infrared light beams projected by the light-projecting units are retroreflected by the retroreflecting members 4 in the arrival direction, and the light-receiving units in the sensor units 1L and 1R detect these light beams.

Each light-receiving unit has a one-dimensional line CCD 104 provided with a shield 105 that limits the visual field of light rays and applies an electrical shield. In addition, the light-receiving unit has light-receiving lenses 106A and 106B as a collection optical system, stops 108A and 108B that roughly limit the incident direction of incident light, and infrared filters 107A and 107B that prevent extra light (disturbance light) such as visible light and the like from entering.

The light beams reflected by the retroreflecting members 4 are focused on the surface of a detection element 110 of the line CCD 104 by the light-receiving lenses 106A and 106B via the infrared filters 107A and 107B and the stops 108A and 108B. In this way, each of the sensor units 1L and 1R includes the two light-receiving units.

Members 103 and 109 respectively serve as an upper hood (103) and lower hood (109) on which optical components that form the light-projecting units and light-receiving units are arranged, and which prevent light projected by the light-projecting units from directly entering the light-receiving units, or cut external light.

In this embodiment, the stops 108A and 108B are integrally molded on the lower hood 109, but may be formed as independent components. Furthermore, by forming alignment portions of the stops 108A and 108B and the light-receiving lenses 106A and 106B on the upper hood 103 side, an arrangement that facilitates alignment of the light-receiving units with respect to the light-projecting centers of the light-projecting units (i.e., an arrangement that can lay out all principal optical components only on the upper hood 103) can also be implemented.

Figure 3A:
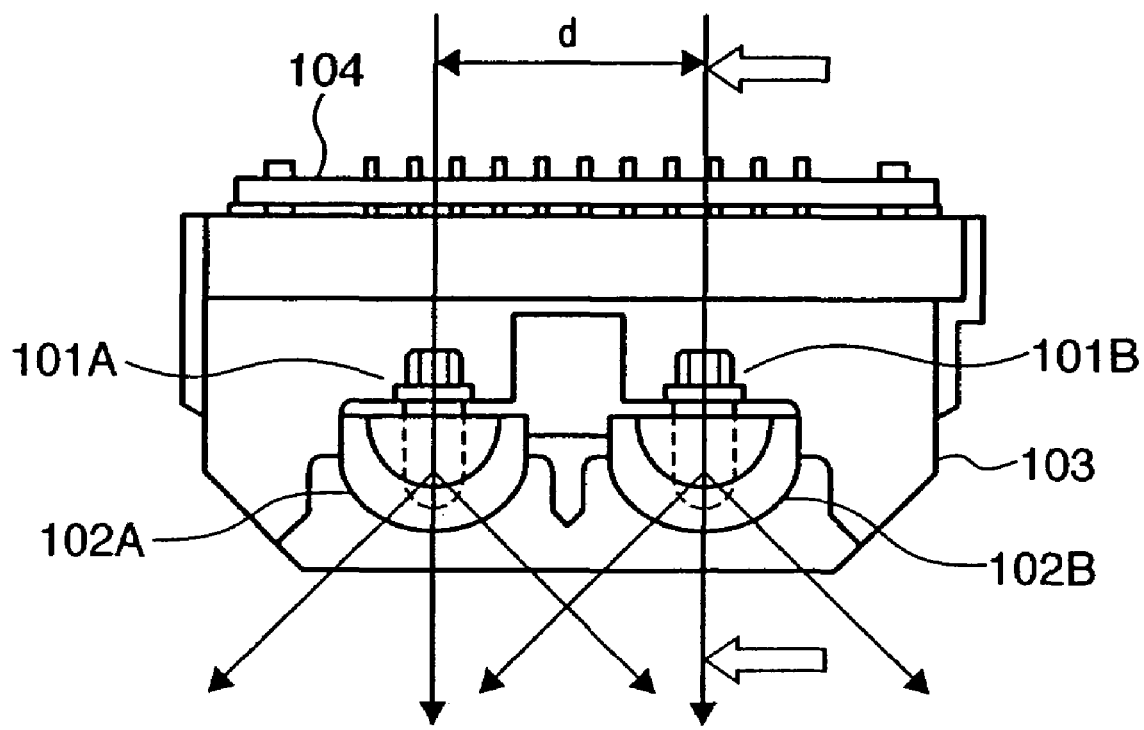
FIG. 3A is a view showing an optical layout of the sensor unit according to the embodiment of the present invention.

FIG. 3A is a view showing the assembled state of the sensor unit 1L (1R) in the state of FIG. 2 when viewed from the front direction (a direction perpendicular to the coordinate input surface). As shown in FIG. 3A, the two light-projecting units in the sensor unit 1L (1R) are arranged to be spaced apart by a predetermined distance d so that their chief ray directions extend substantially parallelly, and project light within the range of about 90° by the light-projecting lenses 102A and 102B.

Figure 3B:
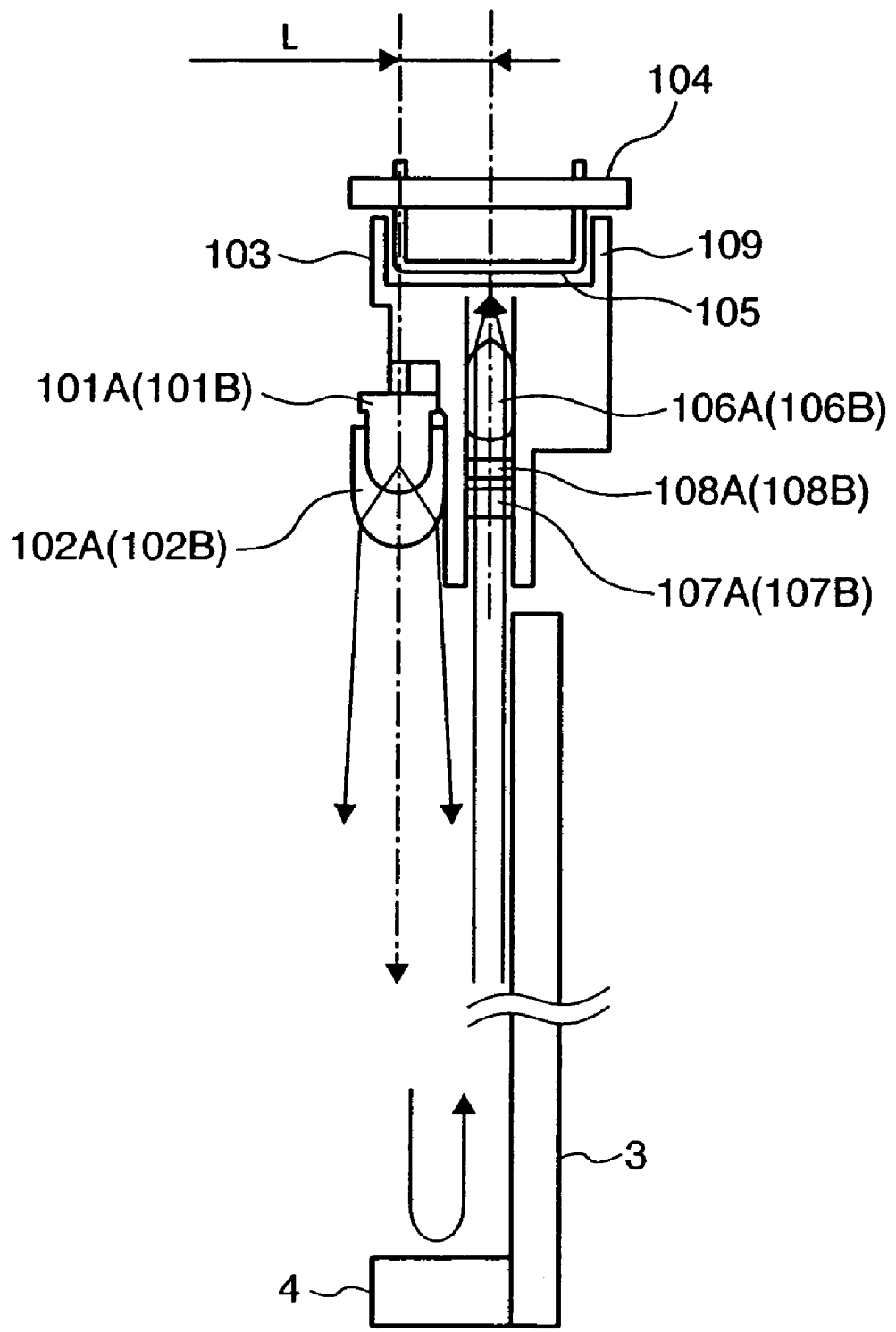
FIG. 3B is a view showing an optical layout of the sensor unit according to the embodiment of the present invention.

FIG. 3B is a sectional view of the sensor unit 1L (1R) of a portion indicated by the bold arrows in FIG. 3A. As shown in FIG. 3B, light emitted by the infrared LED 101A (101B) is projected by the light-projecting lens 102A (102B) mainly toward the retroreflecting members 4 as a light beam which is limited substantially parallelly to the coordinate input surface.

Figure 3C:
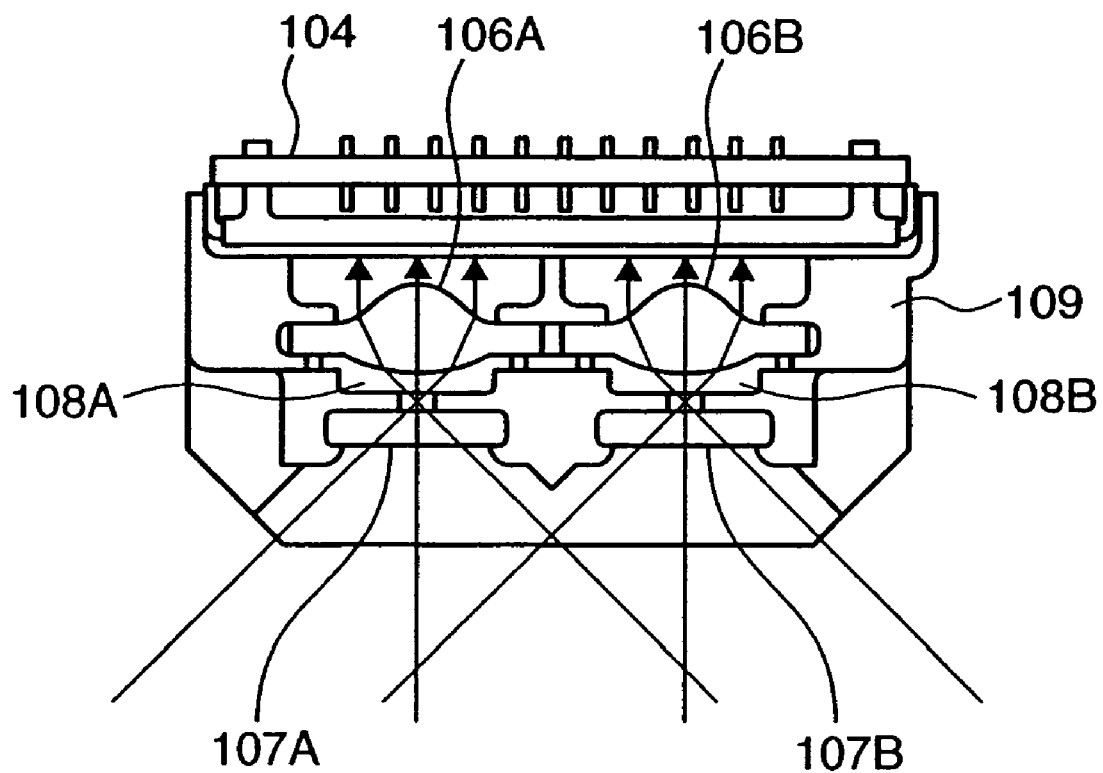
FIG. 3C is a view showing an optical layout of the sensor unit according to the embodiment of the present invention.

On the other hand, FIG. 3C is a view showing the state wherein the infrared LEDs 101A and 101B, light-projecting lenses 102A and 102B, and upper hood 103 in FIG. 3A are removed when viewed from the front direction (a direction perpendicular to the coordinate input surface).

In this embodiment, the light-projecting units and light-receiving units adopt a layout (see FIG. 3B) in which they are stacked in the direction perpendicular to the coordinate input effective region 3 as the coordinate input surface. In this case, the light-projecting units and light-receiving units have a structure in which the emission center of each light-projecting unit matches a reference position (corresponding to a reference point position used to measure an angle, and the position of the stop 108A (108B) in this embodiment, i.e., the intersection of light rays in FIG. 3C) of each light-receiving unit, when viewed from the front direction (a direction perpendicular to the coordinate input surface).

Therefore, as described above, the two light-projecting units are arranged to be spaced apart by the predetermined distance d so that their chief ray directions extend substantially parallelly. Hence, the two light-receiving units are also arranged to be spaced apart by the predetermined distance d, so that their optical axes (optical symmetric axes) extend substantially parallelly.

A light beam, which is projected by each light-projecting unit and is substantially parallel to the coordinate input surface, i.e., light projected in the range of about 90° in an in-plane direction, is retroreflected by the retroreflecting members 4 in the arrival direction of light. This light is focused and imaged on the surface of the detection element 110 of the line CCD 104 via the infrared filter 107A (107B), stop 108A (108B), and light-receiving lens 106A (106B).

Therefore, since the output signal of the line CCD 104 outputs the light amount distribution according to the incidence angle of reflected light, the pixel number of each pixel that forms the line CCD 104 indicates angle information.

Note that a distance L between the light-projecting unit and light-receiving unit shown in FIG. 3B assumes a value sufficiently smaller than the distance from the light-projecting unit to the retroreflecting member 4. Hence, even with the distance L, sufficient retroreflected light can be detected by each light-receiving unit.

As described above, the sensor unit 1L (1R) adopts an arrangement having at least two light-projecting units and two light-receiving units for respectively detecting light projected by these light-projecting units (in this embodiment, two pairs of light-projecting units and light-receiving units).

In this embodiment, the left-side portion of the detection element 110 linearly arranged on the line CCD 104 as a part of the light-receiving units is used as a focusing region of the first light-receiving unit, and the right-side portion is used as that of the second light-receiving unit. With this arrangement, the components are commonized. However, the present invention is not limited to such specific arrangement, and line CCDs may be independently provided to the light-receiving units.

<Detailed Description Associated with Optical Layout of Sensor Unit 1>

Figure 4:
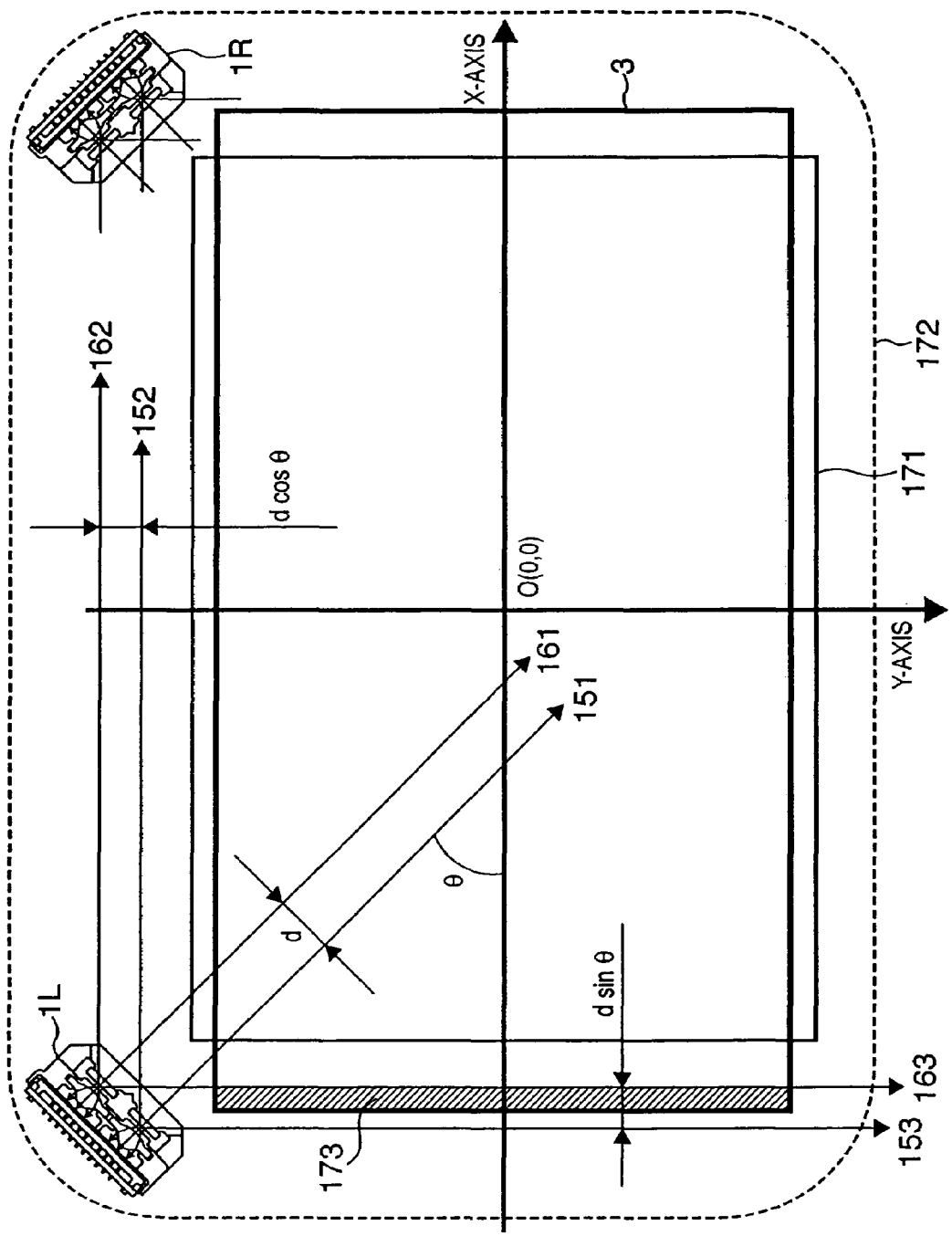
FIG. 4 is an explanatory view for explaining an optical layout of the coordinate input apparatus according to the embodiment of the present invention.

FIG. 4 is an explanatory view for explaining the optical layout of the coordinate input apparatus according to the embodiment of the present invention.

The layout of the left sensor unit 1L will be especially explained in FIG. 4. Note that the right sensor unit 1R has substantially the same features as those of the left sensor unit 1L, except that it is symmetric to the left sensor unit 1L about the Y-axis in FIG. 4, and a description thereof will be omitted.

As described above, the sensor unit 1L has two pairs of light-projecting units and light-receiving units, and their optical axes (optically symmetric axes; corresponding to light rays 151 and 161) are arranged substantially parallelly to be spaced apart by the predetermined distance d.

Note that the horizontal direction of the coordinate input effective region 3 is defined as the X-axis, its vertical direction is defined as the Y-axis, and the angle the optical axis intersects with the X-axis, as shown in FIG. 4, is defined as Θ. The light-projecting range of one light-projecting unit (or the detection angle range of one light-receiving unit) in the sensor unit 1L is defined by light rays 152 and 153, and that of the other light-projecting unit is defined by light rays 162 and 163.

The effective visual field range of two optical units (light-projecting unit and light-receiving unit) defined by the light rays 152 and 153 or the light rays 162 and 163 is about 90°. Of course, the effective visual field range can be set to be, e.g., 100°. However, when the effective visual field range is set and designed to be broader, the optical distortion of optical components (e.g., lenses) that form the optical units becomes larger, and it is disadvantageous to form an inexpensive optical system.

Therefore, in order to obtain pointed position information of the pointer, which shields the projected light, by the respective light-receiving units, it is preferable to set the coordinate input effective region within a region defined by the light rays 152 and 163. Hence, when a region 171 is set as the coordinate input effective region, as shown in FIG. 4, the two light-receiving units in the sensor unit 1L can detect the light-shielded position of the pointer (light-shielding material) in the region 171.

However, with this setting, for example, a housing frame determined by the relationship of a housing 172 of the coordinate input apparatus that incorporates respective components and the coordinate input region 171 becomes large. For this reason, the overall size of the coordinate input apparatus becomes large compared to the operative region. In order to solve this problem, the predetermined distance d between the two pairs of optical units (light-projecting units and light-receiving units), which is defined by the light rays 151 and 161 is preferably reduced as well as a size reduction of the sensor unit 1L (1R).

In the coordinate input apparatus of this embodiment, in order to minimize the size of the housing frame determined by the coordinate input effective region 3 and housing 172, the effective visual field of one light-receiving unit in the sensor unit 1L (1R) covers the full coordinate input effective region 3. Also, a region defined by a region 173 in FIG. 4 of the other light-receiving unit is set to fall outside the effective visual field.

The principal object of the present invention is to accurately obtain position information of a plurality of simultaneous coordinate input operations even when the coordinate input operations are simultaneously made by a plurality of shielding materials (dedicated pointers, fingers, or the like), i.e., a plurality of objects, as has been described in the paragraphs of <SUMMARY OF THE INVENTION> and the like.

A practical use example will be examined. For example, assume that the coordinate input apparatus (coordinate input effective region) of the present invention is used as a display screen of a display device. Alternatively, assume that the coordinate input apparatus is used as an input/output integrated display (a display area corresponds to, e.g., 60 inches, ad its aspect ratio is 16:9; in case of this assumption, the display area size is 1,330 mm (horizontal)×750 mm (vertical)). With such display, a coordinate input operation can be made using the pointer, and the input trace can be displayed as handwriting on the display. In this way, an information input/output apparatus which is configured as if traces such as characters, graphics, and the like were input on a whiteboard using a writing tool can be realized (in this case, the Y-axis direction in FIG. 4 agrees with the vertical direction).

A state wherein a plurality of coordinate input operations are made and these traces are displayed sequentially is premised on that there are a plurality of operators. At this time, these operators make operations while standing in front of the display. For this reason, in a normal use, the operators are located on the left and right sides in front of the screen, and make a coordinate input operation on a relative left-side region on the display screen, and that on a relatively right-side region on the screen.

Two operators rarely make coordinate input operations simultaneously on the region 173 with mutual cooperation in input postures. Even if simultaneous input operations on the region 173 are inhibited in the specification, product operability is not greatly limited.

Furthermore, it is possible to detect a plurality of simultaneous input operations on the region 173 by the method to be described later. In this case, an informing unit that informs accordingly (warning) may be provided.

Also, the presence/absence of a coordinate input by the pointer may be detected using the light-receiving unit which has an effective visual field that also covers the region 173, and for example, a plurality of light-shielded ranges may be detected based on the detection result. In such case, the other light-receiving unit detects the light-shielded range as needed. As a result, the coordinate sampling rate determined by the operation time can be improved, or power savings or a size reduction of the housing structure can be achieved, as will be described later.

By decreasing the predetermined distance d mentioned above, the region 173 that falls outside the effective visual field of one light-receiving unit can be reduced. However, that region may be reduced by adjusting the angle Θ defined above.

That is, in FIG. 4, θ is set to be about 45°, but the present invention is not limited to this. For example, the region 173 can be reduced by setting θ to be a larger value (e.g., 48°) on the basis of the positional relationship between the position of the sensor unit 1L (1R) and the coordinate input effective region 3 (since the light ray 163 rotates clockwise, the lower region of the region 173 is included in the effective visual field in accordance with the setting angle. On the other hand, the other effective visual field rotates at the same time. However, in this case, the effective visual field covers the full coordinate input effective region 3).

As described above, the two pairs of optical systems (light-projecting units and light-receiving units) in the sensor unit 1L (1R) respectively have the effective visual fields of about 90°, and the predetermined distance d between the symmetric axes of the two pairs of optical systems is set to be a smaller value. As a result, as can be seen from the above description, the housing frame can be reduced, and the region 173 which is set based on the specification can be reduced.

<Detailed Description of Detection Signal Waveform of Sensor Unit 1L (1R)>

Detection signal waveforms obtained by the plurality of light-receiving units in the sensor unit 1L (1R) will be explained below using FIGS. 5A to 5C.

Note that the following explanation will be given focusing on the sensor unit 1L, but the same applies to the sensor unit 1R.

Figure 5A:
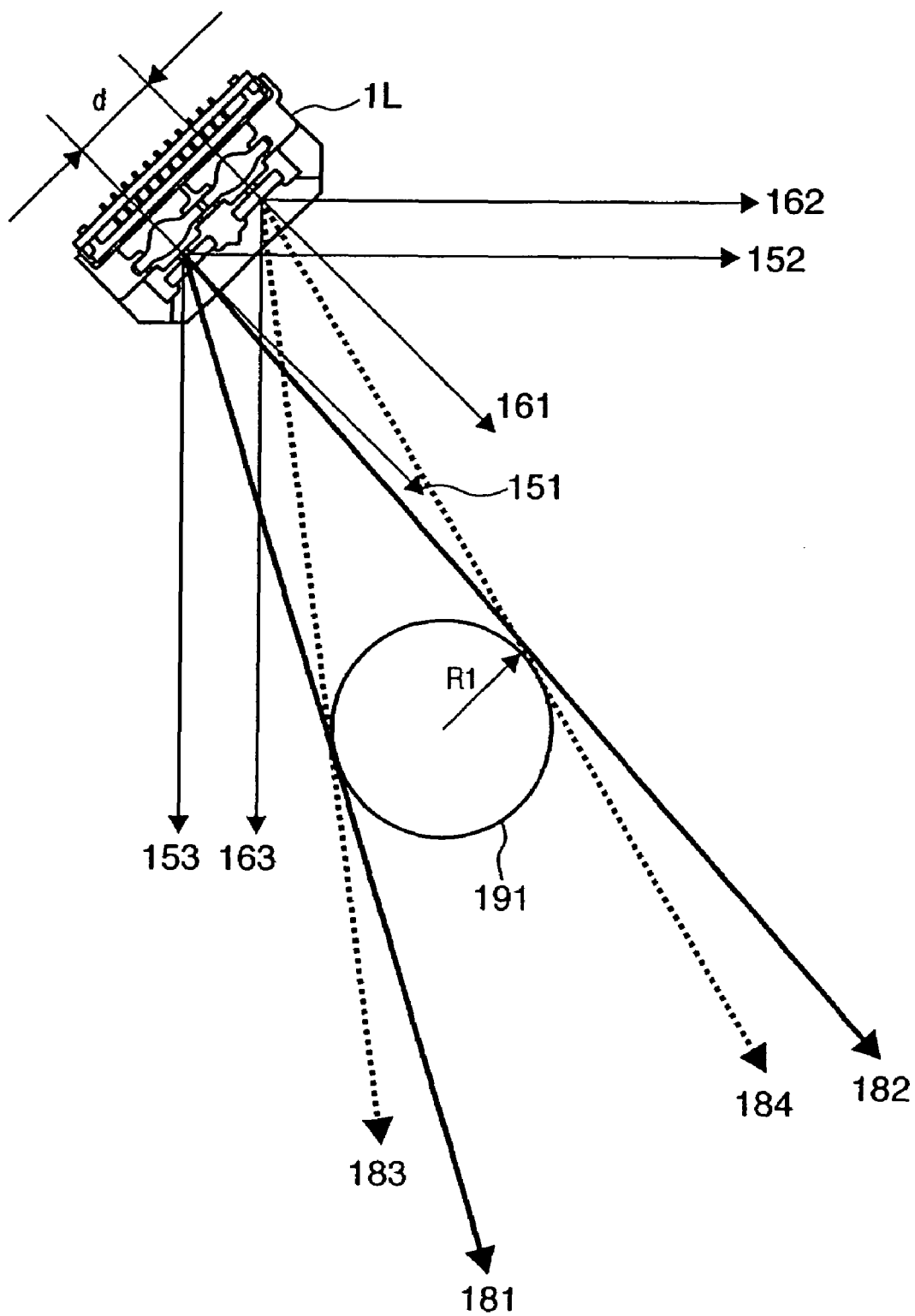
FIG. 5A is a view for explaining an output signal waveform of the sensor unit according to the embodiment of the present invention.

As shown in FIG. 5A, the direction of the optical symmetric axis of a light ray projected by one light-projecting unit A (or the effective visual field of the light-receiving unit A) in the sensor unit 1L is indicated by a light ray 151, and its light-projecting range is defined by light rays 152 and 153. The direction of the optical symmetric axis of the other light-projecting unit B (or light-receiving unit B) in the sensor unit 1L is indicated by a light ray 161, and its light-projecting range is defined by light rays 162 and 163.

The light-receiving unit A or B actually detects a light ray which is projected by each light-projecting unit after it is retroreflected by the retroreflecting members 4. For this reason, the detection range of light to be actually detected is determined by the layout of the retroreflecting members 4, and is normally smaller than the effective visual field.

With this layout, when a coordinate input operation is made using a columnar pointer 191 having a radius R1, light projected by the light-projecting unit A is shielded within a range between light rays 181 and 182 in the light-receiving unit A. As a result, the light-receiving unit A cannot receive the light within this range. On the other hand, the light-receiving unit B in this state cannot similarly detect light from the light-projecting unit B within a range between light rays 183 and 184.

Figure 5B:
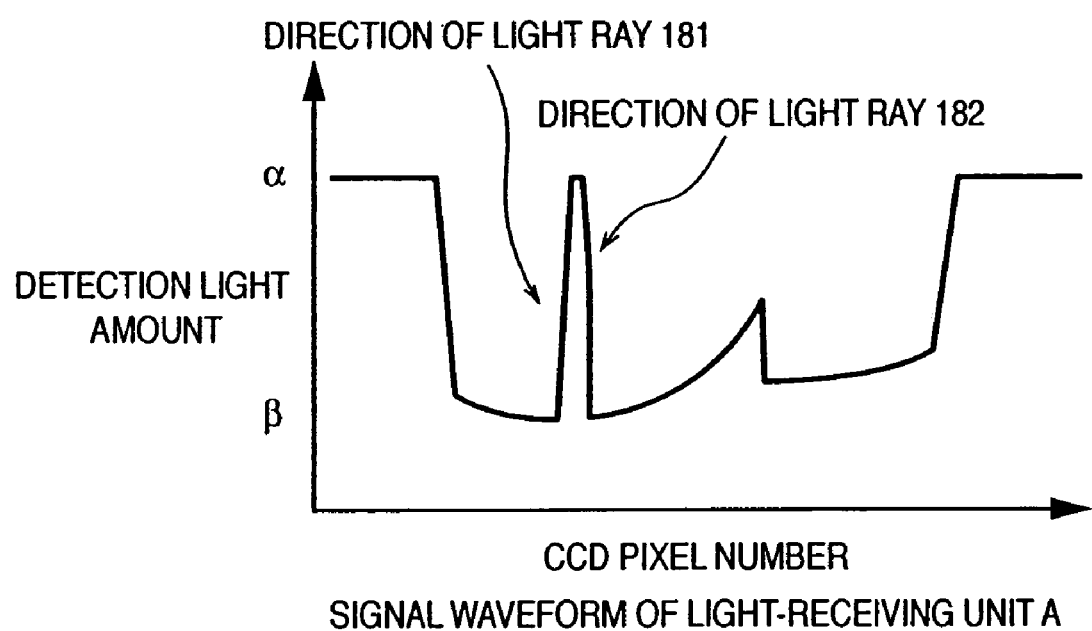
FIG. 5B is a chart for explaining an output signal waveform of the sensor unit according to the embodiment of the present invention.
Figure 5C:
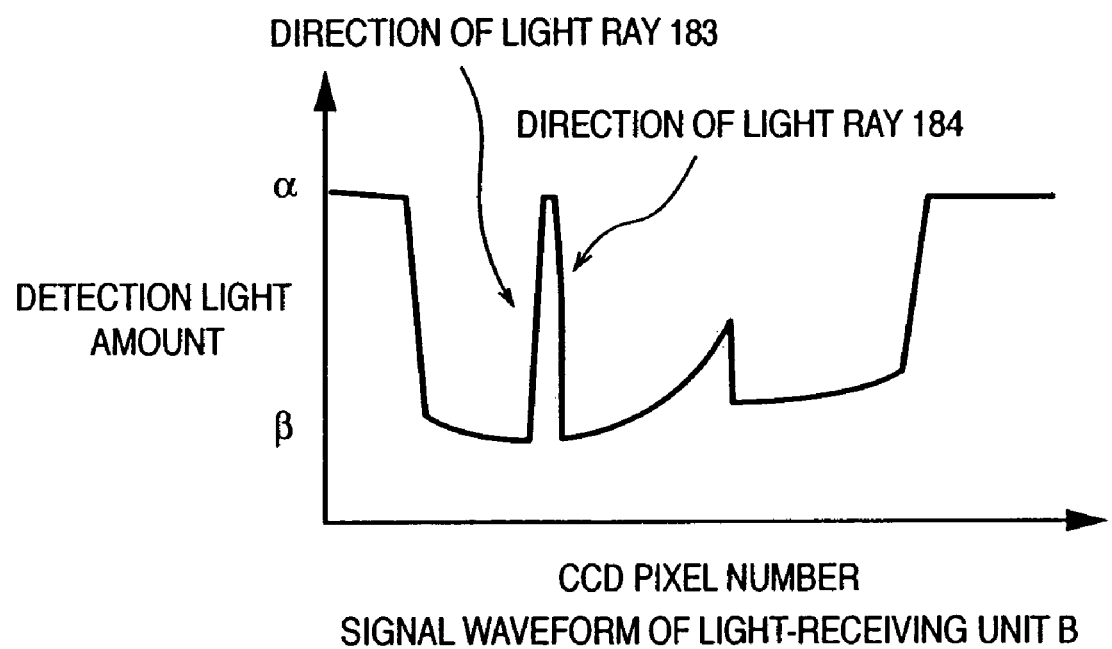
FIG. 5C is a chart for explaining an output signal waveform of the sensor unit according to the embodiment of the present invention.

FIGS. 5B and 5C show the detection signal waveforms of the light-receiving units A and B.

In FIGS. 5B and 5C, the abscissa plots the CCD pixel numbers of the line CCD 104 indicating the angle information, and the ordinate plots the detection light amount. For example, a level of a detection light amount α corresponds to a state wherein no light signal is obtained at all, and the intensity of the received light signal increases toward a detection light amount β.

When the pointer 191 is set within the effective visual field, the light-receiving unit A cannot detect light from the direction of the light ray 181 to the direction of the light ray 182, as shown in FIG. 5B. Also, the light-receiving unit B cannot detect light from the direction of the light ray 183 to the direction of the light ray 184, as shown in FIG. 5C.

Note that there are various factors: light projected by the light-projecting unit has a different light intensity depending on its light-projecting direction, light has a different incidence angle on the retroreflecting member 4 depending on its light-projecting direction (in general, the retroreflection efficiency of the retroreflecting member 4 lowers with increasing light incidence angle), the distance from the light-projecting unit to the retroreflecting member 4 varies depending on the light-projecting direction, or the like. As a result, for example, the detection light amount (light intensity) β detected by the light-receiving unit does not generally become constant depending on the light-receiving direction (angle).

Simultaneous coordinate input operations using two pointers will be described below.

FIG. 6 shows a state wherein coordinate input operations are simultaneously made by a pointer 192 having the same shape as the pointer 191 in addition to the pointer 191 shown in FIG. 5A.

For the sake of simplicity, assume that the pointer 191 is kept pointing a predetermined position. On the other hand, assume that the pointer 192 moves in turn from position I to position II, and to position VII.

Figure 7:
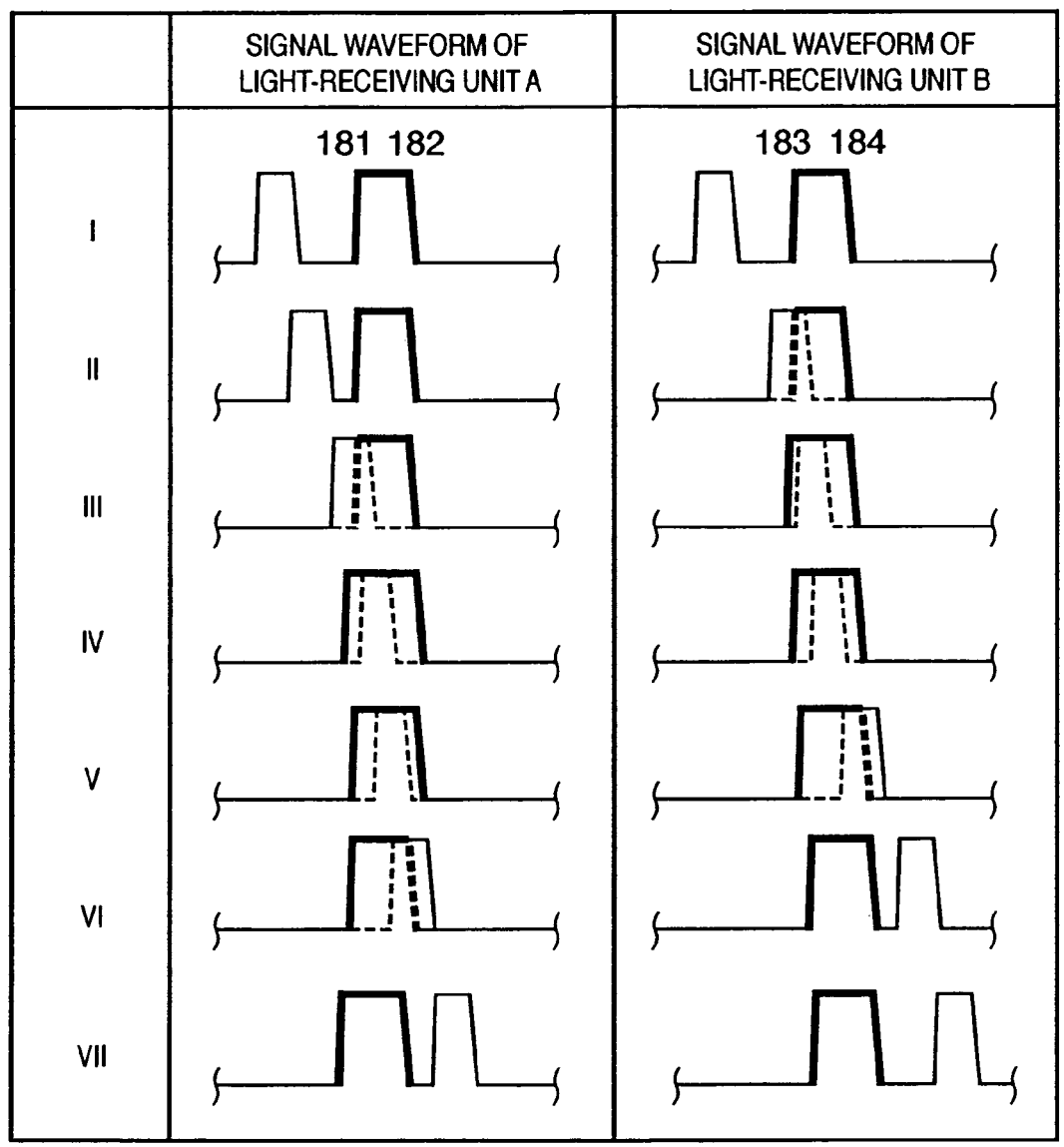
FIG. 7 shows output signal waveforms of the sensor unit when inputs are made by the plurality of pointers according to the embodiment of the present invention.

FIG. 7 shows the outputs of the light-receiving units A and B when the pointer 192 is located at positions I to VII. FIG. 7 illustrates, in an enlarged scale, a neighboring range of the directions of the light rays 181 and 182 in FIG. 5B, and a neighboring range of the directions of the light rays 183 and 184. Also, a bold light-shielded portion in FIG. 7 indicates the light-shielded range of the pointer 191, and a thin light-shielded portion indicates the light-shielded range of the pointer 192.

Therefore, the pointer 191 is located closer to the sensor unit 1L than the pointer 192. For this reason, the light-shielded range of the pointer 191 becomes larger than that of the pointer 192 on the CCD pixels of the line CCD 104.

When the pointer 192 is located at position I in FIG. 6, it exists at a position independent of the range between the light rays 181 and 182 and that between the light rays 183 and 184.

For this reason, in I of FIG. 7, both the light-receiving units A and B detect the two light-shielded ranges by the pointers 191 and 192.

However, when the pointer 192 is located at position II in FIG. 6, it shields the light ray 183 (it does not shield other light rays 181, 182, and 184 yet). For this reason, in II of FIG. 7, the light-receiving unit B detects only one light-shielded range as an overlapping range of the light-shielded ranges of the pointers 191 and 192. In this case, this one light-shielded range is formed by the light-shielded range portion of the pointer 192 on the left side, and the light-shielded range portion of the pointer 191 on the right side.

Furthermore, when the pointer is located at position III, it is included within the range between the light rays 183 and 184 of the light-projecting unit B. For this reason, the light-shielded range of the light-receiving unit B at position III is generated by only the pointer 191, and information associated with the light-shielded range of the pointer 192 cannot be detected at all.

On the other hand, in the light-receiving unit A in this state, the pointer 192 is located at a position where it shields the light ray 181. For this reason, the light-shielded range detected by the light-receiving unit A at position III is formed by only one light-shielded range as an overlapping range of the light-shielded ranges of the pointers 191 and 192. In this case, this one light-shielded range is formed by the light-shielded range portion of the pointer 192 on the left side, and the light-shielded range portion of the pointer 191 on the right side.

When the pointer 192 is located at position IV falling within the range between the light rays 181 and 184, the light-shielded ranges of the light-receiving units A and B are formed by only the pointer 191 and are not influenced by the pointer 192. That is, no information associated with the light-shielded range of the pointer 192 can be detected at all.

Furthermore, when the pointer 192 is located at position V, it shields the light ray 184. For this reason, the light-receiving unit B detects only one light-shielded range as an overlapping range of the light-shielded ranges of the pointers 191 and 192. In this case, this one light-shielded range is formed by the light-shielded range portion of the pointer 191 on the left side, and the light-shielded range portion of the pointer 192 on the right side.

On the other hand, as for the light-receiving unit A, the pointer 192 is included within the range between the light rays 181 and 182. For this reason, the light-shielded range is formed by only the pointer 191 without being influenced by the pointer 192.

When the pointer 192 is located at position VI, two light-shielded ranges, i.e., those of the pointers 191 and 192, are formed for the light-receiving unit B. By contrast, the light-receiving unit A detects only one light-shielded range as an overlapping range of the light-shielded ranges of the pointers 191 and 192. In this case, this one light-shielded range is formed by the light-shielded range portion of the pointer 191 on the left side, and the light-shielded range portion of the pointer 192 on the right side.

Moreover, when the pointer 192 is located at position VII, both the light-receiving units A and B can detect the two light-shielded ranges, i.e., those of the pointers 191 and 192.

In the above description using FIGS. 6 and 7, only when the pointer 192 is located near position IV, the detection signal waveforms of the light-receiving units A and B are formed by the light-shielded range of only the pointer 191 irrespective of the position of the pointer 192. For this reason, information (position information) associated with the light-shielded range of the pointer 192 cannot be obtained at all.

Figure 8:
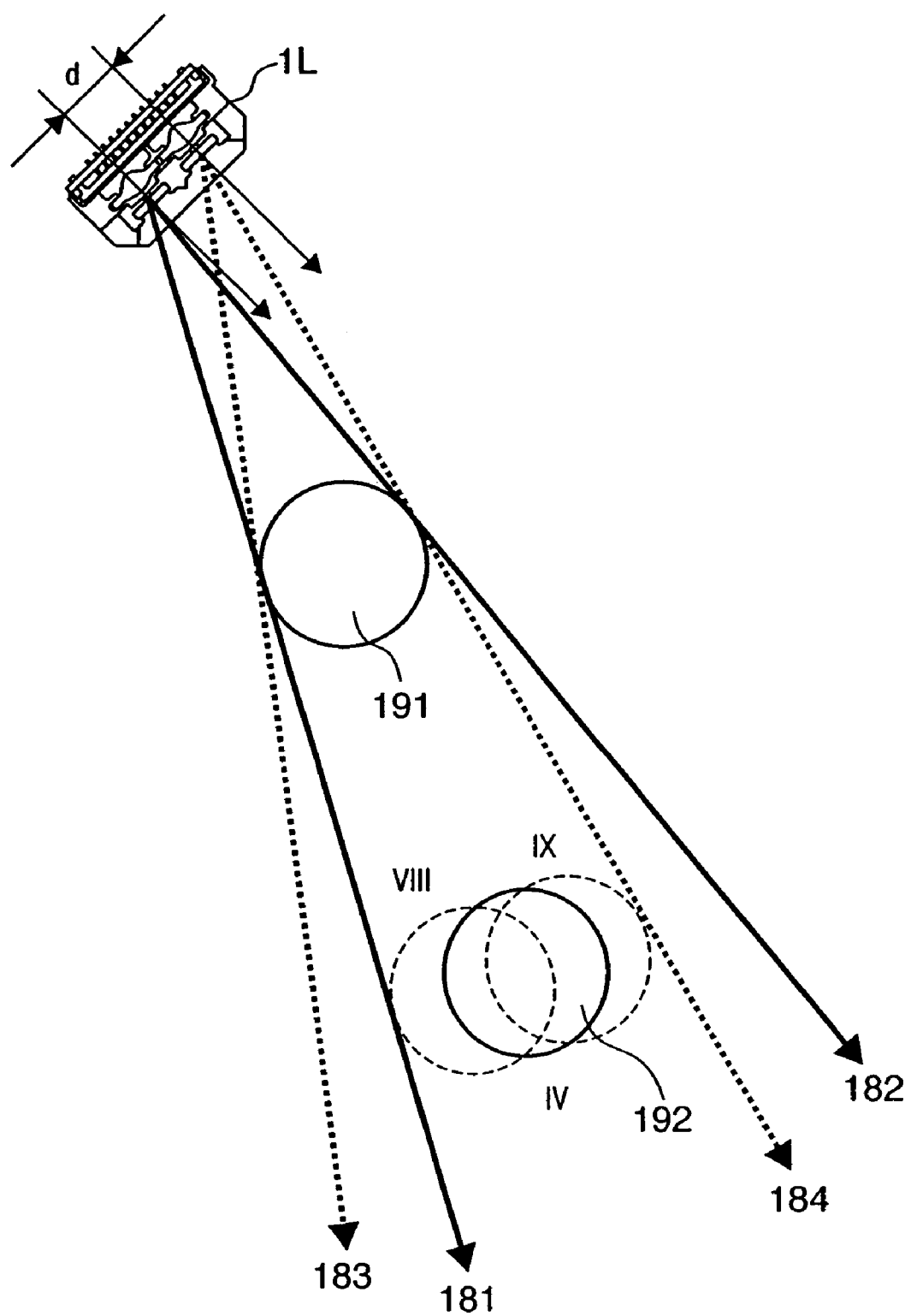
FIG. 8 is a view for explaining a problem in a total eclipse state according to the embodiment of the present invention.

That is, in FIG. 8, even when the pointer 192 is located at position IV or at position VIII or IX indicated by the broken lines in FIG. 8, the detection signals of the light-receiving units A and B in the sensor unit 1L remain unchanged. For this reason, it is impossible to calculate the coordinate position of the pointer 192 at that position.

On the other hand, at other positions (positions II, III, V, VI, and VII), even when only one light-shielded range is detected, either one of the two ends of that light-shielded range is formed by the pointer 191, and the other end is formed by the pointer 192. For this reason, the position information of each of the pointers 191 and 192 can be calculated at these positions. Note that a practical method of calculating position information will be explained later.

Hence, when the pointers 191 and 192 are located at position IV with respect to the sensor unit 1L, the position information of each of the pointers 191 and 192 can be acquired.

Figure 9:
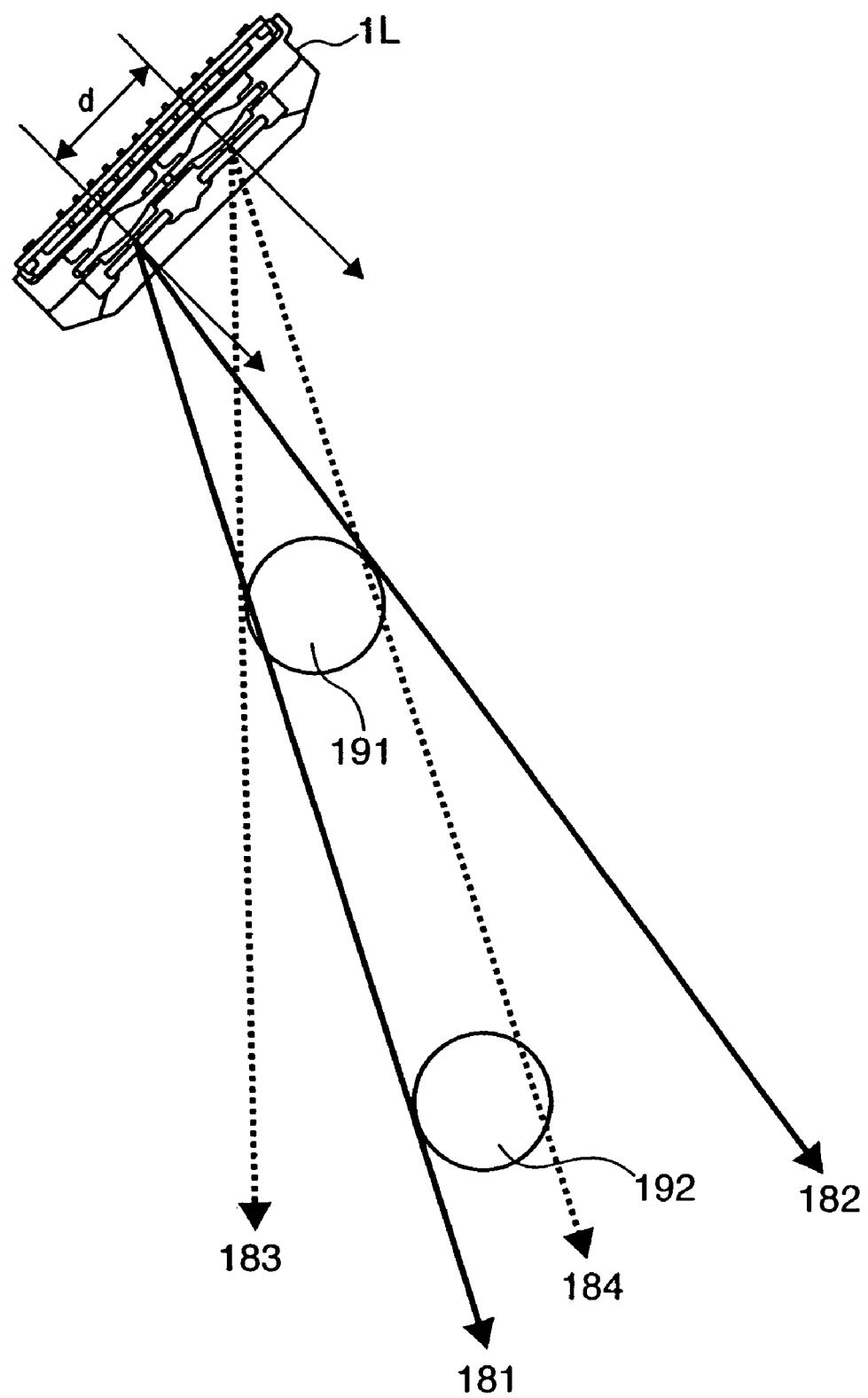
FIG. 9 is a view for explaining a distance D between two light-receiving units in the sensor unit according to the embodiment of the present invention.

Therefore, according to the present invention, as shown in FIG. 9, by assuring the predetermined distance d between the optical systems (light-projecting units and light-receiving units), which is sufficiently larger than the diameter (=R1×2) of the pointers 191 and 192, such state can be avoided.

FIG. 9 shows that state. The distance d is sufficiently larger than the diameter of the pointer 191. For this reason, a range formed by the light rays 181 and 184 is set to be narrower with increasing distance from the sensor unit 1L (in the layout shown in FIG. 6, the range formed by the light rays 181 and 184 broadens with increasing distance from the sensor unit 1L).

In other words, the light ray 181 of one light-receiving unit in the sensor unit 1L and the light ray 184 of the other light-receiving unit specified by the pointer located at a position closer to the sensor unit 1L (e.g., the pointer 191 in FIG. 9) necessarily intersect when they are extrapolated from the sensor unit 1L toward the coordinate input effective region.

Therefore, in FIG. 9, since the pointer 192 is located within the range between the light rays 181 and 182, the light-receiving unit A cannot obtain the position information of the pointer 192 at all. However, since the pointer 192 is located at a position where it shields the light ray 184, the light-receiving unit B can acquire the position information of the pointer 192.

That is, the predetermined distance d between the optical systems that form the sensor unit is set to have a length sufficiently larger than the diameter of the pointer. In this way, at least either light-receiving unit can acquire the position information of both the pointers 191 and 192.

<Detailed Description of Predetermined Distance d Between Optical Systems>

As described above, the predetermined distance d between the two pairs of optical systems assembled in the sensor unit 1L (1R) is preferably smaller so as to manufacture a compact, inexpensive apparatus. On the other hand, the predetermined distance d is preferably sufficiently larger than the diameter of the pointer if the coordinate inputs using a plurality of shielding materials are assumed. Therefore, an optimal value that satisfies these conflicting requirements will be explained.

Referring back to FIG. 4, even when the coordinate inputs are made within the coordinate input effective region 3 using a plurality of pointers, the light ray 181 of one light-receiving unit in the sensor unit 1L and the light ray 184 of the other light-receiving unit specified by the pointer located at a position closer to the sensor unit 1L must necessarily intersect when they are extrapolated from the sensor unit 1L toward the coordinate input effective region, as shown in FIG. 9.

As shown in FIG. 4, let θ be the angle the symmetric axis of each of the two pairs of optical systems makes with the X-axis of the coordinate system. Then, in order meet the aforementioned condition, the following condition is required. That is, when the pointer 191 is located in a direction directly below the sensor unit 1L (e.g., in the direction of the light ray 153), d sin θ>2R1 must hold. On the other hand, when the pointer 191 is located in a direction right beside the sensor unit 1L (e.g., in the direction of the light ray 152), d cos θ>2R1 must hold.

That is, an X-axis projected distance dx (=d sin θ) obtained by projecting the predetermined distance d between the optical symmetric aces of the two optical systems in the sensor unit 1L or a Y-axis projected distance dy (=d cos θ) need only be set to be larger than the diameter (=2R1) of the pointer.

Furthermore, if θ=45°, the X-axis projected distance dx equals the Y-axis projected distance dy. For example, if the diameter of the pointer is 14 mm, the predetermined distance d must be set to be larger by about 20 mm. Of course, if θ assumes a value other than 45°, a larger one of the X-axis projected distance dx and Y-axis projected distance dy can be set as the predetermined distance d.

The diameter of the pointer will be described in detail below. Since the coordinate input method covered by the present invention is a light shielding method for detecting the position (direction) of a pointer when light projected by a light-projecting unit is shielded by the pointer, a maximum diameter of a portion where the pointer shields a light beam projected nearly parallelly to the coordinate input surface is the diameter of the pointer.

That is, the light beam is shielded by a portion near the tip of the pointer. For this reason, assuming that the light beam projected nearly parallelly to the coordinate input surface travels at a level of 3 to 10 mm from the coordinate input surface, the diameter of the pointer is a maximum diameter within a range from 3 to 10 mm from the tip of the pointer or an average diameter within that range.

Geometrically, as described above, the aforementioned problems can be solved as long the distance d is larger than the diameter of the pointer. However, in practice, there are the influences of the optical resolving power (resolution) based on the pixel pitch, optical performance, and the like of the line CCD 104, electric noise, and the like. For this reason, it is preferable to allow a margin (e.g., 1.5 times the diameter of the pointer) with respect to the diameter of the pointer. The range that allows the margin is defined as a range substantially equal to the diameter of the pointer.

In FIG. 4, for example, the direction of the light ray 153 is not included in the coordinate input effective region 3 due to the layout relationship between the position of the sensor unit 1L and the coordinate input effective region 3, and the X-axis projected distance dx must be set under a stricter condition in practice upon setting the predetermined distance d.

That is, in the above description, the predetermined distance d>20 mm or more using the X-axis projected distance dx. However, in consideration of an actual layout of the sensor unit 1 of the coordinate input effective region 3, for example, the predetermined distance d>19 mm often suffices.

Therefore, when the predetermined distance d is determined using the X-axis projected distance dx or Y-axis projected distance dy, a larger predetermined distance d must be generally set. For this reason, a disadvantageous result is derived in terms of a size reduction of the apparatus.

In other words, even when the X-axis projected distance dx or Y-axis projected distance dy is set to be equal to the diameter of the pointer, two pieces of simultaneously input position (angle) information of the two pointers can be obtained with a sufficient margin.

Therefore, in the present invention, the predetermined distance d is set to be a larger one of the X-axis projected distance dx and Y-axis projected distance dy. Hence, even when a plurality of simultaneous inputs are made, signals required to obtain each position (angle) information can be detected, and an extra region formed outside the coordinate input effective region 3 is reduced, thus reducing the size of the overall apparatus as much as possible.

<Description of Control/Arithmetic Unit>

The control/arithmetic unit 2 and the sensor units 1L and 1R mainly exchange CCD control signals for the line CCD 104 in the light-receiving units, CCD clock signals and output signals, and drive signals for the infrared LEDs 101A and 101B in the light-projecting units.

The detailed arrangement of the control/arithmetic unit 2 will be explained below using FIG. 10.

Figure 10:
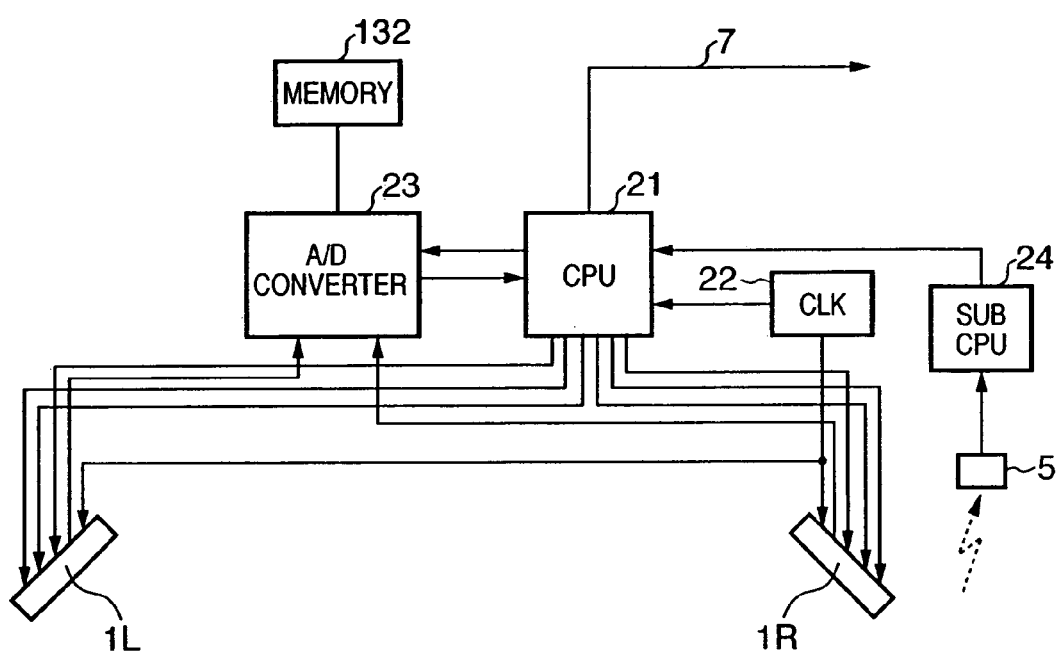
FIG. 10 is a block diagram showing the detailed arrangement of a control/arithmetic unit according to the embodiment of the present invention.

FIG. 10 is a block diagram showing the detailed arrangement of the control/arithmetic unit according to the embodiment of the present invention.

The CCD control signals are output from an arithmetic control circuit (CPU) 21 comprising a 1-chip microcomputer or the like to set the shutter timing of the line CCD 104, and to attain the data output control and the like.

Note that this arithmetic control circuit 21 operates in response to clock signals from a clock generation circuit (CLK) 22. The CCD clock signals are transmitted from the clock generation circuit (CLK) 22 to the sensor units 1L and 1R, and are also input to the arithmetic control circuit 21 to attain various kinds of control in synchronism with the line CCDs 104 in the sensor units.

The LED drive signals for driving the infrared LEDs 101A and 101B in the light-projecting units are supplied from the arithmetic control circuit 21 to the infrared LEDs 101A and 101B in the light-projecting units of the corresponding sensor units 1L and 1R via an LED drive circuit (not shown).

Detection signals from the line CCDs 104 in the light-receiving units of the sensor units 1L and 1R are input to an A/D converter 23 and are converted into digital values under the control of the arithmetic control circuit 21. The converted digital values are stored in a memory 132, and are used in angle calculations of the pointers. Coordinate values are calculated from these calculated angles, and are output to an external terminal via the serial interface 7 (e.g., USB, IEEE1394, RS232C interface, or the like).

When a pen is used as the pointer, a pen signal receiver 5 that receives a pen signal from the pen outputs a digital signal generated by demodulating the pen signal. This digital signal is input to a sub CPU 24 as a pen signal detection circuit which interprets the pen signal, and outputs the interpretation result to the arithmetic control circuit 21.

<Description of Light Amount Distribution Detection>

Figure 11:
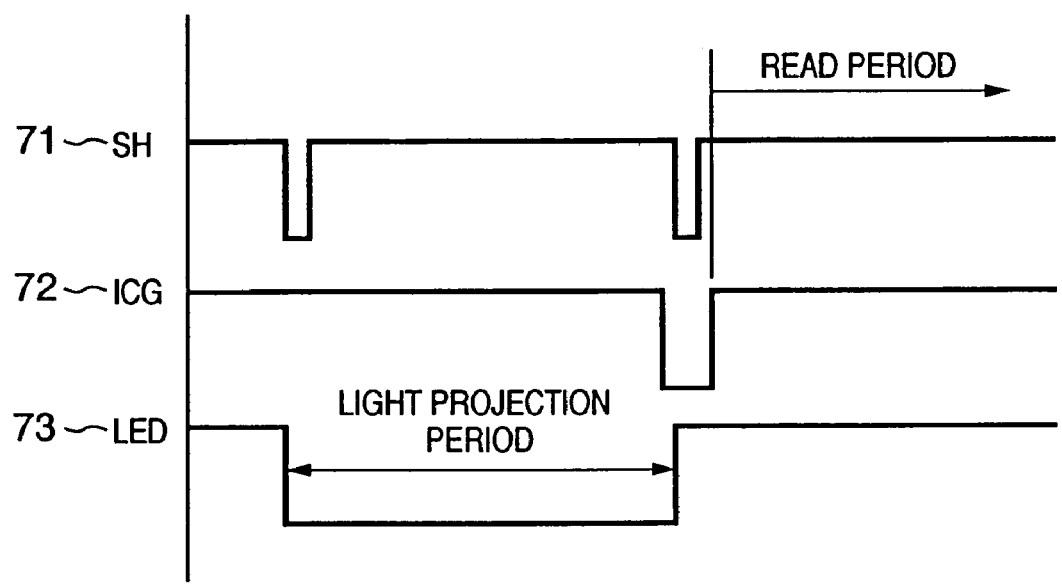
FIG. 11 is a timing chart of control signals according to the embodiment of the present invention.

FIG. 11 is a timing chart of control signals according to the embodiment of the present invention.

Especially, FIG. 11 is a timing chart of control signals to one light-receiving unit in the sensor unit 1L (1R) and the infrared LED 101A (101B) as illumination corresponding to that unit.

Reference numerals 71 and 72 denote control signals for CCD control. The shutter open time of the line CCD 104 is determined by the intervals of the SH signal 71. The ICG signal 72 is a gate signal to the sensor unit 1L (1R), and is used to transfer charges in a photoelectric conversion unit of the internal line CCD 104 to a read unit.

Reference numeral 73 denotes a drive signal of the infrared LED 101A (101B). In order to turn on the infrared LED 101A (101B) at the periods of the SH signal 71, the LED signal 73 is supplied to the infrared LED 101A (101B).

After the drive operations of the light-projecting units of both the sensor units 1L and 1R are complete, the detection signals of the light-receiving units (line CCDs 104) of both the sensor units 1L and 1R are read out.

Figure 12A:
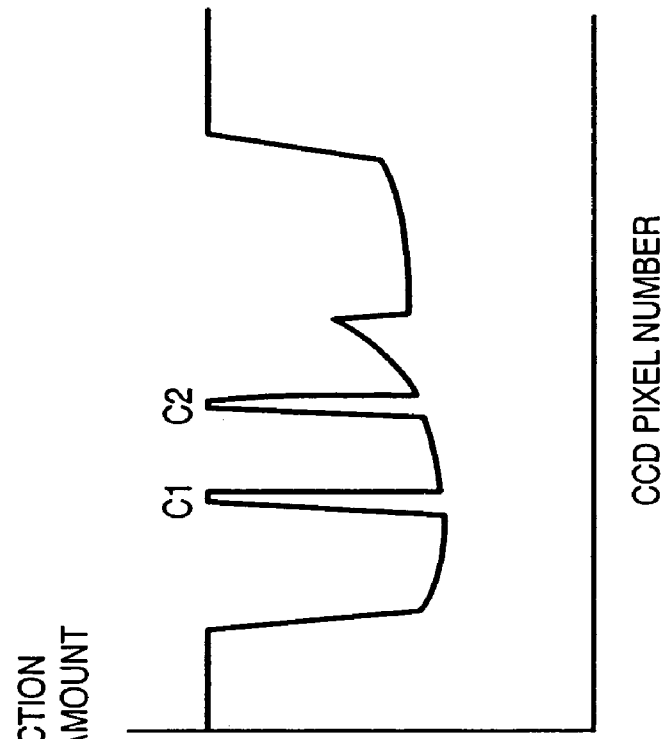
FIG. 12A is a chart for explaining the light amount distribution detected by the sensor unit according to the embodiment of the present invention.

As the detection signals read out from both the sensor units 1L and 1R, when no input is made using the pointer on the coordinate input effective region 3, a light amount distribution shown in FIG. 12A is obtained as the output from each sensor unit. Of course, this light amount distribution is not always obtained by every system, and changes depending on the retroreflection characteristics of the retroreflecting members 4, the characteristics of the light-projecting units, and aging (contamination on the reflecting surface).

In FIG. 12A, a level β corresponds to a maximum light amount, and a level α corresponds to a minimum light amount.

That is, in a state of no reflected light from the retroreflecting members 4, the light amount level obtained by the sensor units 1L and 1R is near the level α, and the light amount level shifts to the level β with increasing reflected light amount. In this way, the detection signals output from the sensor units 1L and 1R are sequentially A/D-converted by the A/D converter 23 into digital data, which are supplied to the arithmetic control circuit 21.

Figure 12B:
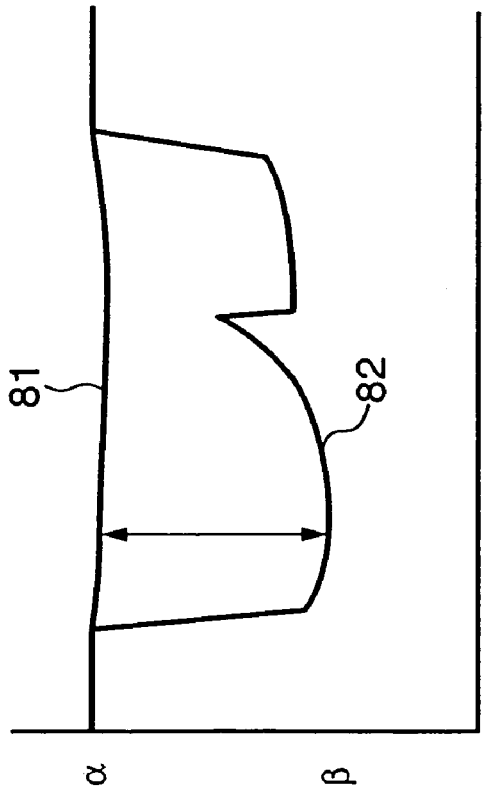
FIG. 12B is a chart for explaining the light amount distribution detected by the sensor unit according to the embodiment of the present invention.

By contrast, when an input is made on the coordinate input effective region 3 using the pointer, a light amount distribution shown in FIG. 12B is obtained as the outputs from the sensor units 1L and 1R.

As can be seen from FIG. 12B, since reflected light from the retroreflecting members 4 is shielded by the pointers in portions C1 and C2 of this light amount distribution, the reflected light amounts lower in these portions (light-shielded ranges).

In this embodiment, the angles of the pointers with respect to the sensor units 1L and 1R are calculated on the basis of the light amount distribution shown in FIG. 12A when no input is made by the pointer, and a change in light amount distribution shown in FIG. 12B when inputs are made by the pointers.

More specifically, as the light amount distribution shown in FIG. 12A, a light amount distribution 81 in a state wherein the light-projecting units do not project (illuminate) any light, and a light amount distribution 82 in a state wherein no input is made by the pointer (there is not shielding material) even during light projection (illumination) are stored in the memory 132 as an initial state.

Whether or not the light amount distribution has changes shown in FIG. 12B during the sampling period of the detection signals of the sensor units 1L and 1R is detected on the basis of the difference between the light amount distribution during the sampling period and those in the initial state stored in the memory 132. When the light amount distribution has changes, an arithmetic operation for determining input angles (determining the ends of the light-shielded ranges) using the changes as input points of the pointers is made.

As described above, according to the present invention, the plurality of light-receiving units are provided to one line CCD 104, and the light-projecting units are provided in correspondence with these light-receiving units. Therefore, when the individual light-receiving units (or light-projecting units) are to be driven at independent timings, they can be driven at the aforementioned signal timings.

FIG. 13 shows a timing chart example of these signals. In this timing chart, one light-receiving unit in the sensor unit 1L performs detection on the read head side of the line CCD 104 in the sensor unit 1L. For this purpose, the infrared LED (e.g., infrared LED 101A) is driven at a timing of a signal 63 with respect to an SH signal 61. A signal of the line CCD 104 is read out in response to an ICG signal 62. At this time, pixel data in a light-receiving range on the head side of the line CCD are read out (a portion A in a signal 65).

Next, the SH signal 61 is supplied to the line CCD 104 to perform detection by the other light-receiving unit in the sensor unit 1L. For this purpose, a drive signal 64 is supplied to the infrared LED (e.g., infrared LED 101B). As this output, the received signal is output to a region that does not overlap the signal (broken line portion) of the previously detected head portion, as in a portion B of the signal 65.

By similarly driving the other sensor unit 1R at another timing, CCD signals are read out from respective sensors. In the present invention, the detection signals from a maximum of four light-receiving units can be acquired.

In this embodiment, a total of four light-receiving units in the left and right sensor units 1L and 1R are driven at independent timings. However, the present invention is not limited to this. For example, the four light-receiving units may be driven at the same time or in arbitrary combinations as long as light emissions do not influence each other.

<Description of Angle Calculation>

In the angle calculations of the pointers with respect to the sensor units 1L and 1R, the light-shielded ranges by the pointers must be detected first.

The angle calculations of the pointers by one of the sensor units 1L and 1R (e.g., sensor unit 1L) will be explained below. Needless to say, the same angle calculations are made by the other sensor unit (sensor unit 1R).

The signals 81 and 82 shown in FIG. 12A are stored in the memory 132 as the light amount distributions upon power ON, and the input ranges (light-shielded ranges) of the pointers are detected by comparing these signals and the light amount distribution obtained by actual inputs of the pointer.

When an input that forms the light amount distribution having C1 and C2 is made, as shown in FIG. 12B, the difference between that light amount distribution and the light amount distribution 82 stored in the memory 132 is calculated. A light amount change rate from a case wherein no light shielding (input) is made is calculated using the calculation result, and the light amount difference between the light amount distributions 82 and 81. Since the light amount change rate is calculated, the influence of nonuniformity of a local light amount distribution or the like can be removed.

The pixel numbers on the line CCD 104 where the light amount has changed are specified using a threshold value with respect to the calculated light amount change rate. At this time, using information of the detection signal level or the like, pixel information smaller than the pixel numbers can be specified. From these pixel numbers, the end portions of the light-shielded range can be determined, and the central value (the pixel number of the line CCD 104) of that light-shielded range is derived as the angle information of each pointer.

In order to calculate an actual coordinate value from the obtained pixel number, the pixel number must be converted into angle information (θ). Conversion to the angle information can be implemented using, e.g., a polynomial. For example, let e be the CCD pixel number, n be an order, and Tn be a coefficient of each order. Then, the angle θ can be calculated by:

$$\theta = Tn \cdot e^n + T(n-1) \cdot e^{(n-1)} + T^{(n-2)} \cdot e^{(n-2)} + \ldots + T0 \quad (1)$$

Note that the coefficients of the respective orders can be determined from actually measured values, design values, and the like. Also, the orders can be determined in consideration of the required coordinate precision and the like.

<Description of Coordinate Calculation Method>

The coordinate calculation method for calculating the coordinate position of the pointer from the angle information (θ) converted from the pixel number will be described below.

When an input of the pointer corresponds to one point, the coordinate calculations can be made using the central angle of the light-shielded ranges obtained based on the output results of the sensor units 1L and 1R.

The positional relationship between coordinates defined on the coordinate input effective region 3 and the sensor units 1L and 1R, and the coordinate system will be described below using FIG. 14.

Figure 14:
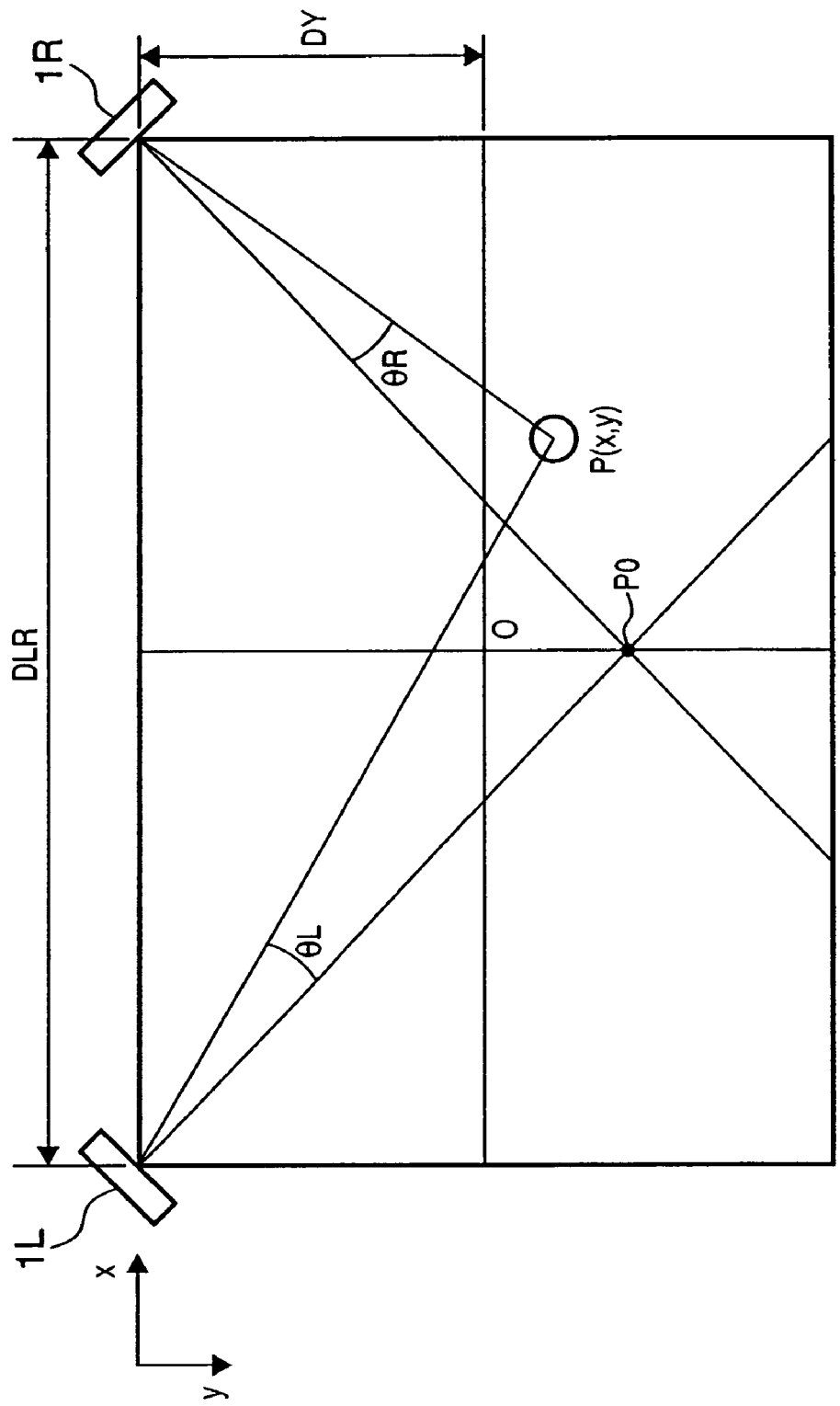
FIG. 14 is a view showing the positional relationship between the coordinates defined on a coordinate input effective region and sensor units 1L and 1R according to the embodiment of the present invention.

FIG. 14 shows the positional relationship between coordinates defined on the coordinate input effective region and the sensor units 1L and 1R according to the embodiment of the present invention.

In FIG. 14, the X- and Y-axes are respectively defined in the horizontal and vertical directions of the coordinate input effective region 3, and the center of the coordinate input effective region 3 is defined as an origin position O(0, 0). The sensor units 1L and 1R are attached to the left and right ends of the upper side of the coordinate input range of the coordinate input effective region 3 to be symmetrical about the Y-axis. The distance between the sensor units 1L and 1R is DLR.

The light-receiving surfaces of the sensor units 1L and 1R are arranged so that their normal directions form an angle of 45° with the X-axis, and the normal direction is defined as 0°.

At this time, as the sign of the angle, in case of the sensor unit 1L arranged on the left side, a clockwise direction is defined as a "+" direction. In case of the sensor unit 1R arranged on the right side, a counterclockwise direction is defined as a "+" direction.

Furthermore, P0 is an intersection position of the normal directions of the sensor units 1L and 1R, i.e., an intersection of the reference angles. Let DY be a Y-coordinate distance from the position of the sensor unit 1L (1R) to the origin. At this time, let θL and θR be angles obtained by the respective sensor units 1L and 1R from the reference angles. Then, coordinates P(x, y) of a point P to be detected are calculated using tan θL and tan θR by:

$$x = DLR/2 * (\tan \theta L + \tan \theta R)/(1 + (\tan \theta L * \tan \theta R)) \quad (2)$$

$$y = DLR/2 * ((1 + \tan \theta L)(1 + \tan \theta R))/(1 + (\tan \theta L * \tan \theta R)) - DY \quad (3)$$

Note that the light-receiving units in each sensor unit are not arranged on an identical line in the horizontal direction (X-axis direction) of the coordinate input effective region 3 in practice. For this reason, when data of the light-receiving units at different positions are used upon calculating coordinates, this positional deviation must be corrected.

Figure 15:
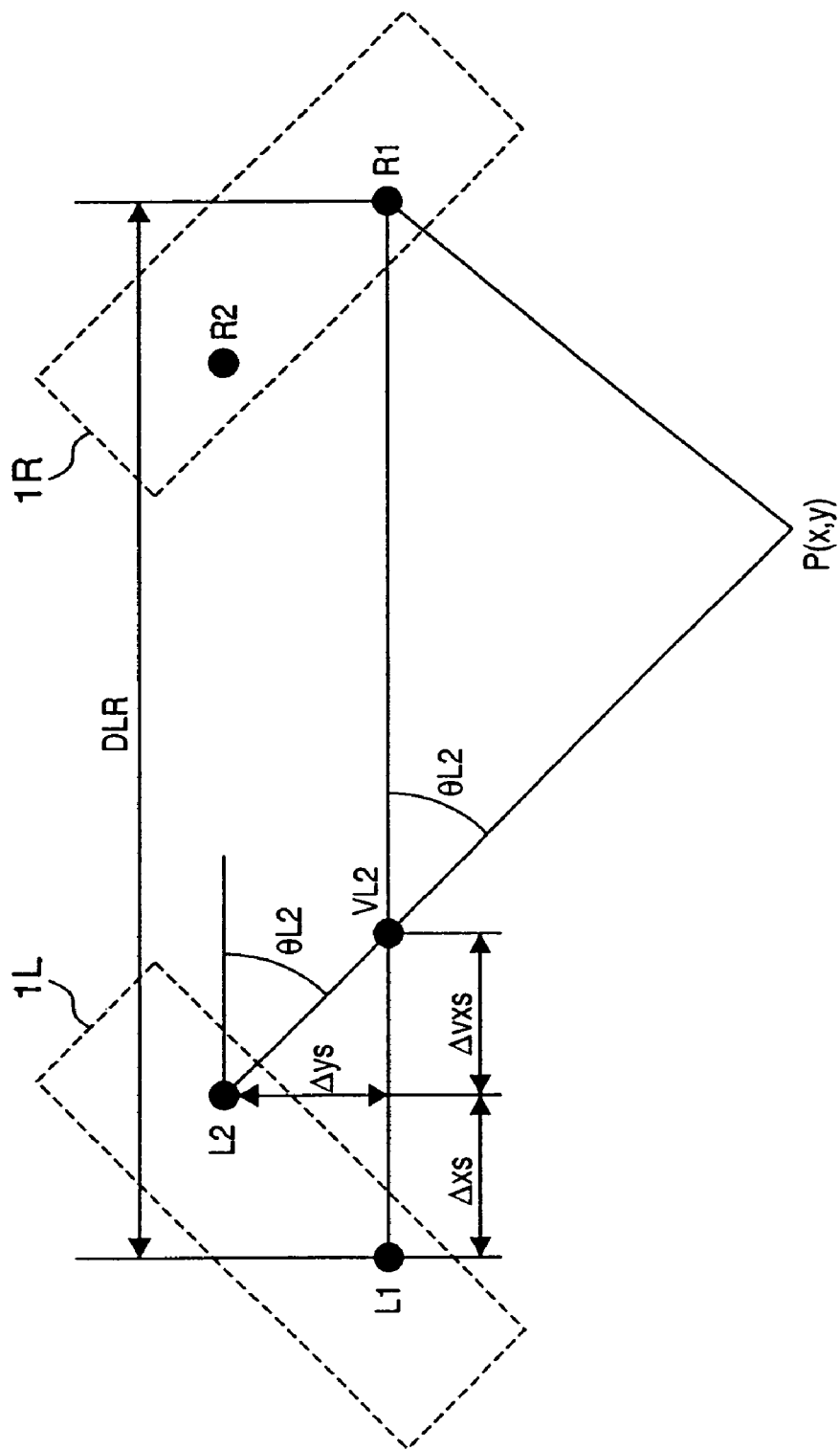
FIG. 15 is a view for explaining coordinate calculations in the sensor units each having a plurality of light-receiving units according to the embodiment of the present invention.

As shown in FIG. 15, let L1 and L2 be pupil positions of the two light-receiving units in the sensor unit 1L, and R1 and R2 be pupil positions of the two light-receiving units in the sensor unit 1R. Let Δxs be an X-axis direction distance as the difference between L1 and L2 in the X-axis direction, and Δys be a Y-axis direction distance as the difference between L1 and L2 in the Y-axis direction.

When data detected by L2 is θL2, if the sensor unit 1L is virtually located at a position VL2 when viewed from the same level as R1 in the X-axis direction, from the distance Δys in the height direction and obtained angle θL2, we have:

$$\Delta vxs = \Delta ys / \tan \theta L2$$

Hence, the sensor unit distance DLR in equations (2) and (3) is corrected by the X-direction distance Δxs between the pupil positions L1 and L2 of the light-receiving units, and the calculated Δvxs to calculate a tentative coordinate value. An X-coordinate in this calculated tentative coordinate value is calculated using a midpoint between VL2 and R1 as an origin. For this reason, by further correcting (Δxs+Δvxs) from that X-coordinate, coordinate calculations can be made using data of light-receiving units at different positions.

When an input is made at one point, the coordinate calculations can be made using the central angle of the light-shielded range. However, coordinates cannot be calculated by this method when inputs are made by a plurality of pointers, as shown in FIG. 6, and the positional relationship between the light-receiving unit and the plurality of pointers corresponds to, e.g., position III, IV, or V so that the detection signals (light amount distributions) of the two light-receiving units in the sensor unit 1L overlap each other.

For example, in a state at position V in FIG. 6, the pointer 192 completely hides behind the pointer 191 in the left light-receiving unit A in FIG. 6 in the sensor unit 1L. Also, the light-shielded ranges of the pointers 192 and 191 are continued in the other light-receiving unit B.

Signals V in FIG. 7 are output signals obtained at that time: one signal is formed of only the light-shielded range of the pointer 191, and the other signal is output as a state wherein the light-shielded ranges of the pointers 191 and 192 are connected. In such case, accurate input coordinates cannot be calculated by calculations using the centers of the light-shielded ranges.

Hence, coordinate calculations are made using angle information of the end portions of the light-shielded ranges detected by the light-receiving units in the sensor units 1L and 1R.

Assume that each pointer has a nearly circular input shape, and pointers A and B partially overlap each other with respect to one light-receiving unit L1 in the sensor unit 1L. That is, this light-receiving unit L1 observes light-shielded ranges specified by θL1 and θL2.

On the other hand, angles observed by, e.g., a light-receiving unit R1 in the sensor unit 1R correspond to the end portions of light-shielded ranges formed by the light-shielded ranges of the respective pointers, and four angles θR11 to θR22 are observed.

Figure 17:
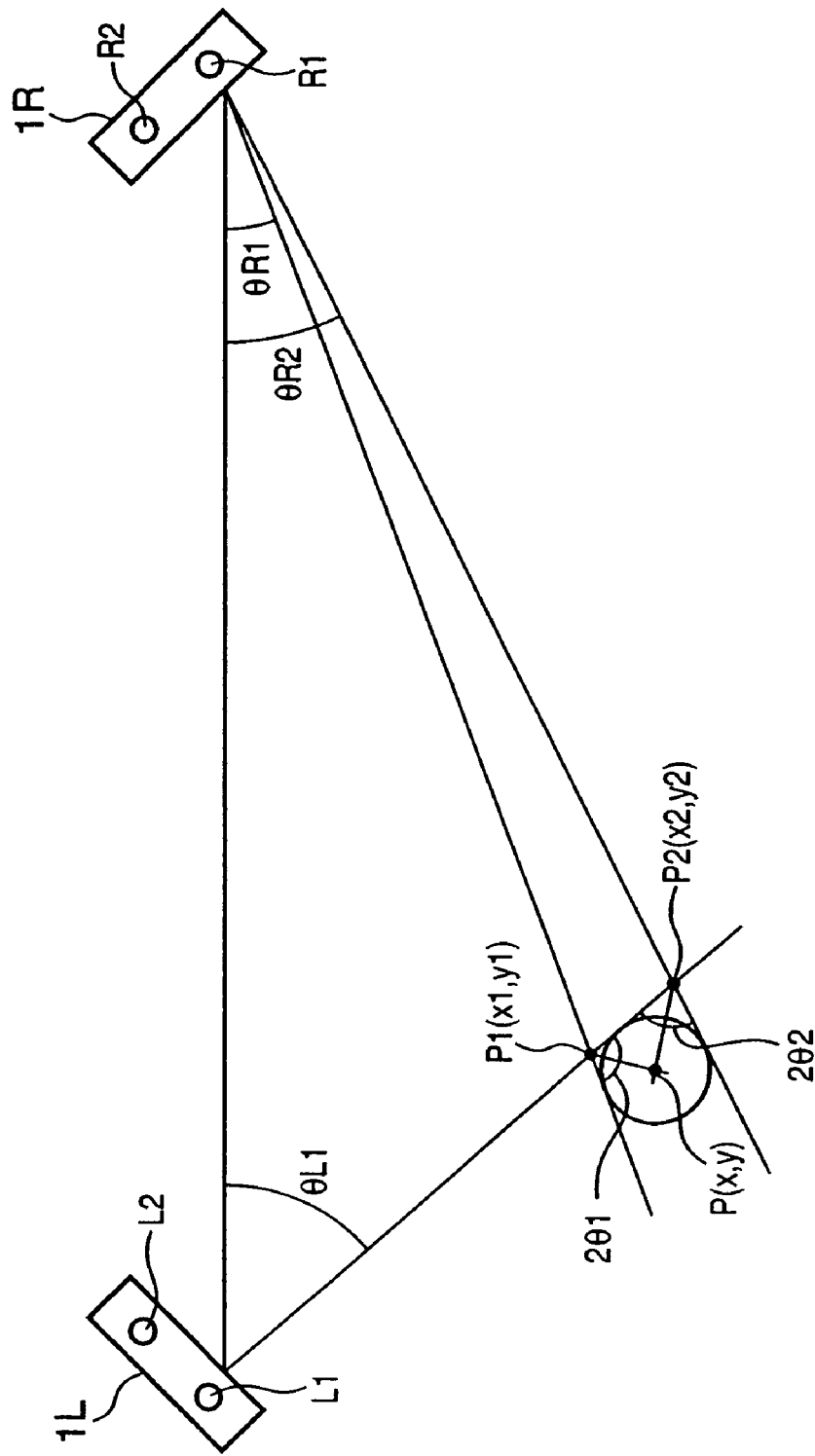
FIG. 17 is a view for explaining an example of coordinate calculations based on end portion information of the light-shielded range according to the embodiment of the present invention.

FIG. 17 is a view for explaining coordinate calculations when the end portions of the light-shielding ranges are used.

Assume that an input is made at a point P. let P1(x1, y1) and P2(x2, x2) be intersections between θL1, and θR1 and θR2. Then, coordinates P of the input position can be calculated as an intersection of bisectors of angles 2θ1 and 2θ2 at the respective intersections.

Since the coordinate values of P1 and P2 can be calculated by equations (2) and (3) as in calculations of the coordinates of the intersections of the respective angles, input coordinates P(x, y) can be calculated using these coordinate values and angle information.

In this manner, using the end portion information of the light-shielded ranges detected by the left and right sensor units 1L and 1R, input coordinates of an input can be calculated without using any central values of the light-shielded ranges.

Figure 18:
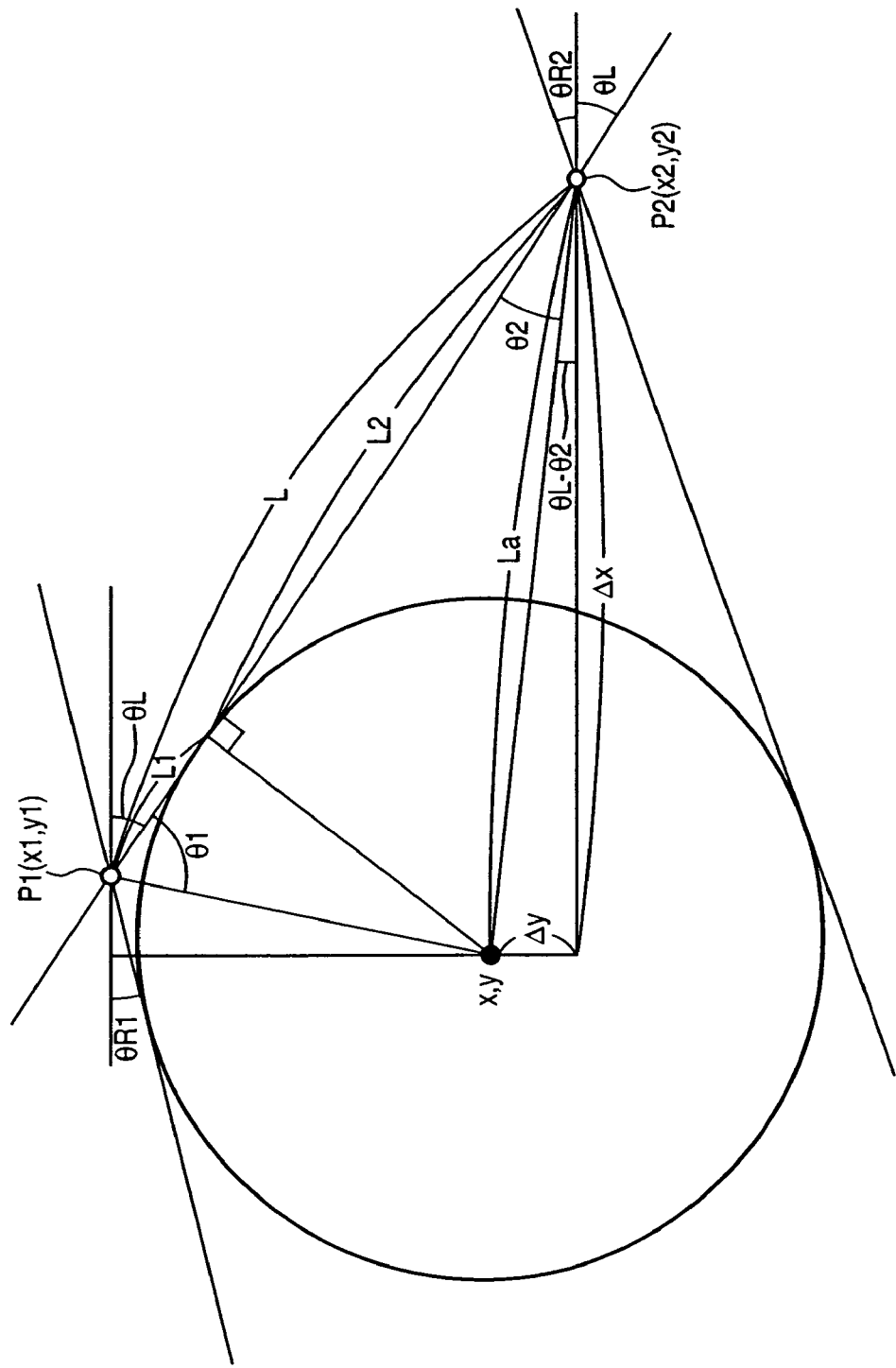
FIG. 18 is a view for explaining the relationship between the bisector of the overlapping portion of end portion information (angle) of the light-shielded range, and coordinate values according to the embodiment of the present invention.

FIG. 18 is a view for explaining an example of the calculation sequence.

As shown in FIG. 18, let L be the distance between P1(x1, y1) and P2(x2, x2), and θ1 and θ2 be angles of bisectors of angles at respective points. Then, we have:

$$L = ((x2-x1)^2 + (y2-y1)^2)^{0.5} \quad (4)$$

$$\theta 1 = (\pi - (\theta L + \theta R1))/2 \quad (5)$$

$$\theta 2=(\theta L+\theta R2)/2 \qquad (6)$$

for $$L1\cdot\tan\theta 1=L2\cdot\tan\theta 2 \qquad (7)$$

Therefore, $$L2=L\cdot\tan\theta 1/(\tan\theta 1+\tan\theta 2)(\text{for }\tan\theta 1+\tan\theta 2\neq 0) \qquad (8)$$

$$La=L2/\cos\theta 2(\text{for }\cos\theta 2\neq 0) \qquad (9)$$

From these equations, Ax and Ay are calculated by:

$$\Delta x=La\cdot\cos(\theta L-\theta 2) \qquad (10)$$

$$\Delta y=La\cdot\sin(\theta L-\theta 2) \qquad (11)$$

As input coordinates, P(x, y) can be calculated by:

$$x=x2-\Delta x \qquad (12)$$

$$y=y2-\Delta y \qquad (13)$$

Figure 16:
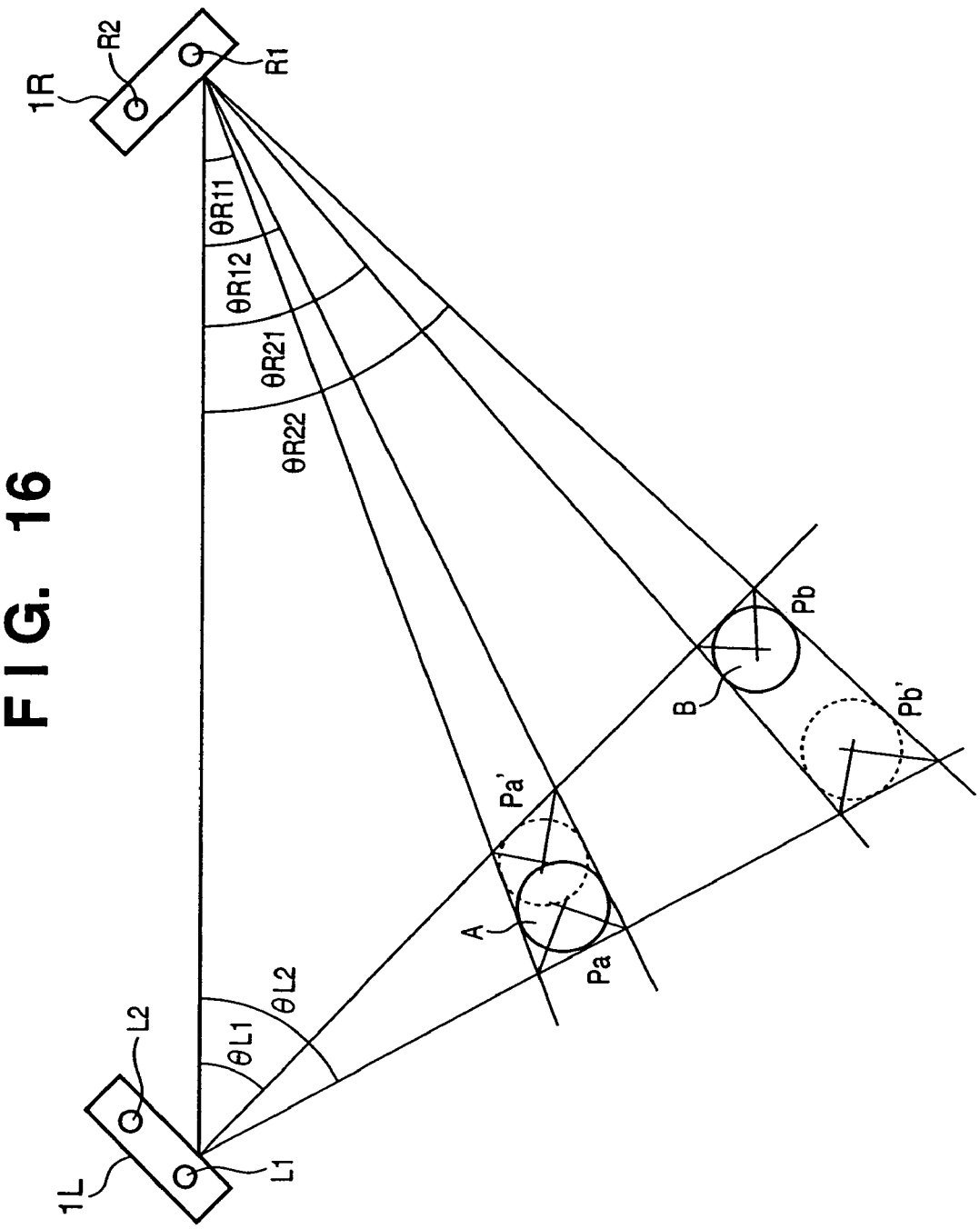
FIG. 16 is a view for explaining true/false determination according to the embodiment of the present invention.

As shown in FIG. 16, in a state which is not a so-called total eclipse state in which an input point on the rear side viewed from the sensor unit 1L is hidden behind another input point, i.e., in a partial eclipse state, that input point corresponds to either of combinations Pa and Pb, and Pa' and Pb'.

Hence, calculations corresponding to the intersections of the bisectors are made for combinations of θL1, θL2, θR11, θR12, θR21, and θR22 to calculate coordinates of Pa and Pb or Pa' and Pb', thus determining if either combination is correct input coordinates.

This combination determination can be made using data from the other light-receiving unit.

Figure 19:
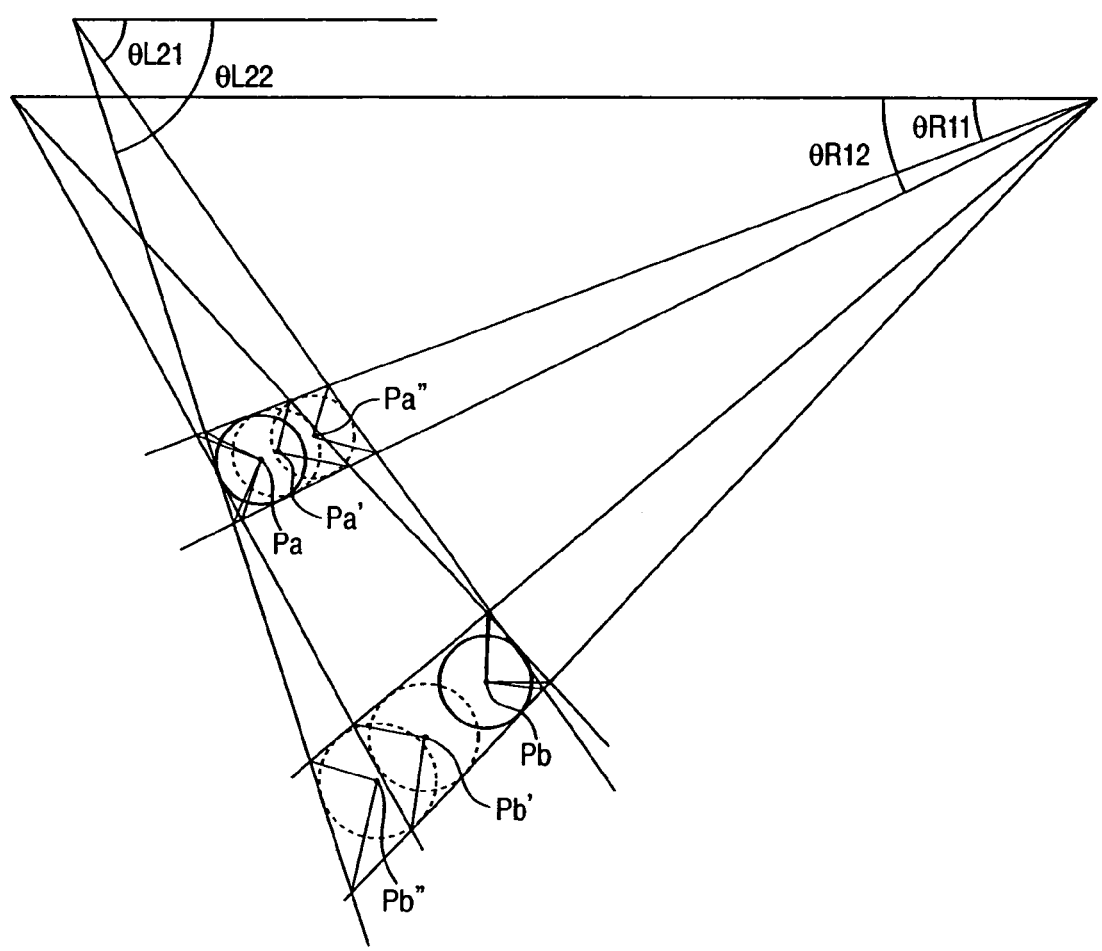
FIG. 19 is a view for explaining details of coordinate calculations based on the end portion information of the light-shielded range according to the embodiment of the present invention.

For example, as shown in FIG. 19, the coordinate calculation results using data θL21 and θL22, and θR11 and θR12 are compared with those of the above light-receiving unit. Whether Pa or Pa' overlaps is determined based on this comparison result using their distances and the like, thus determining which of Pa and Pa' is correct. If Pa is adopted, Pb is automatically adopted as its combination.

To attain more satisfactory determination, calculations for Pb may be made using the coordinate calculation result of θR21 and θR22.

In this manner, in the "partial eclipse" state in which the two light-shielded ranges detected by the sensor unit 1L (1R) are partially hidden, a plurality of input pointed positions can be specified by detecting the angles of the end portions of the light-shielded ranges and obtaining information corresponding to bisectors at their intersections.

Therefore, in the present invention, the optical layout of the light-receiving units in the sensor unit 1L (1R) is set so that at least one of the two light-receiving units arranged in the sensor unit 1L (1R) can always detect coordinates in the "partial eclipse" state or a state in which the two light-shielded ranges are separated independently of locations of a plurality of pointers.

Actual calculations are made as follows.

As described above, light amount distribution data are acquired from the respective light-receiving units.

From the acquired light amount distribution data, the number of light-shielded ranges are calculated using a threshold value and the like. Depending on the number of light-shielded ranges, a case of no input, a case of an input at one point (single-point input), or a case of inputs at least at two points (plural-point inputs) can be determined, and data used in arithmetic operations can be selected.

FIG. 20 shows combinations of the numbers of light-shielded ranges detected by respective light-receiving units when the sensor unit 1L includes two light-receiving units L1 and L2, and the sensor unit 1R includes two light-receiving units R1 and R2. There are 17 different combinations of the numbers of light-shielded ranges including no input when the maximum number of inputs is 2.

When the number of inputs is "1" in all the light-receiving units L1, L2, R1, and R2, a case of single-point input and a case wherein two inputs contact are possible. In this embodiment, contact is handled as single-point input. However, when the shape information of the pointer such as an input width of the pointer and the like is known, a case wherein two inputs contact may be detected based on that shape information.

In this way, by counting the number of light-shielded ranges, an input state "no input", "single-point input", or "plural-point inputs" can be determined. In case of single-point input, i.e., when each sensor unit detects only one light-shielded range, coordinate calculations may be made by the coordinate calculation method using the end portion information of the light-shielded ranges or by calculating the centers of the light-shielded ranges as in the conventional method.

In case of plural-point inputs, a case in which the number of light-shielded ranges is two, i.e., the inputs can be independently detected, and a case in which the number of light-shielded ranges is one, i.e., the relationship of the input positions with respect to each sensor unit is in an "eclipse" state are mixed.

In such case, which combination of the light-shielded ranges is to be used upon making coordinate calculations is determined based on the numbers of light-shielded ranges.

Of the numbers of light-shielded ranges, a light-receiving unit that detects the two light-shielded ranges is selected, and a detection signal from the selected light-receiving unit is determined as coordinate calculation first data. At this time, when a plurality of light-receiving units detect two light-shielded ranges, a priority order may be determined in advance, and the light-receiving unit may be selected in accordance with the priority order.

Next, attention is focused on the detection signals from light-receiving units in the sensor unit on the side opposite to the sensor unit of the light-receiving unit selected as the coordinate calculation first data. Of these units, if the light-receiving unit that detects a plurality of light-shielded ranges is found, the detection signal of that light-receiving unit is determined as coordinate calculation second data. When none of the light-receiving units detect a plurality of light-shielded ranges, the detection signal of the light-receiving unit that detects one light-shielded range is determined in the meantime as coordinate calculation second data according to the priority order.

The detection signal in the other light-receiving unit in the same sensor unit as that of the light-receiving unit selected as the coordinate calculation second data is determined as true/false determination data.

As described above, when there are a plurality of inputs, since false coordinates produced depending on combinations of detection signals are calculated in addition to truly input coordinate (real coordinates), this detection signal is used to determine true coordinates.

As can be seen from FIG. 20, the number of light-shielded ranges detected by the light-receiving unit selected as the coordinate calculation first data is a plural number. However, the number of light-shielded ranges detected by the light-receiving unit selected as the coordinate calculation second data is either a plural number or a singular number. Likewise, the number of light-shielded ranges detected by the light-receiving unit selected as the true/false determination data is either a plural number or a singular number.

When the coordinate calculation first data, coordinate calculation second data, and true/false determination data are arranged in turn, combinations of the numbers of light-shielded ranges detected can be classified into three types, i.e., combination 1: plural, singular, and singular, combination 2: plural, plural, and singular, and combination 3: plural, plural, and plural.

Figure 21A:
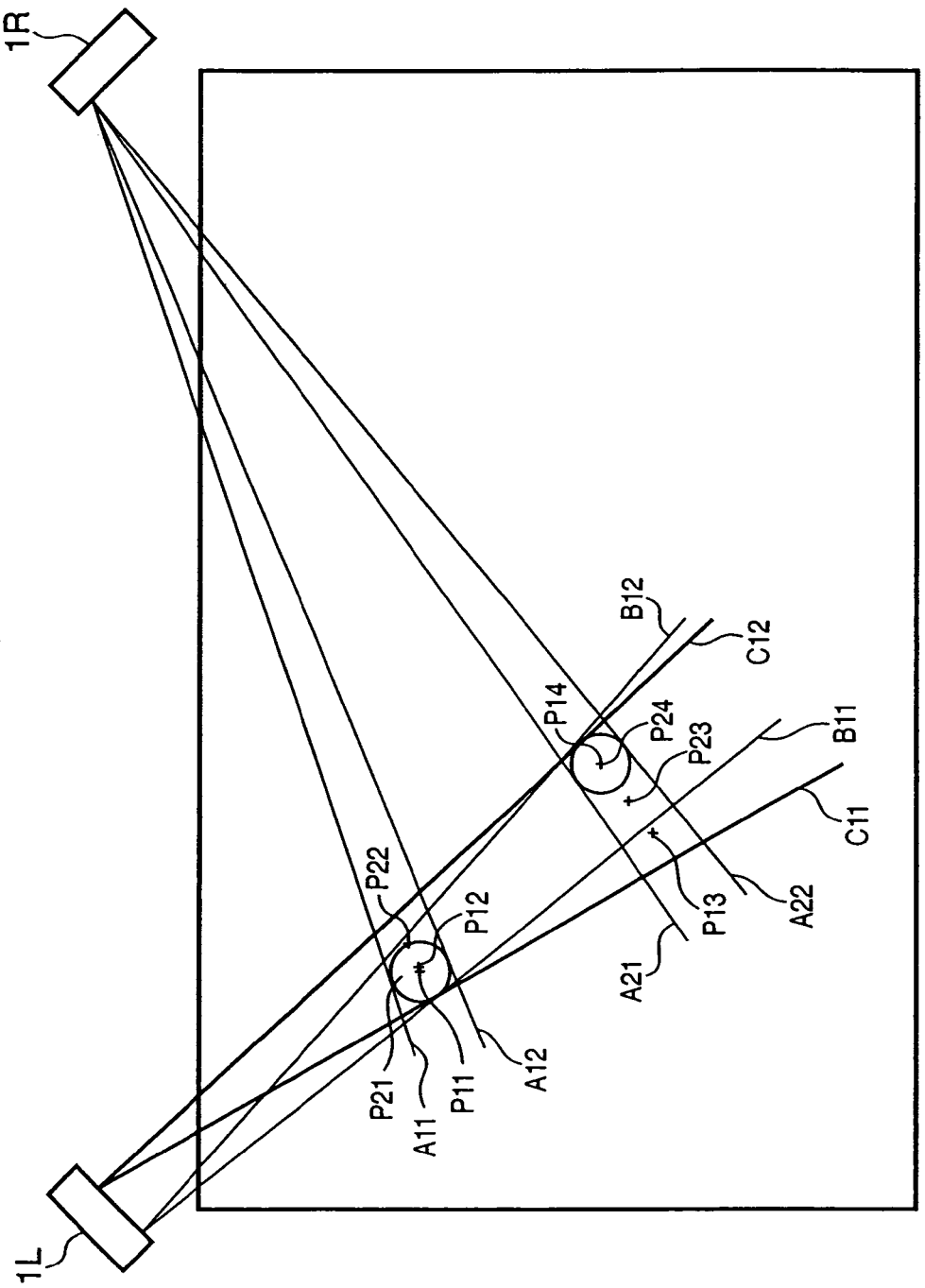
FIG. 21A shows an input example to explain the combinations of the numbers of light-shielded ranges to be detected by the embodiment of the present invention.

FIGS. 21A to 21C show examples of input states corresponding to these three types.

In FIGS. 21A to 21C, a normal indicated by A is the coordinate calculation first data, that indicated by B is the coordinate calculation second data, and that indicated by C is the true/false determination data.

Coordinate calculations are made for one light-shielded range of the coordinate calculation first data, e.g., for coordinate calculation data A11 and A12 in FIG. 21A in combination with coordinate calculation second data B11 and B12 and true/false determination data C11 and 12 using the aforementioned end portion information of the light-shielded range.

In this case, let P11 and P12 be coordinate values calculated using the coordinate calculation second data B11 and B12, and P21 and P22 be coordinate values calculated using the true/false determination data C11 and C12 as true/false determination coordinate values. At this time, of the four calculated coordinate values, at least two coordinate values assume substantially equal values, i.e., values indicating the coordinate position of the pointer.

When the combination is 1: plural, singular, and singular, either "singular" information is likely to include a "total eclipse" state. The coordinate values in the total eclipse state can be used as true/false determination data in coordinate calculations on the side closer to the sensor unit but cannot be used in calculations on the farther side. In such case, by replacing (substituting) the coordinate values determined as the coordinate calculation second data and those determined as the true/false determination data, both coordinates can be calculated. For this purpose, this determination is made.

As shown in FIG. 21A, in the total eclipse state (or a state close to that state), lines of B11 and B12 indicate the two ends of the light-shielded range of an identical input. For this reason, the coordinate values P11 and P12 are respectively calculated as substantially the same or approximate coordinate values.

On the other hand, the coordinate values on the side not in the total eclipse state are calculated using the end portion information of the light-shielded ranges of different inputs. For this reason, the coordinate values P21 and P22 are calculated as values largely different from those in the total eclipse state.

Then, a difference between the coordinate values P11 and P12, and that between P21 and P22, which are calculated from the coordinate calculation second data and true/false determination data, are calculated, and the coordinate values with a larger difference are determined as those in a partial eclipse state. With this determination result, the coordinate value data and determination coordinate value data are replaced. In this case, the coordinate calculation second data and true/false determination data may be replaced (substituted).

As for combination 2: plural, plural, and singular, and combination 3: plural, plural, and plural, since the full eclipse state is impossible to occur in case of two-point inputs, the aforementioned process is not required. If the number of input points is increased, similar determination is required.

Next, the true/false determination of coordinates is made. This process may be done after coordinates of all combinations are calculated. Alternatively, by applying the true/false determination for one coordinate value, the processing time can be shortened without any unnecessary coordinate calculations.

Which coordinate value of P11 and P12, and P21 and P22 is correct is determined based on closeness of their distances.

The distances between P11, and P21 and P22, and between P12, and P21 and P22 are calculated, and one of P11 and P12 is selected as a true coordinate value based on a combination of closer distances.

If P11 is selected as a true coordinate value based on the true/false determination result, since a remaining coordinate value which is not calculated is P14, that coordinate value is calculated. On the other hand, if P12 is selected as a true coordinate value, the coordinate calculations of P13 are made.

In this way, determination of coordinates for actual inputs (true/false determination) can be made.

In case of FIGS. 21B and 21C, the coordinate calculations can be made by the same process. Upon coordinate calculations, when the number of light-shielded ranges detected by the two light-receiving units of one sensor unit is two, i.e., "plural" and "plural", the coordinate calculations may be made based on the two ends of the end portion information of these light-shielded ranges, or may be made based on end portion information of one range. Alternatively, the centers of the light-shielded ranges may be calculated, and may be used in coordinate calculations as in the prior art.

Note that FIG. 22 summarizes assignment of the coordinate calculation first data, coordinate calculation second data, and true/false calculation data to the light-receiving units of the sensor units, and necessity/unnecessity of determination of the total eclipse state (total eclipse determination (true/false determination)), as an example of assignment of data depending on the numbers of light-shielded ranges detected by the light-receiving units in the sensor units.

As can be seen from FIG. 22, in case of single-point input, calculations may be made using any combinations of L1 and R1 or L2 and R2.

When the detection signals of the two light-receiving units of each sensor unit detect a plurality of light-shielded ranges, either detection signal may be used as the coordinate calculation first data.

<Determination of Continuity of Coordinate Values>

As described above, when the coordinate calculations and true/false determination of coordinates are made based on the end portion information of the light-shielded ranges using the sensor units each having a plurality of light-receiving units, the coordinate values of a plurality of inputs can be determined.

As for the plurality of obtained coordinate values, if these coordinate values are output intact, an external terminal on the receiving side may connect them since the two coordinate values cannot be distinguished from each other.

Hence, in order to distinguish the two coordinate values from each other, identifiers indicating continuity of coordinates are appended upon outputting the coordinate values.

The continuity of the plurality of coordinate values can be determined by calculating differences from the previous coordinate value for each sampling and using a smaller one of the differences.

Upon detection of light-shielded ranges first, for example, ID numbers (flags) are appended in the order of detection.

Figure 23:
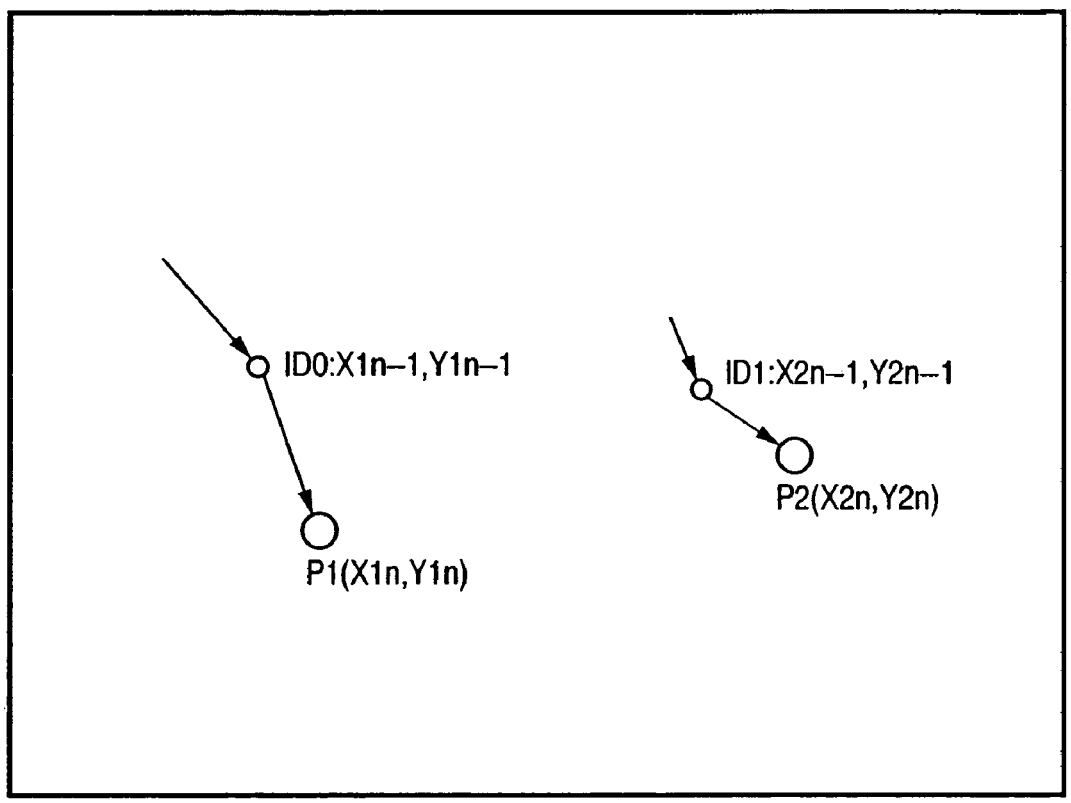
FIG. 23 is a view for explaining determination of coordinate continuity according to the embodiment of the present invention.

As shown in FIG. 23, when two coordinate values P1(X1n, Y1n) and P2(X2n, Y2n) are obtained, if coordinate values upon previous sampling are ID0: (X1n−1, Y1n−1) and ID1: (X2n−1, Y2n−1), differences from these coordinate values are calculated for P1 and P2, and a smaller difference is adopted, i.e., ID0 is appended to P1, and ID1 is appended to P2. In this way, the continuity of the coordinate values is determined, and IDs are assigned to respective coordinate values, thus outputting the coordinate values.

The external terminal checks the continuity of the coordinate values with reference to these IDs, and executes a drawing process (for, e.g., connecting them via lines).

<Description of Coordinate Calculation Process Flow>

Figure 24:
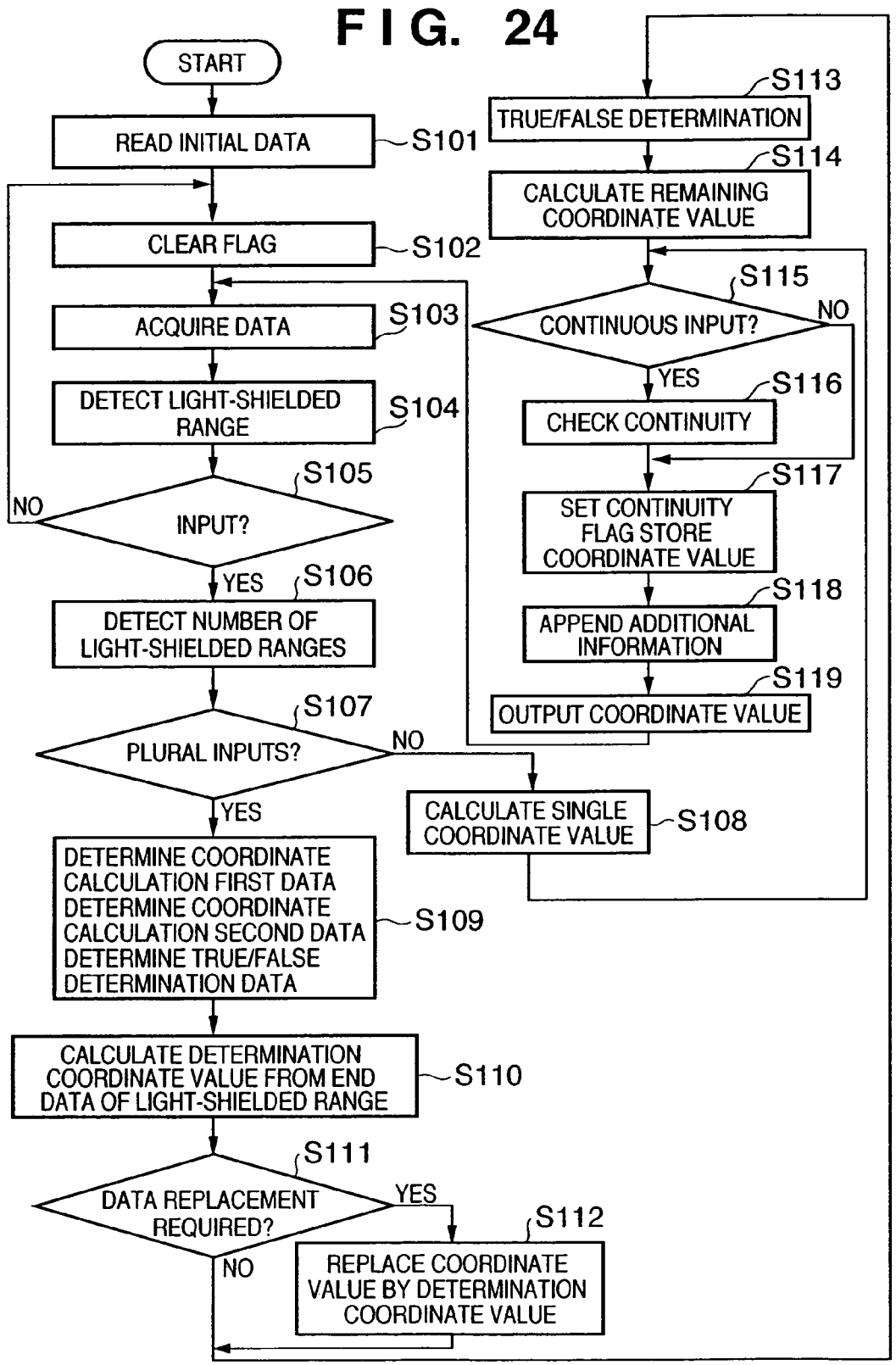
FIG. 24 is a flowchart showing the coordinate calculation process to be executed by the coordinate input apparatus according to the embodiment of the present invention.

FIG. 24 is a flowchart showing the coordinate calculation process to be executed by the coordinate input apparatus according to the embodiment of the present invention.

FIG. 24 shows the sequence from data acquisition by the sensor unit until the coordinate calculations.

Upon power ON, various initial setting processes associated with the coordinate input apparatus such as port setting, timer setting, and the like of the control/arithmetic unit 2 are executed in step S101. After that, initial data such as reference data, constants for correction, and the like are read out from the nonvolatile memory or the like, and are stored in the memory 132 of the control/arithmetic unit 2.

Also, the light amount distribution data 81 without any illumination, and the light amount distribution data 82 without any initial input (FIG. 12A) are fetched as initial data for each sensor unit, and are stored in the memory 132.

The processes to be executed so far are initial setting operations upon power ON. These initial setting operations may be executed according to the intention of an operator (e.g., a reset switch provided to the coordinate input apparatus), and the normal coordinate input operation state using pointers starts via the initial setting operations.

In step S102, flags indicating whether or not coordinate inputs are continuously made are reset (cleared). In step S103, the light-projecting units of the sensor units are turned on to acquire light amount distribution data from the light-receiving units.

The difference and ratio of the acquired light amount distribution data from and to the aforementioned initial data are calculated, and the detection process of light-shielded range is executed in step S104 by checking, e.g., if such difference and ratio exceed a threshold value.

In step S105, the presence/absence of an input process by the pointers is checked based on the detection result of light-shielded ranges. If no input is detected (NO in step S105), the flow returns to step S102. If any input is detected (YES in step S105), the flow advances to step S106.

In step S106, the numbers of light-shielded ranges for respective light-receiving units of the sensor units are detected on the basis of the detection result of light-shielded ranges. It is checked in step S107 based on the detection result of the numbers of light-shielded ranges if the input process by the pointers is plural-point inputs. If the input process by the pointers is not plural-point inputs (NO in step S107), i.e., if the input is a single-point input, the flow advances to step S108 to execute the coordinate calculations for the single-point input. The coordinate calculations at that time may use end point information of light-shielded ranges or the centers of light-shielded ranges.

On the other hand, if the input process by the pointers is plural-point inputs (YES in step S107), the flow advances to step S109 to determine the coordinate calculation first data, coordinate calculation second data, and true/false determination data in accordance with the numbers of light-shielded ranges, as shown in FIG. 22. These data are stored in the memory 132.

After the data are determined, end portion data of the respective light-shielded ranges are calculated, and one coordinate value and determination coordinate value are calculated based on these end portion data. At this time, if the coordinate calculation second data and determination data are "singular" data, either of these data is likely to be in the "total eclipse" state, and that state is determined based on the distances between the coordinate values.

Necessity/unnecessity of replacement of data (coordinate values) is checked in step S111 in accordance with the determination result. If data replacement is required (YES in step S111), the flow advances to step S112 to replace coordinate values. On the other hand, if data replacement is not necessary (NO in step S111), the flow advances to step S113.

If a plurality of light-shielded ranges (input points) are detected, the coordinate values of true and false points of actually input points are calculated in this case. Hence, the true/false determination of coordinate values is executed based on the coordinate value and determination coordinate value in step S113.

If a true coordinate value is determined by the true/false determination, a remaining coordinate value corresponding to that coordinate value is calculated in step S114. After the coordinate values are settled, the presence/absence of a continuous input is checked in step S115. Note that this checking process is executed based on a flag indicating the presence/absence of a continuous input.

If no continuous input is detected (NO in step S115), the flow advances to step S117. On the other hand, if a continuous input is detected (YES in step S115), the flow advances to step S116.

In step S116, continuity determination is executed based on, e.g., the differences from the previously stored coordinate value (a previous coordinate value and the like).

If continuity determination is done, a continuous input flag is set in step S117, and the current coordinate value is stored in the memory 132 for the next continuity determination.

In step S118, additional information such as an ID and the like is appended to each coordinate value. Especially, the same ID as the previous coordinate value is appended to a coordinate value which is determined as a continuous input, and an unused ID is appended to a newly detected coordinate value. If switch information or the like is available, that information is appended.

The coordinate values with additional information are output to the external terminal in step S119. After that, the data acquisition loop is repeated until power OFF.

As described above, the presence/absence of the coordinate input operations by the pointers can be easily done. Furthermore, when the coordinate input operation is made using one pointer, its coordinate position can be easily detected using the light-receiving units which covers full coordinate input effective region 3 as the effective visual field.

However, when the coordinate input operations are simultaneously done using a plurality of pointers, different processes must be executed according to their input states, and the processing time for executing a series of processes is considerably prolonged.

An application example of this embodiment for shortening this processing time will be explained below using FIGS. 25A and 25B.

Figure 25A:
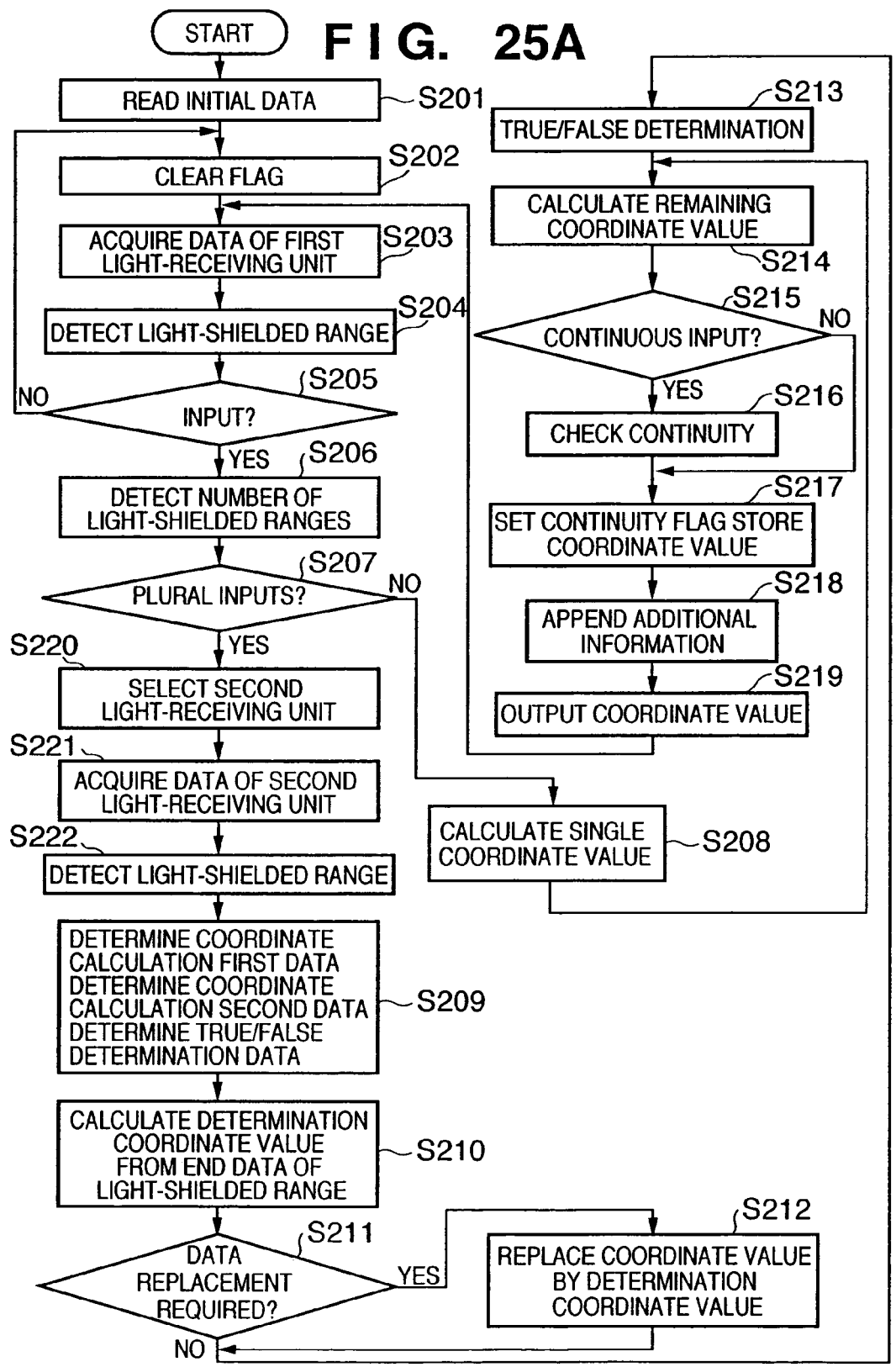
FIG. 25A is a flowchart showing an application example of the coordinate calculation process to be executed by the coordinate input apparatus according to the embodiment of the present invention.
Figure 26A:
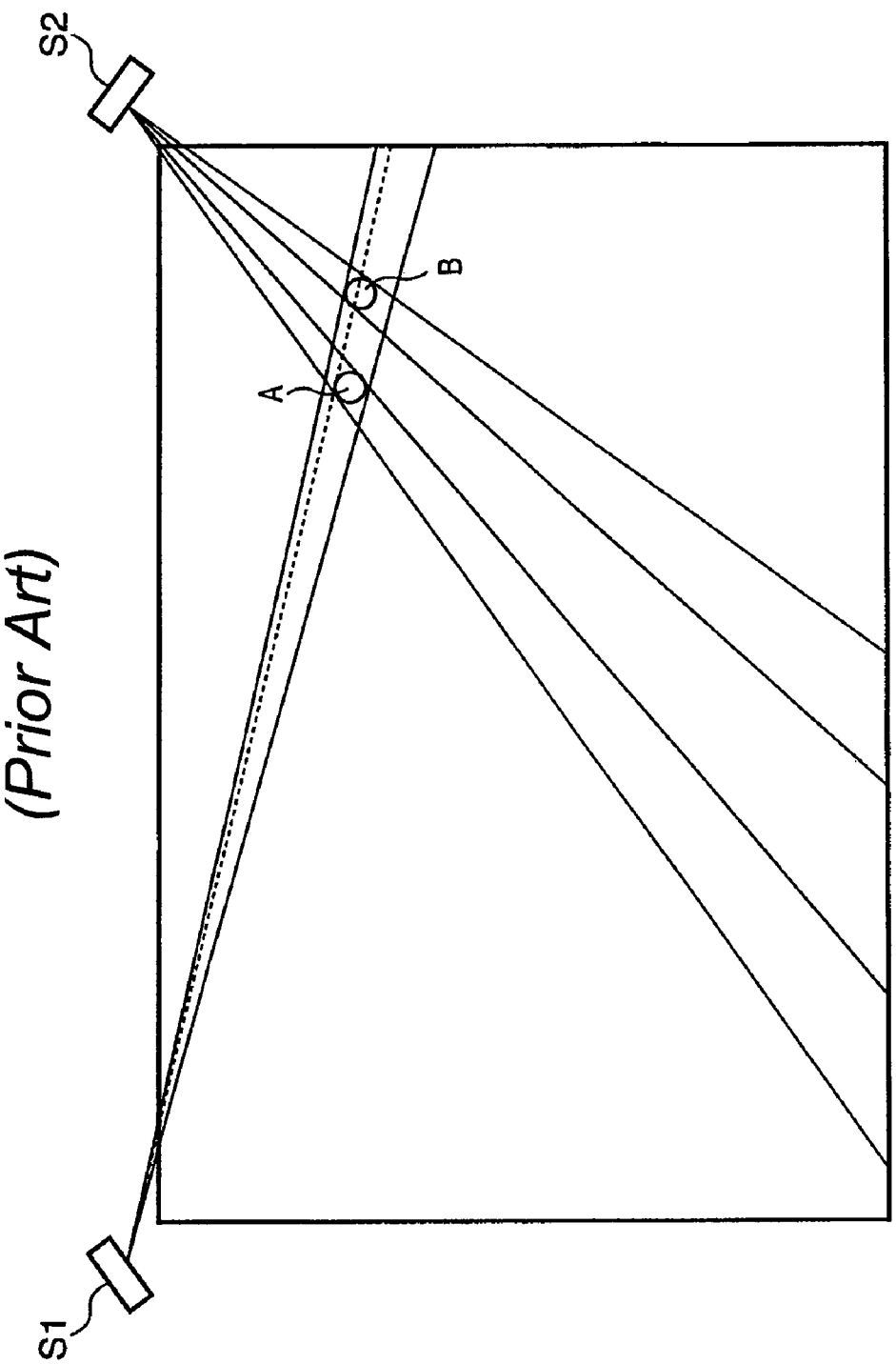
FIG. 26A is a view for explaining the relationship between the sensor unit positions and light-shielded ranges upon two-point inputs in the prior art.
Figure 26B:
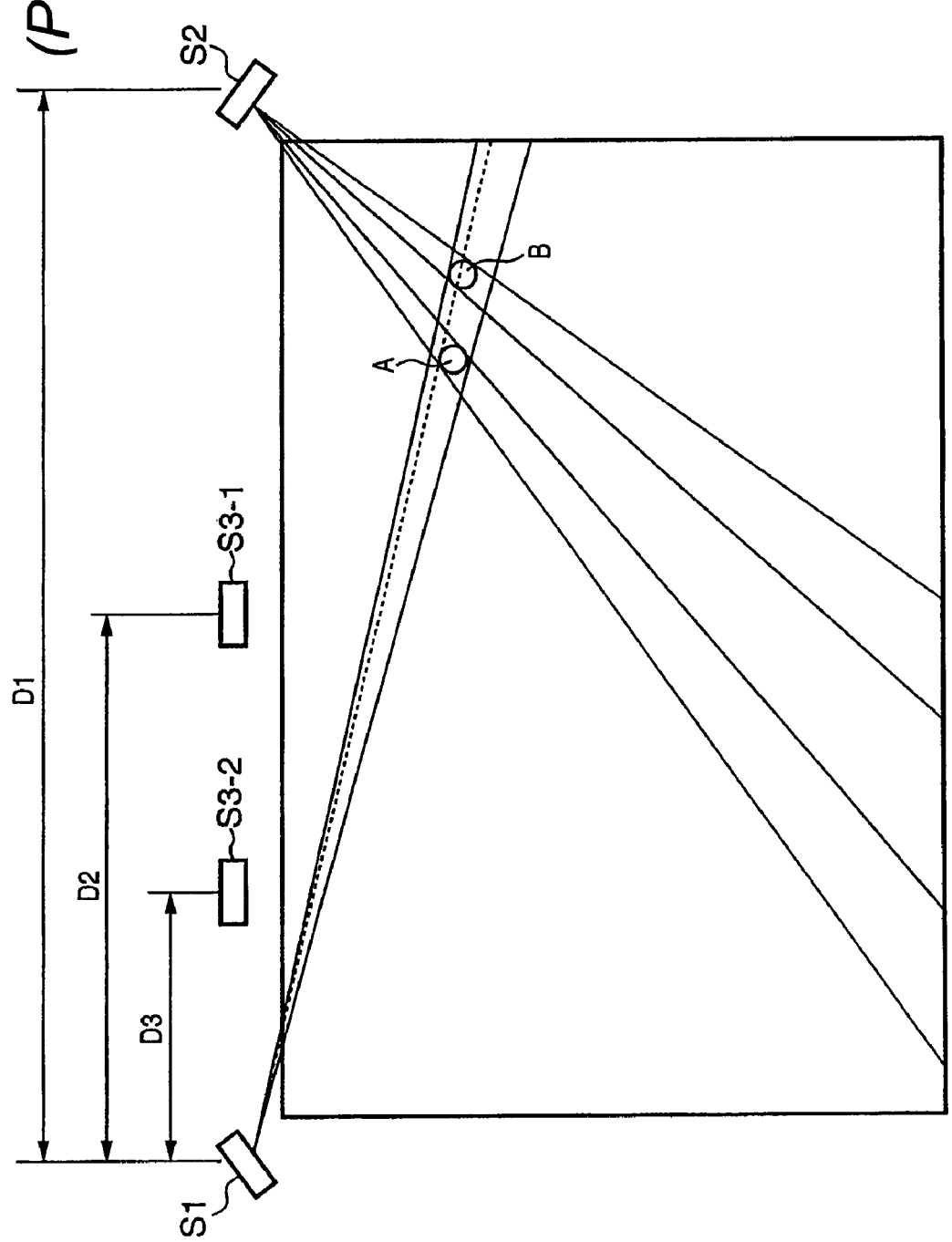
FIG. 26B is a view for explaining the relationship between the sensor unit positions and light-shielded ranges upon two-point inputs in the prior art.
Figure 26C:
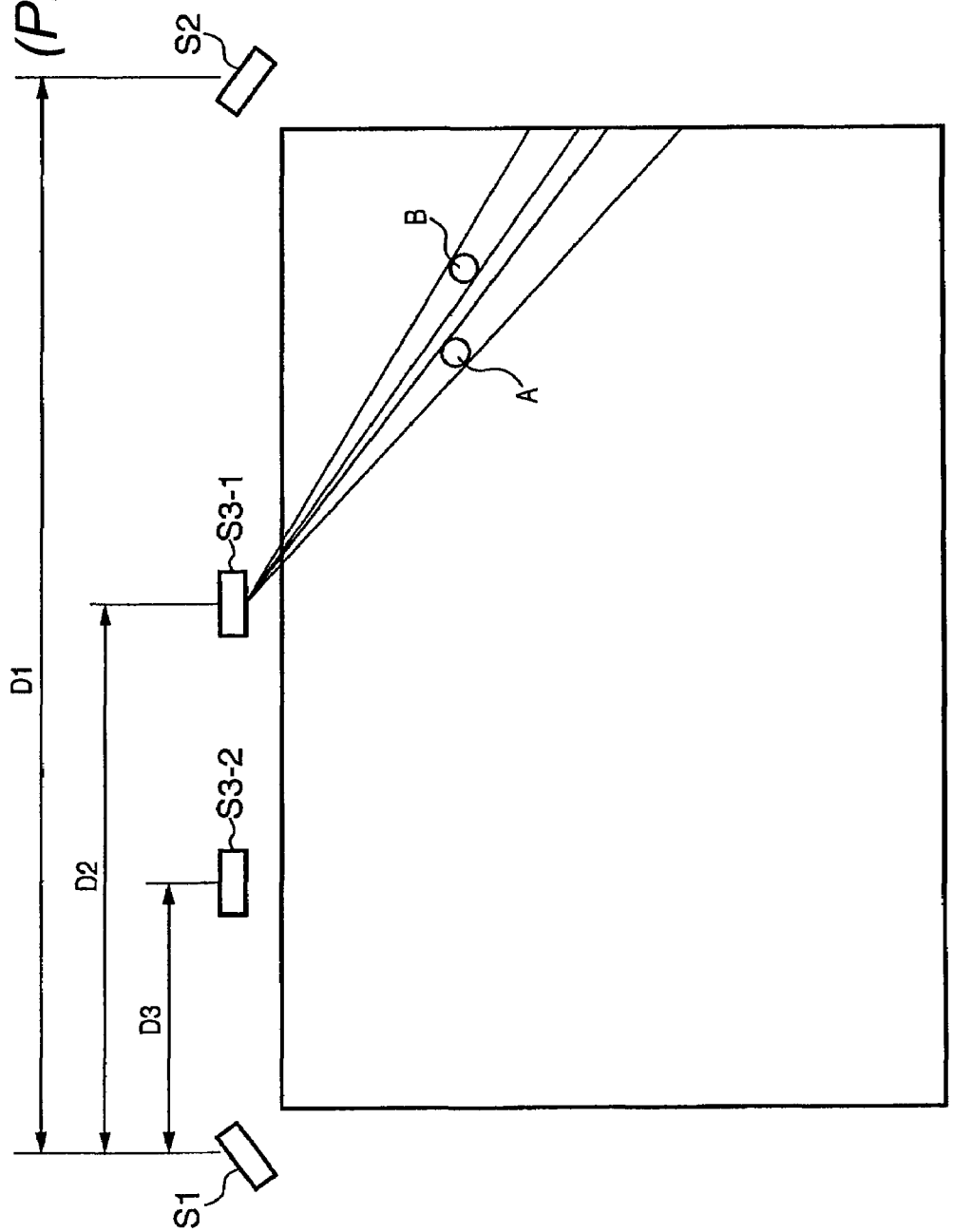
FIG. 26C is a view for explaining the relationship between the sensor unit positions and light-shielded ranges upon two-point inputs in the prior art.
Figure 26D:
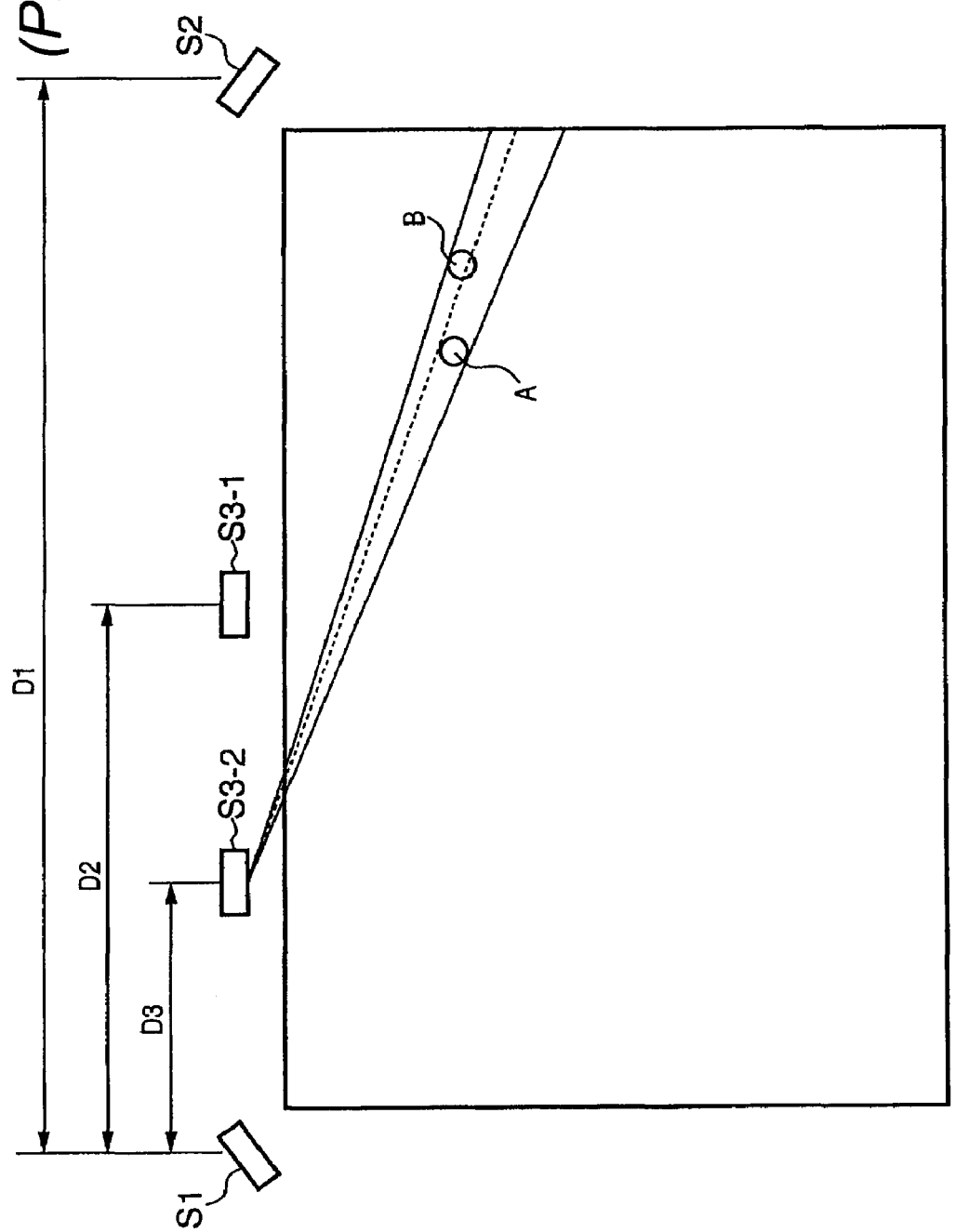
FIG. 26D is a view for explaining the relationship between the sensor unit positions and light-shielded ranges upon two-point inputs in the prior art.
Figure 26E:
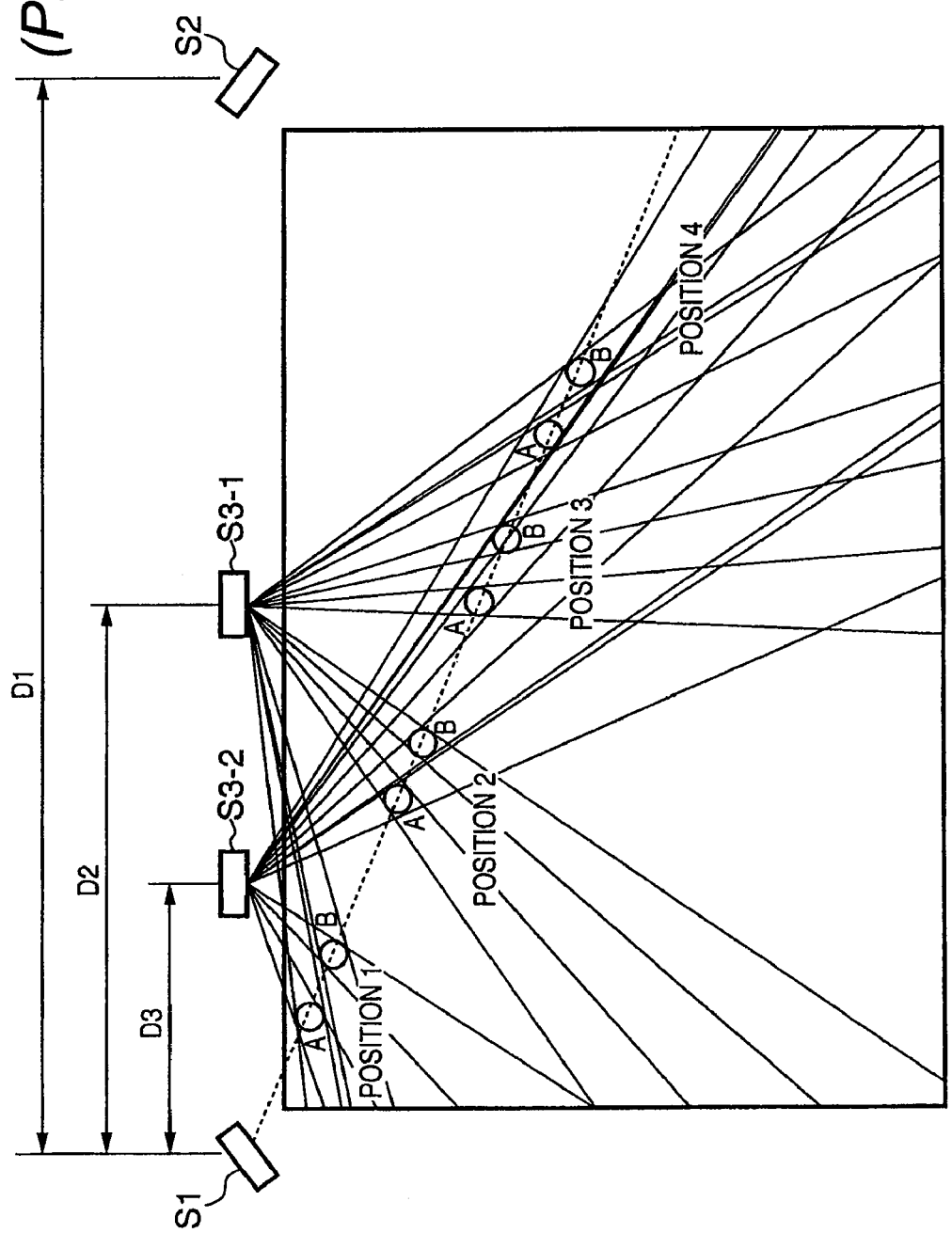
FIG. 26E is a view for explaining the relationship between the sensor unit positions and light-shielded ranges upon two-point inputs in the prior art.
Figure 28:
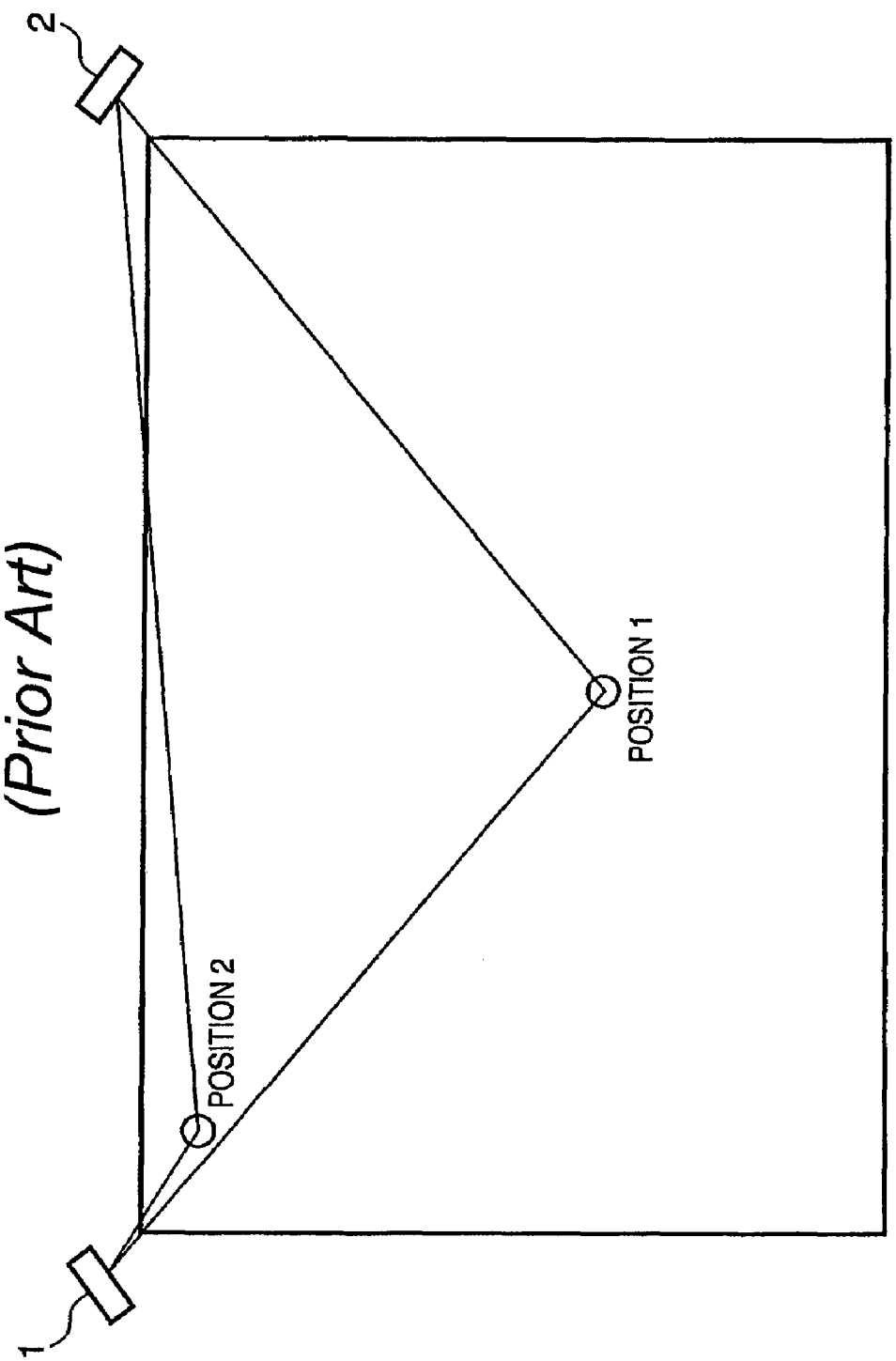
FIG. 28 is a view for explaining an example of coordinate calculations in the prior art.
Figure 29A:
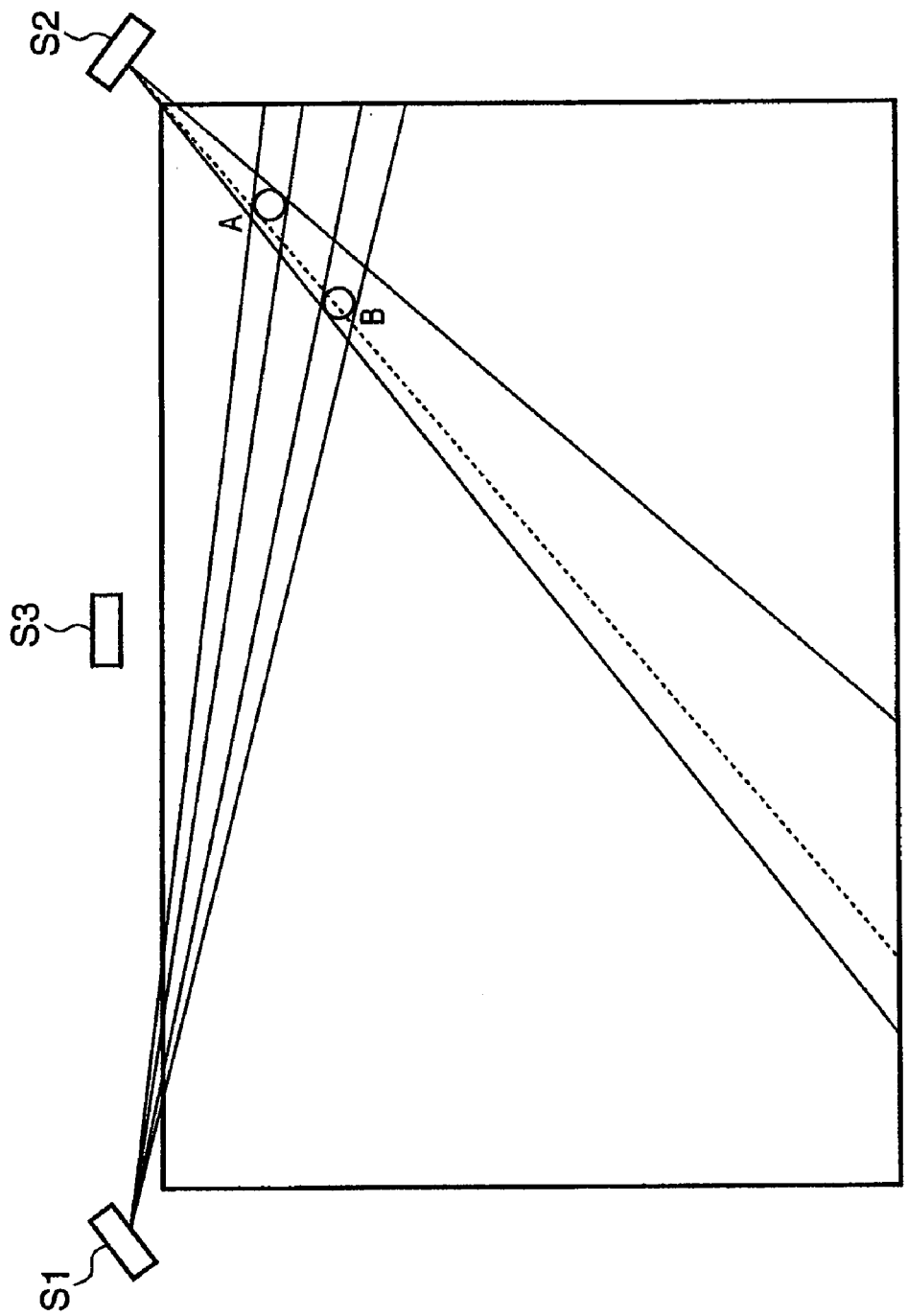
FIG. 29A is a view for explaining a combination of sensor units and the detection precision in the prior art.
Figure 29B:
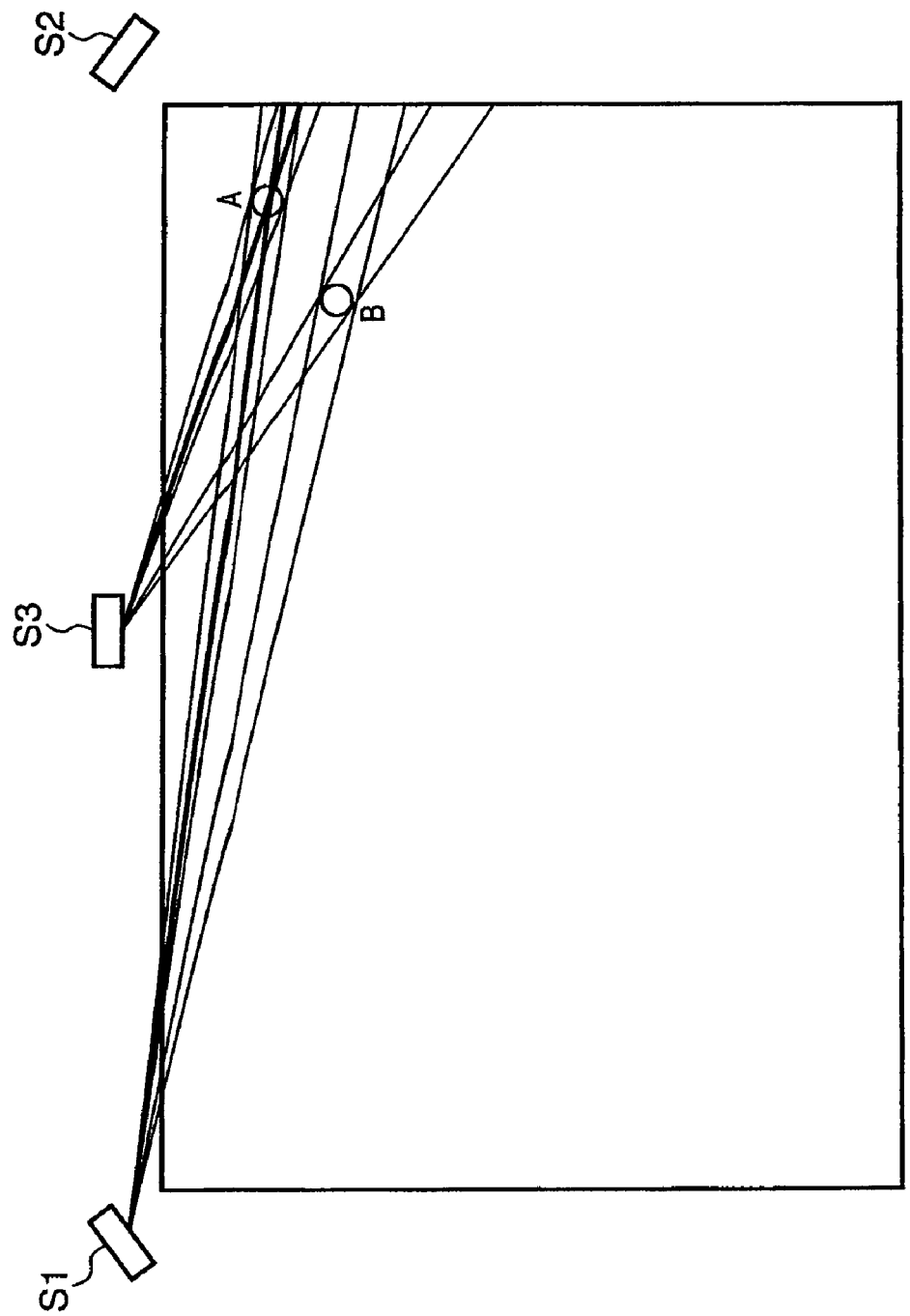
FIG. 29B is a view for explaining a combination of sensor units and the detection precision in the prior art.

FIG. 25A is a flowchart showing an application example of the coordinate calculation process to be executed by the coordinate input apparatus according to the embodiment of the present invention.

In FIG. 25A, steps S201, S202, S205, S206, and S210 to S219 correspond to steps S101, S102, S105, S106, and S110 to S119 in FIG. 24, and a detailed description thereof will be omitted.

In FIG. 25A, after the processes in steps S201 and S202, light amount distribution data are acquired using the first light-receiving units (and first light-projecting units), which cover the full coordinate input effective region 3 as the effective visual field, in the sensor units 1L and 1R in step S203. Therefore, the light amount distribution data is acquired from one light-receiving unit of each of the left and right sensor units 1L and 1R.

The difference and ratio of the acquired light amount distribution data from and to the aforementioned initial data are calculated, and the detection process of light-shielded range is executed in step S204 by checking, e.g., if such difference and ratio exceed a threshold value.

After the processes in steps S205 and S206 based on the detection result in step S204, it is checked in step S207 based on the detection result of the numbers of light-shielded ranges if the input process by the pointers is plural-point inputs.

If the number of light-shielded ranges detected by the first light-receiving unit of each of the left and right sensor units 1L and 1R is 1, it is determined that the number of inputs by the pointers is one or the pointers neighbor even if the inputs are made by the two pointers.

Hence, in consideration of the operability and use application of the operator, the neighboring state of the pointers hardly occurs. For this reason, in the neighboring (contact) state of the two pointers, even when a plurality of simultaneous inputs are made, no problem is posed when they are processed as an input of a single coordinate position.

Hence, if the number of light-shielded ranges detected by the first light-receiving unit of each of the left and right sensor units 1L and 1R is 1, a single-point input is determined, and the flow advances to step S208.

Note that FIG. 25B classifies the numbers of light-shielded ranges output from the first and second light-receiving units in the sensor unit 1 (in the present invention, since the first light-receiving unit is set to cover the full coordinate input effective region 3 as the effective visual field, and the second light-receiving unit is set to not cover the full region, the size of the apparatus is minimized; of course, both the effective visual fields of both the light-receiving units may cover the full coordinate input effective region) as in FIG. 22. That is, in the no-input or single-point input state, only the first light-receiving units (L1 and R1) in the sensor units 1L and 1R are active, and the second light-receiving units (L2 and R2) need not be activated.

If it is determined by operating the first light-receiving units in the sensor units 1L and 1R that one of these first light-receiving units detects two light-shielded ranges, i.e., if plural-point inputs are detected (YES in step S207), the flow advances to step S220 to select the second light-receiving unit of the other sensor unit. In step S221, that second light-receiving unit is activated to acquire light amount distribution data. In step S222, detection of light-shielded ranges is executed based on the acquired light amount distribution data.

In step S209, the detection signal from one first light-receiving unit that detects the two light-shielded ranges is determined as coordinate calculation first data, and the detection signals of the first and second light-receiving units in the other sensor unit are determined as coordinate calculation second data and true/false determination data in accordance with the numbers of light-shielded ranges.

A practical example will be explained below using FIG. 25B. By activating the light-receiving units L1 and R1 as the first light-receiving units, if the light-receiving unit L1 detects one light-shielded range and the light-receiving unit R1 detects two light-shielded ranges, the second light-receiving unit L2 included in the other (sensor unit 1L) of the sensor unit 1R that detects the two light-shielded ranges is selected (step S220) and is activated (step S221).

The light amount distribution data having the two light-shielded ranges detected by the first light-receiving unit R1 is determined as coordinate calculation first data. For example, if the second light-receiving unit L2 detects two light-shielded ranges, the light amount distribution data of the second light-receiving unit L2 is determined as coordinate calculation second data, and that of the first light-receiving unit L1 is determined as true/false determination data. If the second light-receiving unit L2 detects one light-shielded range, respective data are stored in the memory 132 in accordance with the predetermined priority order (step S209).

Therefore, since the coordinate positions of the plurality of pointers can be detected without activating the second light-receiving unit R2, a decrease in operation time required for the coordinate calculations, power savings, and the like can be attained compared to the coordinate calculation process shown in FIG. 24.

In the above description, if both the light-receiving units L1 and R1 detect two light-shielded ranges by activating the light-receiving units L1 and R1 as the first light-receiving units, the coordinate positions of the plurality of pointers can be detected by executing the true/false determination. For this reason, the coordinate positions of the plurality of pointers can be detected by activating either one second light-receiving unit.

After data (coordinate calculation first data, coordinate calculation second data, and true/false determination data) for the coordinate calculations are determined, the processes in steps S210 to S219 are executed on the basis of these data.

On the other hand, assume that a coordinate input region is set outside the effective visual field of one of two light-receiving units in accordance with the layout relationship of the effective visual fields of the light-receiving units in the sensor unit 1L (1R), and the coordinate input region, as shown in FIG. 4, the region 173 which cannot be detected by that light-receiving unit is present, and simultaneous input operations are made in that region 173 using a plurality of pointers.

At this time, with the operations in steps S203 to S207, the light-receiving unit L1 detects one light-shielded range, and the light-receiving unit R1 detects two light-shielded ranges, thus detecting a plurality of simultaneous inputs. As a result, with the operations in steps S220 to S222, the light-receiving unit L2 performs signal detection. Since the two pointers are located outside the effective visual field of the light-receiving unit L2, the light-receiving unit L2 cannot detect any light-shielded range (no light-shielded portion), and a state wherein the plurality of simultaneous inputs are made on the region 173 can be detected.

Therefore, there is provided, if such state is detected, an informing means that generates a warning (for displaying a warning message on the display device, producing a warning tone, or the like) to the operator, thus preventing confusion of the operator.

In the above embodiment, light is projected toward the retroreflecting members 4, and light-shielded ranges that shield reflected light are detected. However, the retroreflecting members 4 are not indispensable, and the present invention can be similarly applied when a continuous light-emitting unit is arranged around the coordinate input region. Alternatively, the present invention can be similarly applied to a pointer itself which emits light as long as the pointer uniformly emits light in its thickness direction.

As has been described above, according to the embodiment, even if a plurality of coordinates are simultaneously input with plurality of pointer, the positions of the plurality of pointers can be detected with high precision.

More specifically, not only when two light-shielded ranges are separated in the prior art but also when shade overlapping of light-shielded ranges obtained from the pointers (e.g., partial eclipse) is detected, coordinates can be calculated without deteriorating precision.

In this embodiment, even when this shade overlapping occurs, coordinates can be calculated. Hence, unlike in the prior art, a third light-receiving unit need not be arranged in addition to normal first and second light-receiving units in consideration of occurrence of the shade overlapping. Hence, the distance between the first and second light-receiving units arranged on the coordinate input region can be shortened, thus realizing a size reduction of the apparatus.

Since the necessity of the third light-receiving unit can be obviated, high-precision coordinate calculations can be realized without discontinuity of coordinates or occurrence of an increase in error on coordinate arithmetic operations depending on combinations of sensor units having light-receiving units.

Furthermore, since an optical layout of the light-receiving units and light-projecting units arranged in the sensor units is made, and the operations of these light-receiving units and light-projecting units are controlled, a coordinate input apparatus which can assure high operability and handwriting reproducibility, and can reduce a housing frame that forms the apparatus can be realized.

Note that the present invention can be applied to an apparatus comprising a single device or to system constituted by a plurality of devices.

Furthermore, the invention can be implemented by supplying a software program, which implements the functions of the foregoing embodiments, directly or indirectly to a system or apparatus, reading the supplied program code with a computer of the system or apparatus, and then executing the program code. In this case, so long as the system or apparatus has the functions of the program, the mode of implementation need not rely upon a program.

Accordingly, since the functions of the present invention are implemented by computer, the program code installed in the computer also implements the present invention. In other words, the claims of the present invention also cover a computer program for the purpose of implementing the functions of the present invention.

In this case, so long as the system or apparatus has the functions of the program, the program may be executed in any form, such as an object code, a program executed by an interpreter, or scrip data supplied to an operating system.

Example of storage media that can be used for supplying the program are a floppy disk, a hard disk, an optical disk, a magneto-optical disk, a CD-ROM, a CD-R, a CD-RW, a magnetic tape, a non-volatile type memory card, a ROM, and a DVD (DVD-ROM and a DVD-R).

As for the method of supplying the program, a client computer can be connected to a website on the Internet using a browser of the client computer, and the computer program of the present invention or an automatically-installable compressed file of the program can be downloaded to a recording medium such as a hard disk. Further, the program of the present invention can be supplied by dividing the program code constituting the program into a plurality of files and downloading the files from different websites. In other words, a WWW (World Wide Web) server that downloads, to multiple users, the program files that implement the functions of the present invention by computer is also covered by the claims of the present invention.

It is also possible to encrypt and store the program of the present invention on a storage medium such as a CD-ROM, distribute the storage medium to users, allow users who meet certain requirements to download decryption key information from a website via the Internet, and allow these users to decrypt the encrypted program by using the key information, whereby the program is installed in the user computer.

Besides the cases where the aforementioned functions according to the embodiments are implemented by executing the read program by computer, an operating system or the like running on the computer may perform all or a part of the actual processing so that the functions of the foregoing embodiments can be implemented by this processing.

Furthermore, after the program read from the storage medium is written to a function expansion board inserted into the computer or to a memory provided in a function expansion unit connected to the computer, a CPU or the like mounted on the function expansion board or function expansion unit performs all or a part of the actual processing so that the functions of the foregoing embodiments can be implemented by this processing.

As many apparently widely different embodiments of the present invention can be made without departing from the spirit and scope thereof, it is to be understood that the invention is not limited to the specific embodiments thereof except as defined in the appended claims.

CLAIM OF PRIORITY

This application claims priority from Japanese Patent Application No. 2004-69482 filed on Mar. 11, 2004, the entire contents of which are hereby incorporated by reference herein.

What is claimed is:

1. A coordinate input apparatus for detecting a pointed position on a coordinate input region, comprising:
   at least two sensor means arranged on corner portions of the coordinate input region wherein each of said at least two sensor means comprises first light-projecting means, second light-projecting means, first light-receiving means and second light-receiving means;
   reflection means, arranged on a surrounding portion of the coordinate input region, for retroreflecting light projected by said sensor means;
   angle calculation means for calculating angle information corresponding to the pointed position on the coordinate input region on the basis of a change in light amount distribution obtained from said at least two sensor means which receive light retroreflected from said reflection means; and
   calculation means for calculating coordinates of the pointed position on the basis of the angle information calculated by said angle calculation means.

2. The apparatus according to claim 1, wherein when a horizontal direction of the coordinate input region is defined as an X-axis, a vertical direction of the coordinate input region is defined as a Y-axis, and a distance between symmetric axes of the two light-receiving units is defined by d, an X-axis projected distance dx obtained by projecting the distance d on the X-axis or a Y-axis projected distance dy obtained by projecting the distance d on the Y-axis is set to be substantially equal to a diameter of a pointer used to input on the coordinate input region.

3. The apparatus according to claim 1, wherein an effective visual field of at least the first light-receiving means of the first and second light-receiving means covers the full coordinate input region.

4. The apparatus according to claim 1, further comprising:

determination means for determining, on the basis of the light amount distribution output from the first light-receiving means of the first and second light-receiving means, if a plurality of pointed positions are present in the coordinate input region; and control means for controlling an operation of the second light-receiving means on the basis of the determination result of said determination means.

5. The apparatus according to claim 1, further comprising:

detection means for detecting a state in which a plurality of pointed positions are present outside the effective visual field of the first light-receiving means and an effective visual field of the second light-receiving means.

6. The apparatus according to claim 1, wherein said angle calculation means comprises:

end portion information detection means for detecting end portion information as angle information corresponding to end portions of a range of a change in light amount distribution output from the light-receiving means before and after coordinate input sampling, and said calculation means calculates coordinates of the pointed position on the coordinate input region on the basis of one end portion information corresponding to two pieces of end portion information for the first and second light-receiving means of the first sensor means, and two pieces of end portion information for the first and second light-receiving means of the second sensor means.

7. The apparatus according to claim 1, further comprising:

a light-projecting unit which is arranged on a surrounding portion of the coordinate input region, and projects light toward the coordinate input region.

8. The apparatus according to claim 1, further comprising:

reflection means, arranged on a surrounding portion of the coordinate input region, for retroreflecting incident light; and a pointer having a light-emitting unit.

9. The apparatus according to claim 1, wherein the coordinate input region is used as a display surface of a display apparatus or is overlaid on the display surface of the display apparatus.

10. The apparatus according to claim 1, further comprising:

a display apparatus, wherein said coordinate input apparatus is overlaid on said display apparatus.

11. A display apparatus having a coordinate input apparatus of claim 1, wherein the said coordinate input apparatus is overlaid on a display surface of said display apparatus.

12. A method of controlling a coordinate input apparatus which comprises at least two sensor units which are arranged on corner portions of a coordinate input region, wherein each of said at least two sensor means comprises first light-projecting means, second light-projecting means, first light-receiving means and second light-receiving means, reflection means, arranged on a surrounding portion of the coordinate input region, for retroreflecting light projected by said sensor means, and detects a pointed position on the coordinate input region, comprising:

an angle calculation step of calculating angle information corresponding to the pointed position on the coordinate input region on the basis of a change in light amount distribution obtained from the at least two sensor units which receives light retroreflected by said reflection means; and a calculation step of calculating coordinates of the pointed position on the basis of the angle information calculated in the angle calculation step.

* * * * *